(12) United States Patent
McNamara

(10) Patent No.: US 6,262,976 B1
(45) Date of Patent: Jul. 17, 2001

(54) SYSTEM AND METHOD FOR NETWORK FLOW OPTIMIZATION USING TRAFFIC CLASSES

(75) Inventor: Tod W. McNamara, Rowley, MA (US)

(73) Assignee: Ordered Networks, Inc., Rowley, MA (US)

(*) Notice: Subject to any disclaimer, the term of this patent is extended or adjusted under 35 U.S.C. 154(b) by 0 days.

(21) Appl. No.: 09/398,663

(22) Filed: Sep. 17, 1999

Related U.S. Application Data

(60) Provisional application No. 60/100,723, filed on Sep. 17, 1998.

(51) Int. Cl.[7] .................................................. H04L 12/28
(52) U.S. Cl. .......................... 370/254; 370/351; 370/389; 709/220; 709/238
(58) Field of Search .................................... 370/229, 231, 370/235, 238, 254, 255, 351, 352, 389, 400, 401, 428; 709/201, 220, 230, 238, 242; 710/104, 105, 131

(56) References Cited

U.S. PATENT DOCUMENTS

| | | | |
|---|---|---|---|
| 5,455,865 | * 10/1995 | Perlman | 380/49 |
| 5,596,719 | * 1/1997 | Ramakrishnan et al. | 395/200.02 |
| 5,699,347 | * 12/1997 | Callon | 370/238 |
| 5,734,580 | 3/1998 | Rakov | 364/488 |
| 5,793,765 | 8/1998 | Boer et al. | 370/395 |

OTHER PUBLICATIONS

Rodriguez–Moral, A.: "LIBRA—An Integrated Framework for Type of Service–Based Adaptive Routing in the Internet and Intranets" Bell Labs Technical Journal; pp. 42–67 (Mar. 21, 1997) XP 000695169.

W. Chiang and R. Chen, Topological Properties of the (n,k)–Star Graph, International Journal of Foundations of Computer Science vol. 9 No. 2 (1998) 235–248.

M. de Azevedo et al., Some Topological Properties of Star Connected Cycles, Information Processing Letters 58 Elsevier Science B.V. (1996) 81–85.

K. Day and A. Al–Ayyoub, The Cross Product of Interconnection Networks, IEEE Transactions on Parallel and Distributed Systems, vol. 8, No. 2, Feb. (1997).

C. Yeh, and E. Varvarigos, Marcro–Star Networks: Efficient Low–Degree Alternatives to Star Graphs, IEEE Transactions on Parallel and Distributed Systems, vol. 9, No. 10, Oct. (1998).

M. Ould–Khaoua et al., Comparative Evaluation of Hypermesh and Multi–stage Interconnection Networks, The Computer Journal, vol. 39, No. 3 (1996).

* cited by examiner

*Primary Examiner*—Alpus H. Hsu
(74) *Attorney, Agent, or Firm*—Brian L. Michaelis; David D. Lowry; Brown Rudnick Freed & Gesmer

(57) ABSTRACT

Disclosed are methods of routing traffic through a network with a plurality of nodes which comprises classifying network traffic into a plurality of classes, including interior, interior-to-exterior, exterior-to-interior, and transitory. At each node of the network, a packet, designated as belonging to a traffic class and including a source node address and a destination node address, is received. The packet is indexed into the node's packet switch matrix using the traffic class designation, source node address, and destination node address to obtain a node link number for forwarding the packet. Then, the packet is forwarded upon a link indicated by the node link number.

11 Claims, 29 Drawing Sheets

MEDIA ACCESS CONTROL FRAME(MAC FRAME)

SYSTEM AND METHOD FOR NETWORK FLOW OPTIMIZATION USING TRAFFIC CLASSES

RELATED APPLICATION

The present application claims the benefit of U.S. Provisional Application No. 60/100,723 filed on Sep. 17, 1998, which is incorporated herein by reference.

FIELD OF THE INVENTION

The present invention relates to interconnectivity of computing machinery and in particular to moving information among a plurality of networked computers.

BACKGROUND OF THE INVENTION

Modularized/layered solutions or "protocols" are known which permit computer systems to communicate, regardless of connection method or vendor-specific hardware implementation, or to permit different networks to communicate or be "internetworked." Known systems provide for connectivity in and among networks of computerized equipment, and address the problems associated with interconnectivity. Layering in known systems divides the task of interconnection and communication into pieces (layers), wherein each layer solves a piece of the problem or provides a particular function and is interfaced to adjacent layers. Each of the layers is responsible for providing a service to ensure that the communication is properly effected. Examples of some services provided by the various layers are error detection, error recovery, and routing among many communication paths. All the layers in conjunction present the overall communication protocol. It is generally well accepted in the art of internetworking that modularizing in layers with well defined functional interfaces, divides and effectively reduces the complexity of the connectivity problem and leads to a more flexible and extensible solution.

A model for describing the layers in a network has been posited by the International Standards Organization (ISO). The ISO open systems interconnection (OSI) model is a seven-layer model, illustrated in FIG. 1. The OSI model provides a standard for describing a network and facilitating computer communications. The OSI model defines the layers and units of information that pass along a network. As illustrated, data from an application or process running on a first host (HOST A) moves down the model network layers to a Physical layer. The Physical layer defines the physical connection which transmits raw bits across a communication channel to another host (HOST B) and up corresponding layers to a process running thereon. OSI, while defining a model or framework in which standards and protocols can be developed at each layer, allows for a flexible approach for implementation of the model. OSI and other layered computer network communications standards are well known and described in detail in the Handbook of Computer-Communication Standards by William Stallings, which is incorporated herein by reference.

Layered protocols and interfaces therebetween have been defined, which provide specifications for communication between a process or program being executed on one computer's operating system and another process running on another computer. Transmission Control Protocol/Internetwork Protocol (TCP/IP) are two protocols that are part of a protocol suite or family of protocols layered and designed to connect computer systems that use different operating systems and network technologies. TCP/IP, which provides a common set of protocols for invocation on dissimilar interconnected systems, is illustrated and mapped in FIG. 1a to analogous layers of the OSI model. TCP/IP is described in detail in ITERNETWORKING WITH TCP/IP, VOLUME I, by Douglas E. Comer, published by Prentice-Hall Inc., 1995, and/or TCP/IP ILLUSTRATED, VOLUME I, by W. Richard Stevens, published by Addison-Wesley, 1994, which are incorporated herein by reference.

TCP/IP is a four layer protocol suite which facilitates the interconnection of two or more computer systems on the same or different networks. In certain networks, such as the Internet, TCP/IP is a requirement for interoperability. The four layers comprise two independent protocols: TCP which can be used to access applications on other systems within a single network; and IP which permits identification of source and destination addresses for communication between systems on different networks.

As illustrated in FIG. 2, application or process data communicated via TCP/IP is "packetized" as it passes down layers through the protocol suite. The original process data first has an information block called a TCP Header prefatorily appended thereto in a TCP layer, to form a TCP packet. The TCP Header contains information to assure that the data travels from point to point reliably without picking up errors or getting lost. An IP layer repacketizes the TCP packet into an IP packet, by adding an IP Header which contains information needed to get the packet to a destination node. The IP packet is further packetized, such as in ANSI/IEEE 802 local area network protocol, with an additional Logical Link Control (LLC) address header and a control header at an LLC layer, to form an LLC Protocol Data Unit (LLCPDU). The LLCPDU is "framed" for transmission by addition of a Media Access Control Header and Trailer, to form a MAC Frame for communication between two TCP/IP facilities.

A considerable amount of "baggage" in the form of headers and trailer information is added to data which is transmitted between facilities using a layered protocol suite, such as TCP/IP and other layered protocols known in the art. Many additional bits are added at the various layers and must be processed for ultimate transmission across a communication channel at the physical layer. At its destination, the transmitted frame must be unpacketized according to embedded instructions and passed upward through the protocol layers to its receiving application or process. In addition to the substantial increase in the amount of information that must be transmitted as a result of packetization in layered protocols, there is a significant amount of processing overhead associated with packetizing data for network and inter-network transmission. Disadvantageously, substantial computing resources and physical transmission media capacity, representing real costs, must be involved in the generation and application of header and trailer information associated with putting data and all its protocol suite baggage through the communication channel.

Historically, early networks were constituted by a plurality of computers daisy chained in a limited physical space by a common physical medium or wire, e.g. Ethernet. The primary concern with Ethernet resulted from the simultaneous transmissions on the common wire, which resulted in "collisions" and limited the amount of information that could be transmitted over the medium. When collisions occur, all packets involved in the collision are lost and must be re-transmitted. Thus Ethernet interfaces within a Local Area Network (LAN) were designed to include collision avoidance mechanisms. In this manner, traffic on the network was detected in order to await a safe opportunity for transmission. Accordingly, the amount of information that could be successfully transmitted over the LAN in a given amount of time, referred to as "bandwidth," was increased.

As LANs grew, hardware components were required and developed (e.g. repeaters), to convey the data signals intelligibly along the extended path. Repeaters merely passively amplified signals passing from one network cable segment to the next. While repeaters increased the physical distances over which network data could be transmitted, they did not contribute to any increase in network bandwidth.

Hardware "bridges" effectively replaced repeaters for extending the size and scope of networks. Bridges addressed optimization of connectivity and, to an extent, enhanced network bandwidth. In contrast to repeaters, bridges effectively isolated network segments by actually re-creating a packet of signals as it is forwarded in a single network. Bridges are comprised of input and output ports, and maintain tables which map physical addresses to particular ports of the bridge. The tables are based on Data Link Layer (OSI Model level 2) information in each data packet header. The bridge maps an incoming packet for forwarding to a bridge output port based on the packet's destination address. Bridges, like Ethernet interfaces, employ collision avoidance mechanisms at their ports, so they can enhance bandwidth by ensuring that simultaneous transmissions in isolated bridged segments do not collide. Forwarding via bridges, however, introduces substantial delays or latencies in network transmissions as the packets are processed for forwarding. Also, memory requirements for maintenance of tables in bridges is substantial as traffic and number of nodes in a network increases.

Bridges topologically configured on a single level to connect network segments, as illustrated in FIG. 3a, may actually negatively impact bandwidth. Data traversing the network from a source in segment #1 to a destination in segment #4, must pass through intermediate segments #2 and #3. This effectively reduces the bandwidth available to systems residing on segments #2 and #3. A solution to this effective reduction in bandwidth was introduced with the concept of a network "backbone," as illustrated in FIG. 3b.

The physical extension of single networks was soon followed by the need to physically and logically connect distinct networks, i.e. internetworking. Providing optimal connectivity, maximizing the amounts of information conveyed ("bandwidth"), and facilitating interaction or isolation between interconnected networks became (and continue to be) paramount considerations as the size and scope of networks and Internetwork increased.

Internetworking, or interconnection of discrete or logically distinct networks, was facilitated by the introduction of routers. Separate LANs, each having their own logical address spaces, are interconnected by routers to form "subnetworks" or "subnets". Subnet configurations effectively partitioned networks and avoided the problems associated with management of very large address spaces in large networks.

Routers operate on the Network Layer information (OSI Model level 3, IP packet level in TCP/IP) and therefore facilitate transmission of information among and between different subnet protocols. Isolation of subnets via routers localizes collisions and simplifies the implementation of subnet broadcasts. Routers enabled the configuration of complex network topologies while enhancing bandwidth and facilitating interconnectivity. However, known routers, like bridges, require large amounts of memory to maintain routing tables, and disadvantageously introduce latencies in the transmission of information as it is processed at the appropriate protocol stack layer.

Complexities in network configurations led to the implementation of hierarchical network topologies, and created the need for flexibility in reconfiguring existing networks. "Hubs" or "concentrators" (different names for effectively the same type of device), were developed to provide central facilities for network physical interconnections. Hubs essentially receive the wiring/interconnections for all of the systems or nodes configured in a subnet (i.e. one node per hub port), and eliminate the daisy-chaining of connections between systems in a network. Hubs can be centrally located, such as in a network cabinet or telephone closet, such that patching between hubs or subnets can be easily implemented.

Switches have been developed more recently, and are increasingly more popular than hubs. Switches, as opposed to hubs, actually process the network traffic or packets and, like bridges, switches maintain tables which map physical addresses to particular ports of the switch. The switch tables are based on Data Link Layer (OSI Model level 2) information in each data packet header so that incoming packets are forwarded to a switch port based on the packet's destination address. Switches are effectively multiport bridges, typically with enhanced capabilities that permit them to function as routers. Typical switches have fast backplanes for receiving signals from nodes and either use a matrix of connections between every port connection possibility, or a central memory table repository, to effect store and forward operations for network traffic. Switches, like bridges and routers, introduce latency in network communications.

Communications over internetworked computers (generally referred to hereinafter, irrespective of the physical links, as "telecommunications"), in many implementations is based on the concept of switching. In telecommunications generally, switching determines which path a data stream takes as it traverses the network(s) from a source node to a destination node.

Traditional "packet switching" schemes (such as the widely deployed "X.25" technology designed under the auspices of the international standards organization CCITT), require that the source and destination nodes be in communication, i.e. logically connected, before any packets can be transferred. This is referred to as a connection oriented protocol. Each packet requires an identifier for its destination connection. Entire packets have to be sent from point to point. At each receiving point the packet is typically checked and an acknowledge is returned to the sending node before the packet is sent to another point toward its destination connection. If an error was detected in the received packet, the packet would be discarded, a control packet would be returned to the sending node and the packet would have to be re-transmitted. Thus, significant amounts of buffer memory are required in packet switching implementations to buffer the packets in transit. Significant delays are introduced by the fact that full packets have to be buffered and checked before being further transmitted.

Routers and switches, which connect networks using the same Transport Layer protocols but different Network Layer protocols, provide "connectionless" data transfers. In contrast to connection oriented, packet switched implementations, packets in connectionless router/switch implementations contain the address of their destination and therefore do not require a logical connection established between transferring nodes. It should be noted that with the TCP/IP protocol suite the destination node verifies that the packet is complete and correct, and requests re-transmission if necessary. TCP/IP can be used over connectionless or connection-oriented environments.

Routers and switches connected in Wide Area Networks (WAN) contribute to possibly the single most severe network issue—limited backbone scaling—in contemporary Internetwork (such as the Internet). This problem is sometimes referred to as the "N−1 problem." The problem arises from the fact that each independent aggregate entity, i.e. subnet or "domain", controls the allocation of sub-network (IP) addresses. Consequently, once inter-connected to the backbone, fine gradient sub-network level detail populates the forwarding table of every backbone switch or router (the terms "switch" and "router" are used effectively interchangeably hereinafter). Since the amount of memory consumed by the forwarding tables is a function of the number, N, of nodes in subnets, more and more memory is required for the forwarding tables of the backbone routers as compared to interior domain routers. Thus a practical limit is imposed on the ability to add subnets to a backbone. Beyond that practical limit, the performance of the network is actually better if there is one less node. To interconnect N items with a distinct "end to end" path or connection, $\Sigma(n-1)$ or $n(n-1)/2$, links are required. As an example of how quickly this information grows, 5 nodes require 10 total links, 50 nodes require 1225 total links, and 500 nodes require 124,750 total links.

The issue of sub-network information scaling requires increasing backbone switch memory as feeder switches inter-connect to more network domains or subnets. The inability to increase memory due to practical cost/physical limitations, substantially negatively impacts backbone performance in a number of ways. Since the forwarding table size in routers/switches connected to the backbone is finite, table entries are typically cached in and out of the memory, slowing down performance. For the period that a table entry is not in the forwarding table, the data will be dropped at the switch. Thus if the sub-network is an aggregate of higher scale, i.e. a subnet with a large quantity of nodes or other subnets, larger volumes of discarded packets occur, when not in cache. Exacerbating the problem is the ever increasing demand for bandwidth, which can only be met with highly scaleable networking technology.

Furthermore, known routers/switches employ traffic optimization algorithms that are typically based on the concept of directing traffic to the shortest path first. Disadvantageously, such "shortest-path-first" router models tend to have the opposite of the desired effect in that they lead to undesirable congestion. When each node picks the shortest path, independent of what other routers are doing, the network will tend to congest nodes/links with the highest connectivity at the center of a network, first. This primarily is due to the fact that the shortest-path-first algorithm is based on a two dimensional model. Accordingly, the most connected nodes will have the shortest paths to the most nodes, which will make them the most likely nodes to be selected by each independent node space implementing its respective shortest-path-first optimization algorithm. Since each node selects a path, independent of other nodes and what they are selecting, a link will congest before that congestion is recognized and the routers determine another route. In addition, since each router typically has a mechanism to exchange feedback about a congested node, each router will spin-off to calculate another path to choose, all using the same algorithm. This will tend to merely move the congestion to another node. This also tends to cause routers to calculate routes more often, while the congestion moves in an orderly fashion around, or back and forth with each new route calculation.

Various solutions have been proposed to address the need for higher levels of scalability in internetworking, with the benefit of eliminating the possibility of congestion at any particular link. Asynchronous Transfer Mode (ATM) technology is relatively highly scaleable and upholds the promise of providing optimal connectivity, maximizing bandwidth, and facilitating interaction or isolation between interconnected networks. ATM, however, is perceived by many as being perhaps one of the most complex networking technologies introduced to date.

ATM is a connection-oriented implementation that is structured around ATM "cells" and cell switches. An ATM network includes ATM switches which are interconnected by point-to-point ATM links/interfaces. Prior to any data transfer a connection must be established between the ATM source and the ATM destination (i.e. ATM is connection-oriented). ATM involves ATM specific signaling protocols and addressing structures, in addition to protocols required to route ATM requests across the ATM network. As is appreciated in the art, these ATM specific protocols affect the manner in which existing higher level protocols can operate over ATM networks. That is, it is generally not a simple matter to implement ATM in the context of existing network configurations.

ATM is a hardware specific implementation comprising ATM switches that support two kinds of interfaces: user-network interfaces (UNI); and network-node interfaces (NNI). UNIs involve one type of ATM cell or information format, and connect ATM end-systems, such as hosts, routers etc., to an ATM switch. NNIs involve a second type of ATM cell and generally connect an ATM switch to an ATM switch. Virtual circuits are set up across an ATM network to effect the connections for making data transfers.

Two types of virtual circuits can be set up in ATM networks: virtual paths which are identified in a cell by virtual path identifiers (VPI); and virtual channels which are identified by virtual channel identifiers (VCI). VPI and VCI are only significant across a particular ATM link, and are remapped as appropriate at each switch. Thus each ATM switch receives a cell across a link according to a VCI or VPI value. Each switch maintains a local translation table in order to look up the outgoing port(s) of the connection and to insert a new VCI/VPI value. The ATM switch then retransmits the cell on the outgoing link with the new connection (VCI/VPI) identifiers.

The hardware specific implementation of ATM presents numerous disadvantages apart from its complexity. As with conventional (non-ATM) router s and switches ATM switches must deconstruct and reconstruct information (cells) as the information traverses the network, which introduces significant latencies. As with other connection-oriented protocols latencies are introduced by the fact that full cells of information must be sent, received and checked before being forwarded toward their ultimate destination. In effect, increases in bandwidth obtained with ATM are gained by increasing switching speeds. The substantial amounts of protocol related baggage transferred with data over ATM links likely will run up against real, hardware imposed limits in switching speed/bandwidth.

SUMMARY OF THE INVENTION

The present invention provides a highly scaleable paradigm which provides for the use of multidimensional routing algorithms based on traffic classes, to more evenly distribute network traffic in any given topology for networking and internetworking computers in a manner that minimizes the amount of information added by the protocol and avoids the problems presented by ubiquitous forwarding tables needing to be implemented, cached and updated at network nodes.

According to the invention, a network implements a concept of orthogonal directional traffic classes which are identified as, but are not limited to: interior traffic, interior to exterior traffic (source traffic), exterior to interior traffic (destination traffic), and transitory traffic. Such classified traffic transits networks of the present invention which comprise an "ordered" (i.e. numbered) set of Network Entities ("NE" or elements) commonly referred to and including links, switches, and stations (also referred to as hosts or as end station elements). Each NE in the network according to the invention is "ordered" based on a network "center" which is functionally determined by an NE's connectedness (i.e. the quality and quantity of connections), and by its centeredness (i.e. how close it is to the center of the network). An assigned numeric address ("host number") designated during ordering, specifies the "relative" location of each element, and provides information both with respect to the node's "centeredness" and "connectedness" (i.e., expressed as "relative" to the "center" of an Ordered Network). Regardless of the size of the domain (control area/subnet), the "relative" location of any NE, e.g. of a host or switch or subnet, is readily discerned by one quantity, e.g., the host number, as assigned according to the methodology of the present invention. To effectuate data flow (traffic), topologically static switching and mapping are used in place of currently used routing protocols, to thereby simplify identification of directionality and of flow.

Each multi-domain network, subdivided into subnets or "control areas," uses a distributed map instead of a forwarding table to determine forwarding links. Consequently, this table does not expand when the exterior inter-networks expand. This table expands only when the locally connected network (i.e. subnet) expands. If the local network happens to be a backbone, then this table will increase only as domains directly connected to the local backbone domain increase. The map-based approach as found in "Ordered Networking" according to the invention, maintains only locally relevant mapping information for data forwarding. Therefore, memory is never cached in or out as the overall network expands.

In further accord with the invention, relative addressing gives each inter-connected control area independent control of access connectivity scaling. Aggregating small independent domains within a backbone of interconnected domains into an area allows for scaling data traffic and resources at a backbone. This requires nothing within each of the smaller domains and these smaller domains are effectively unaware of the scaling. Only the backbone controls the scaling and has finer control over backbone resources. By interconnecting domains of the same approximate size within an area and then inter-connecting this area with other areas of the same approximate size, the areas scale the inter-area backbone connections to approximately the same level. This allows the backbone to scale inter-area connectivity to approximately balance traffic or data flow. The aggregation and scaling of arbitrary sets of inter-connected network entities facilitates reductions in backbone, local, and large scale network resource utilization. If each network entity aggregate is approximately the same size, the resource utilization of the scaled entity inter-connections will balance with predictable performance at each scale. Using similar algorithms, relative addressing can be extended to inter-domain sequencing and can allow for reductions in these traffic areas as well. Optionally, map servers can be introduced which are used for both interior and exterior "name to relative address resolution". Relative naming eliminates the need for an absolute naming authority and thereby further increases the flexibility of trafficking.

Ordered Networking architecture according to the invention involves network objects and support servers to provide inter-networking communication between network entities both local and remote. Network objects, which are distributed at each node, include a SWITCH object and a LINK object. Network objects (SWITCH and LINK) use the same control mechanism regardless of an object's function, position, or particular data structure. In addition, objects support two access levels for inter-object control communications; named object access and directed object access. Named object access allows communication between network entities without knowledge of relative addresses, while directed object access allows network objects to communicate using relative network addresses. Since forwarding requires distributed data structures populated for transmitting addressed data between network entities, the named object mechanism allows network entities to communicate before populating these data structures throughout the network. After these structures are populated by support servers, the directed mechanism utilizes the forwarding path. The named mechanism requires thread processing at each forwarding network element or switch, while the directed mechanism requires no processing above the hardware-forwarding or driver-forwarding component. Either mechanism processes Query, Check, Announce, Set and Response control requests. These messages allow co-ordination between all distributed data structures within an Ordered Network.

Support servers in the architecture according to the invention include: an inter-Domain Map Server or service (DMS); a Domain Name Server or service (DNS, as known in the art); an Interior Map Server or service (IMS); and an Interior Name Server or service (INS). The support servers, generally, provide a communication support function for proper Ordered Network operation. The INS in each host, switch, and edge switch performs distributed database and relative addressing functions. The IMS is a mapping service provided by the switch that is typically the lowest number in an area or domain. The IMS determines the topology of the region and distributes that topology to individual switches to load their respective path switch matrixes. The DNS is known to be located in edge switches for performing exterior to interior name resolution and network address translation for exterior IP or ON domains. The DMS in each edge node is designated to perform a mapping function for exterior domains to determine both relative domain name paths and interior to exterior network address translation for exterior IP or ON domains.

In still further accord with the invention, Ordered Networking is implemented according to a methodology that initially determines link sets in a domain. From the link sets, a map establishing the Ordered Network topology is generated by the IMS. A path switch matrix for each node is then generated from the map, and is distributed among the nodes in the domain. That is, every node is loaded with a path switch matrix. Each path switch matrix is loaded with different data and represents a topological map of the entire domain from each router's perspective. The path switch matrix is generated as a function of the four traffic classes (i.e. interior traffic, interior to exterior traffic (source traffic), exterior to interior traffic (destination traffic), and transitory traffic). In operation, the map server (IMS) effectively determines which path network traffic will take. The path matrix located in each node takes the source address, the destination address and the traffic class path and uses them to determine which link to forward the traffic on.

Features of the invention include network and internetwork logical configuration that allows for better data flow traffic control by treating a network as a large distributed database which is comprised of both static and dynamic physical link data flow traffic information. Servers (within a domain) query each possible path between a "source" and the intended "destination" for data flow traffic information; they then determine which path has the greatest capacity. Once that path is identified, the corresponding path switch matrices of each switch along that optimum path is loaded by the server. The servers then return information back to the source, namely, a 'relative' address for the destination and data flow along path commences.

Ordered Domains according to the invention, simplify inter-domain communication by presenting a "reduced complexity view" to domains that are "exterior" domains. This simplified view collapses the "interior" domain complexity into a "single apparent switch element" and thereby allows for data reductions in inter-domain routing. The "N−1 problem" is effectively eliminated by allowing a single apparent network element to represent an interior of any arbitrary size. Ordered Networking effectively creates an abstract "object layer" (by treating all Network Entities as similarly addressed objects), which can be readily extended and applied to groups, named processes, and identities that come into existence in the future. Any two entities communicating define the meaning of a "relative" address and that definition can be expanded in the future without significantly affecting any of the algorithms, methods, and existing implementations of the Ordered Network. Furthermore, the abstract layer is like an overlay which, when applied over disparate elements, renders them apparently (and functionally) uniform. The network servers thereby control and select specific paths for traffic. In addition, abstract objects for links, areas, and domains allow for uniform control and collection of this distributed data. Introducing abstract objects also facilitates network controls over and above the physical media layer. Accordingly, pre-allocation of bandwidth and predictable latency can be achieved over networks, e.g. Ethernet, currently lacking those characteristics at the media layer. For media that do have controlled characteristics, like ATM, using an abstract layer allows easy integration with other physical media and uniform control across all network elements.

According to an illustrative embodiment of the present invention, switching occurs in hardware and is therefore not dependent on software. Thus, with the simple addition of a board to any standard computer the necessary hardware switch is created. Mapping methods according to the invention simplify network management and control, as well as provide for full integration with ATM, Ethernet, point to point, satellite, and any of various physical media, without the need for complex protocols or special applications.

BRIEF DESCRIPTION OF THE DRAWINGS

The foregoing and other features and advantages of the present invention will be more fully understood from the following detailed description of illustrative embodiments, taken in conjunction with the accompanying drawing in which.

DETAILED DESCRIPTION

Figure 1:
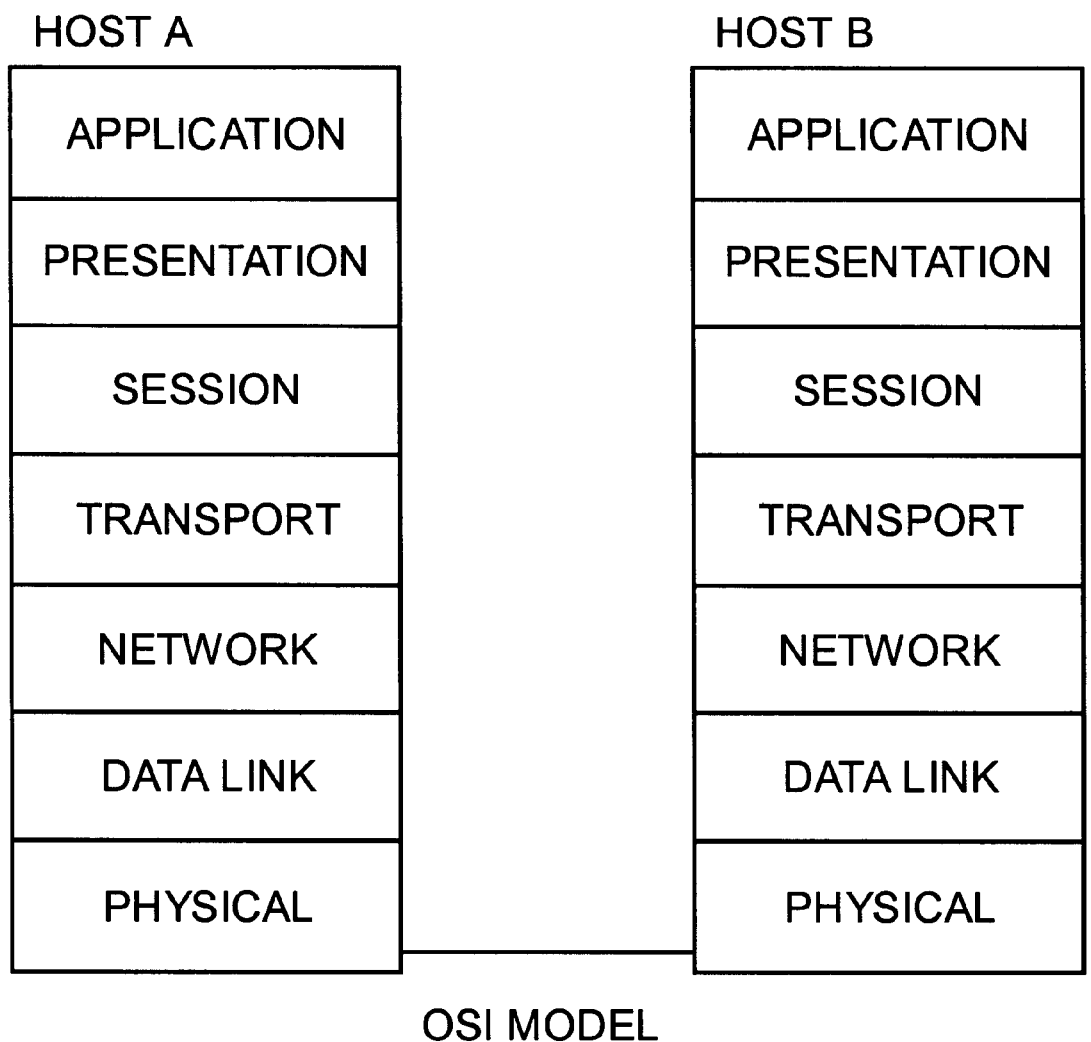
FIG. 1 is a block diagram of an OSI model network protocol stack as known in the art.
Figure 1A:
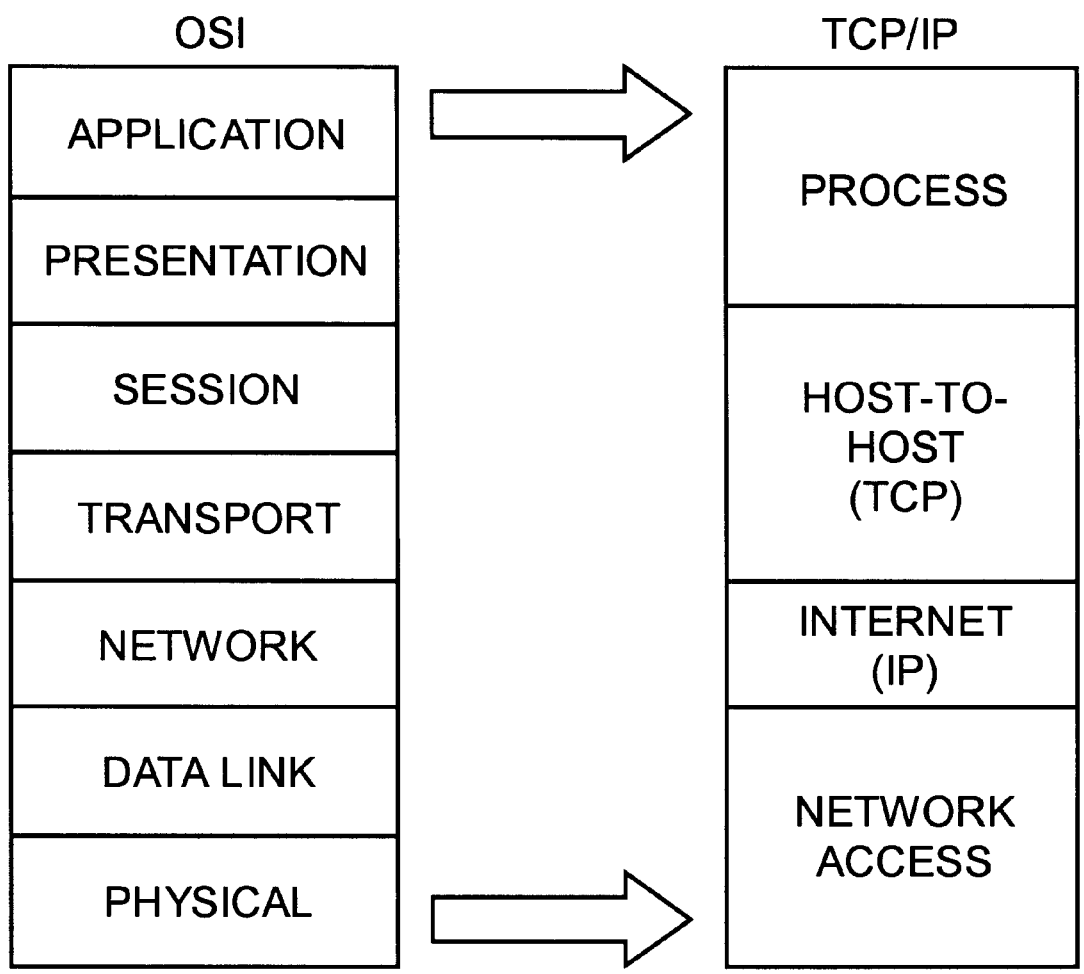
FIG. 1a is a block diagram of a TCP/IP protocol stack as known in the art, as compared to the OSI model network protocol stack of FIG. 1.
Figure 2:
FIG. 2 is a diagrammatic representation of packetization of information according to the TCP/IP protocol as known in the art.
Figure 2:
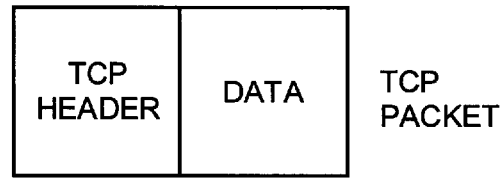
Figure 2:
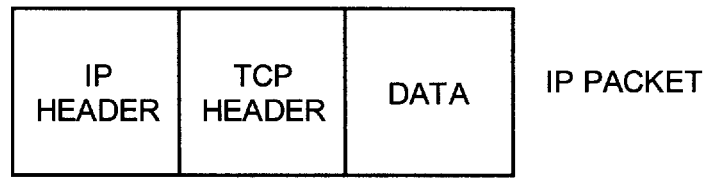
Figure 2:
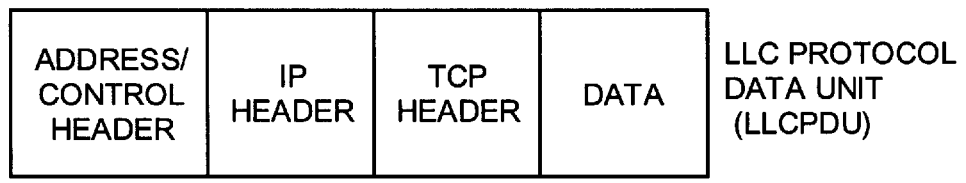
Figure 2:
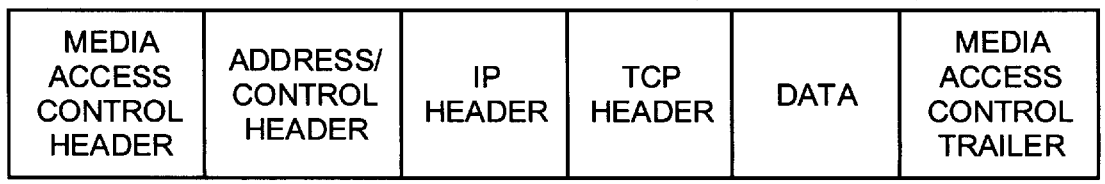
Figure 3A:
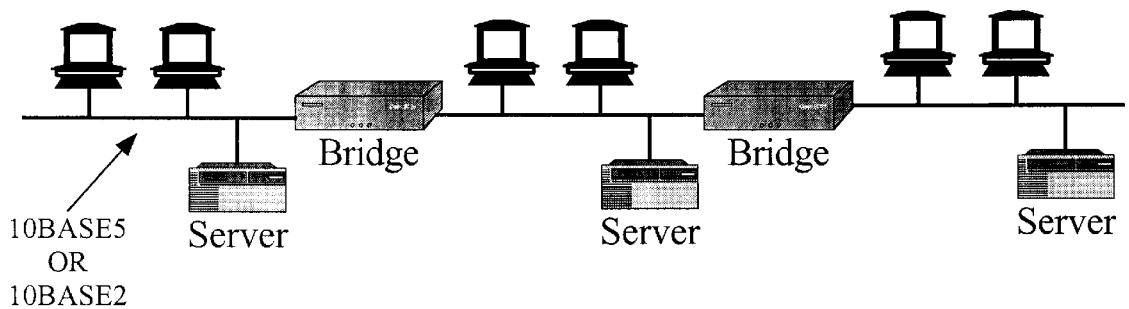
FIG. 3a is a diagrammatic representation of a segmented network with segments interconnected by bridges, as known in the art.
Figure 3B:
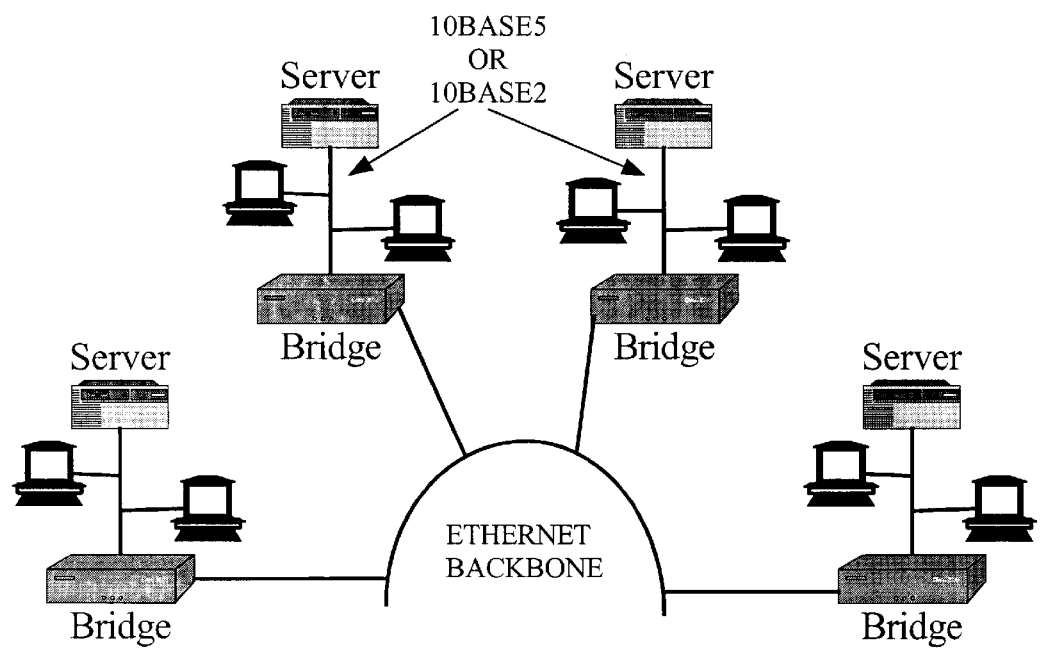
FIG. 3b is a diagrammatic representation of a segmented network with segments connected to a backbone, as known in the art.
Figure 4:
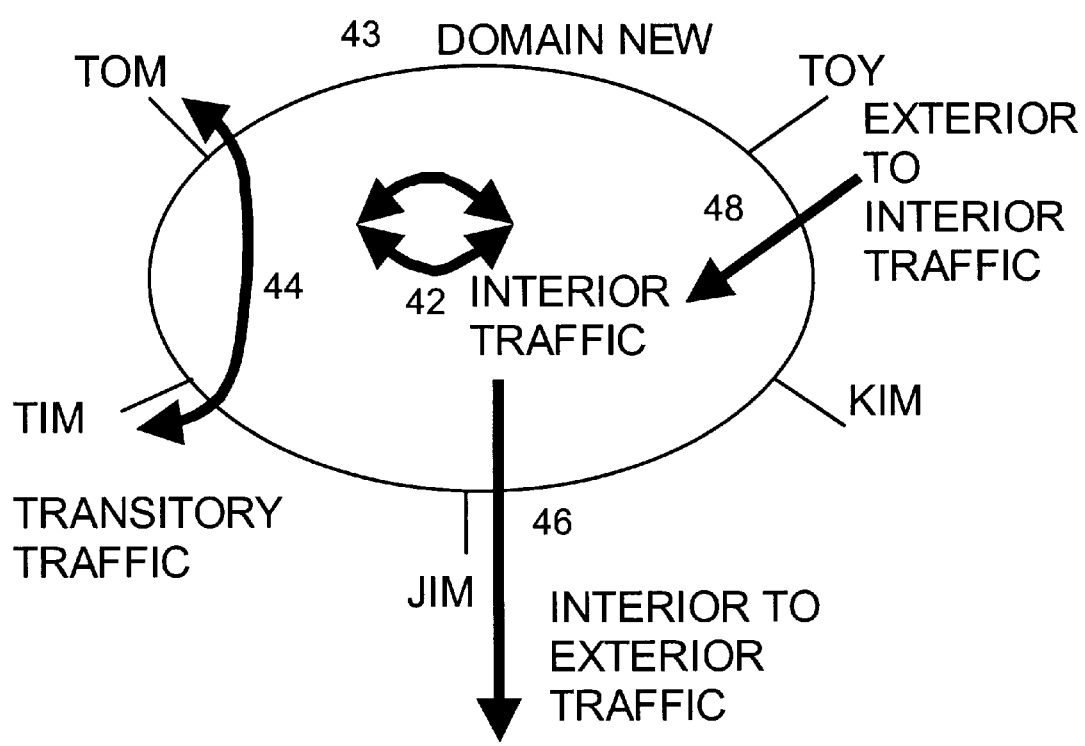
FIG. 4 shows how various types of network traffic are classified according to the present invention.

The present invention is implemented in the context of networked and/or internetworked computing machinery, as known in the art. A method and apparatus is provided which effectively classifies network traffic, and optimizes network traffic flow in deference to and as a function of those classifications. By dividing data into four classes, several optimizations are possible. Implementing and manipulating traffic based on traffic classes markedly improves network performance, as will be described below. These classes are illustrated in FIG. 4, relative to a network domain 40. The classes include interior traffic 42, transitory traffic 44, interior to exterior traffic 46, and exterior to interior traffic 48.

Note that these four classes of information are directionally orthogonal, that is one reason why minimizing the path inter-dependencies of these classes provides the greatest benefit to the network as a whole. Orthogonality in traffic direction results in data paths that have minimal effect on each other. In an unordered network, orthogonal paths are not easily determined. The present invention provides classification of traffic into orthogonal classes which enhances balancing of data flow.

If interior traffic 42 could easily be identified, the best routing technique for it would be shortest path first (which suffers from the problem(s) discussed hereinabove). However, interior traffic between a differing hosts tends to be balanced and of short duration, although interior traffic between host and servers will tend to be problematic.

The best routing technique for transitory traffic 44 would be the shortest path around the edges of the network domain 40. Since all other local traffic will tend to be direct to the interior of the network, or directed out to a specific external domain, routing transitory traffic 44 around the edges of a domain will tend to minimize its impact on interior traffic (which is routed shortest path first). In fact, orthogonal routing of these two traffic classes, according to the invention, can markedly improve throughput in a network.

There are distinct differences between the final two classes, interior to exterior traffic 46 and exterior to interior traffic 48, which is why they are differentiated according to the invention. Within an organization, traffic tends to be balanced between hosts and heavily imbalanced between hosts and servers. Traffic between an organization and the outside world will tend to be imbalanced heavily on the exterior to interior path. Periodically, there will be bursts of outbound data during file transfers, but users in a group tend to get more information than they generate. This makes selecting exterior to interior path algorithms slightly different for better efficiency. If exterior path selection was based on the shortest path gravitating toward the highest bandwidth from high numbered nodes to low numbered nodes, while interior path, selection was based on the shortest path with the lowest throughput from lowest numbered nodes to highest numbered nodes, both traffic models would present slightly less congestion on the network as a whole. Note that currently in the art, one path is selected for bi-directional traffic which is the norm for present-day routers by all manufacturers.

If four distinct traffic class routing algorithms are used at each node to select routes, the network, as a whole would improve, because the effects of each class on another class would tend to be minimized. Within a class, however, the basic algorithmic flaw would tend to congest the most connected routes first. Hereinafter, these traffic classes or algorithms will be referred to as base class algorithms. The model developed here can easily identify each traffic class based solely on source and destination addresses. Multi-dimensional route selection algorithms use these four algorithms as the base algorithms for path selection when other information is not available. Therefore, each router should use each of the four algorithms to calculate base class topological routes. These routes should be entered into a table for class based path selection. These table entries are mainly used for class selection when other information is not available.

In order to determine direction within a network, the network must be ordered. Any devices composing the network must have addressing controlled by the network. Currently, each network element has independent control of addressing characteristics. If the network had control over the assignment of network addressing, the assignment could be done to minimize routing costs, simplify lookups, and provide tighter security. Currently, each piece of equipment in a network dictates characteristics to the network. This creates chaos within the network.

Let us assume for discussion, all non-physically constrained characteristics of attached network devices could be assigned by the network. Each host and router would have IP addresses assigned. If this were true, IP addresses could be used to indicate proximity to each other. This would allow determination of relative direction. This would allow orthogonal directional path choices. Orthogonal path choices would provide a mechanism for navigating temporary network topological changes without route recalculations. Only permanent topological change data would need to be propagated to routers.

Figure 5:
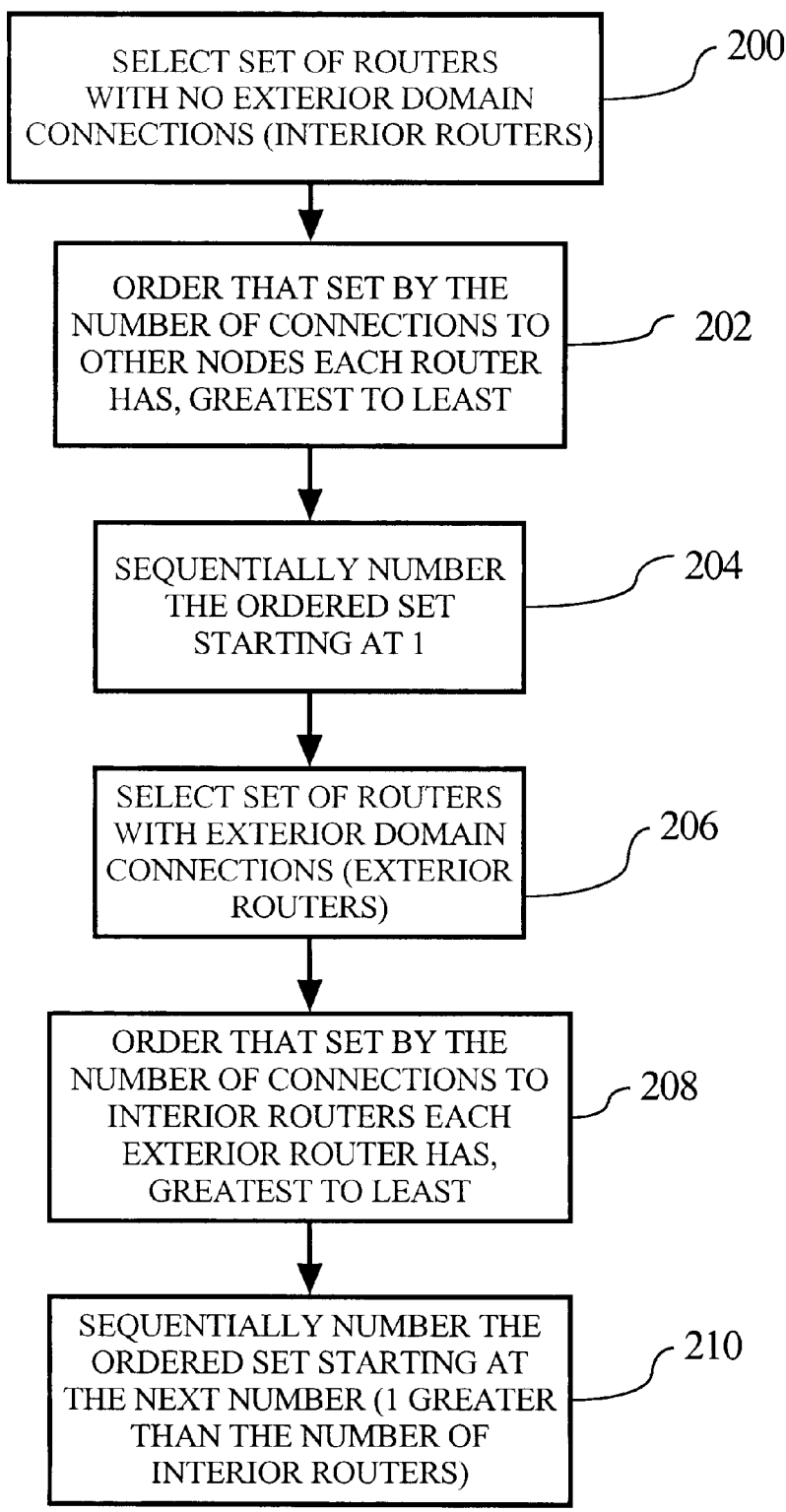
FIG. 5 shows the steps for ordering routers according to the illustrative embodiment of the present invention.

The steps for ordering routers, or Network Entities generally, according to the illustrative embodiment are shown in FIG. 5. First, find the router with the most connections to other routers with no exterior domain connections, step 200 in order to define a "center". If there is more than one router to choose from, check the routers that connect to these routers and see how many connections to center candidate routers the second tier has and pick the router that has the most interior connections. This will be the center node for an Ordered Network. If there are still multiple contenders, check to see which router has the most $3^{rd}$ level interior connections. In counting interior connections, do not count links connected to edge routers. This weights interior links over exterior links. Ordering is shown in step 202 and commences from the center node. If all routers to the edge of the network have been considered, number the remaining candidates from 1, which is center, to the max, N. The numbering of routers or NEs in this illustrative embodiment is from the most connected to the least connected.

Next, find the next most connected router without exterior domain connections from among the routers already numbered and number this router next in sequences. This numbers the router(s) as the most connected interior routers to least connected, step 204. If there are multiple candidates use the same process as above to find the most connected. Continue the process until all routers have been numbered except the routers connected to exterior domains. Again, this is shown in steps 200–204.

Next, the exterior domain connection routers are numbered starting with the router with the most interior domain connections first, followed by the router with the next most interior domain connections, etc., as shown in steps 206–210.

This numbering sequence identifies the most connected interior routers by low numbers followed by the least connected interior routers, and finally the highest numbered routers are exterior domain routers. This number also has the following properties: the lower the number of a router the greater the influence on interior traffic; and conversely the higher the number of a router the greater the influence on transitory traffic. It should be appreciated that the numbering sequence direction is somewhat arbitrary, in that one can instead number from high interior numbers to low exterior numbers. The importance is the sequencing and not the numeric direction of the sequence.

Using this numeric sequencing, traffic is routed according to the four directional base classes. Transitory Traffic 44 is routed through routers selected from the highest numbered routers among the shortest path candidates. Interior to Exterior Directional Traffic 46 is routed from the lowest number to higher number routers among the shortest path candidates. Exterior to Interior Directional Traffic 48 is routed from the highest number to lower number routers among the shortest path candidates. Interior Traffic 42 is routed with routers of relatively equal numeric values from among the shortest path candidates.

From a "black box" approach, each router looks like a box with some connections extending from it. Each connection is connected to multiple computers. If the router can tell the connection the host is connected to by the host number portion of an address, it doesn't need to know a network number to forward data traffic. Any connected host could conceivably be numbered as if it appeared on the same network that is connected to the same router. In addition, since all hosts in a domain are unique regardless of the network they are attached to, the only quantity required to uniquely identify a host would be host number. The routers, however, must know that a specific host is attached to a specific network link. This is required so that if two host are attached to different network links but the same router. The router can correctly forward the data to the other network.

Figure 6:
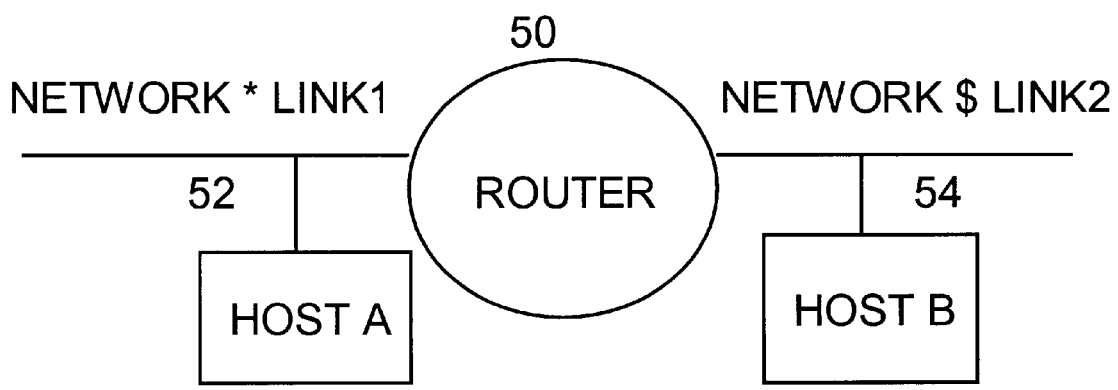
FIG. 6 shows a networking example with a router connecting two separate networks together.

FIG. 6 shows a single router 50 connecting two different networks. For simplicity, all networks on an individual router are identified by a quantity called a link number. For example, network 52 is on link1 and network 54 is on link2. If all hosts are numbered on the lowest numbered link starting with 1 (one) sequentially to the maximum host, it is easy to tell if a host was on link1 by checking the number against the maximum number of hosts on link1, FIG. 7. No additional information would be required to know the host was on link1 but the host number. Similarly, by numbering the hosts on link2 with a numerically higher number than that of link1, sequentially to max hosts on link2, you may uniquely identify hosts on either link1 or link2 by the range that the host number fell into. If this process is continued for all numeric links from 1 to max links on a given router, all hosts on a specific router would fall within a specific host number range for a specific router.

Figure 7:
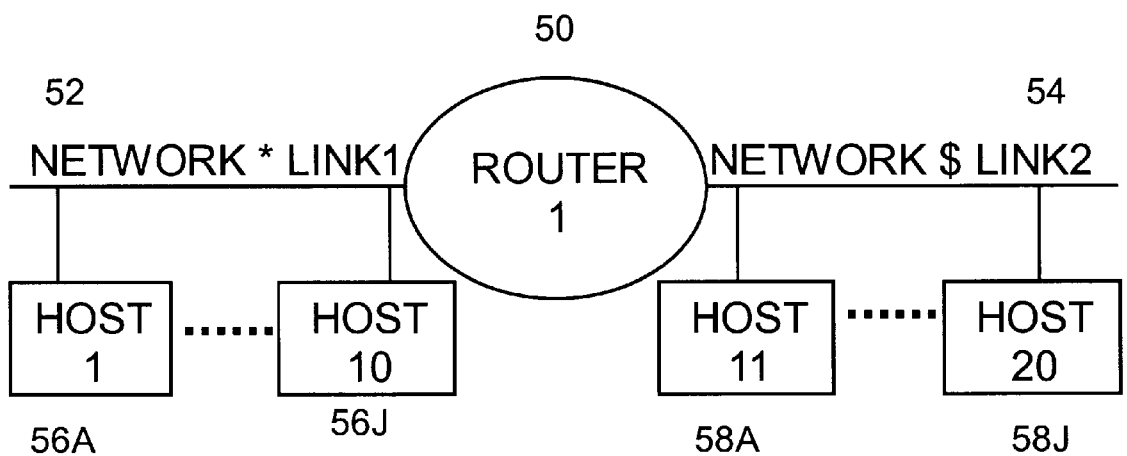
FIG. 7 shows the network example of FIG. 6 with a plurality of hosts on each network.

If router1 50 had a data packet with a specific host number, the range of the number would be enough to uniquely identify the network link to forward the data packet onto, as shown in FIG. 7. If router1 50 has hosts 56 numbered from 1 to total hosts and the next router started numbering hosts on its network links in the same way but with a number numerically greater than router1, it is possible to uniquely identify the router that a specific host is attached to by host number alone. In other words, if hosts on each sequenced router are uniquely numbered such that the hosts on the next router are sequentially numbered higher than the previous router, all hosts, routers, and links (networks) will be uniquely identified by the range that a host number fell into. No other quantity would be required to know identify the network entities associated with a specific host.

Figure 8:
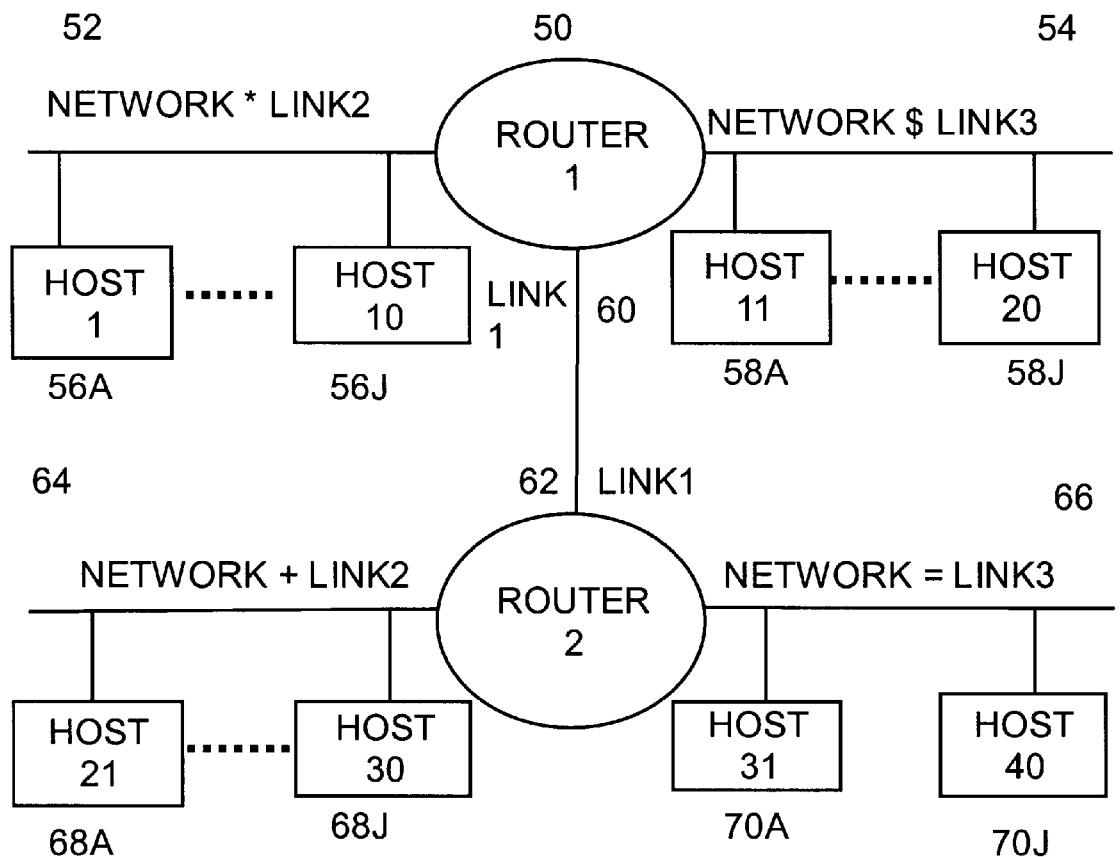
FIG. 8 shows the network example of FIG. 6 connected to a larger network with multiple routers.
Figure 9:
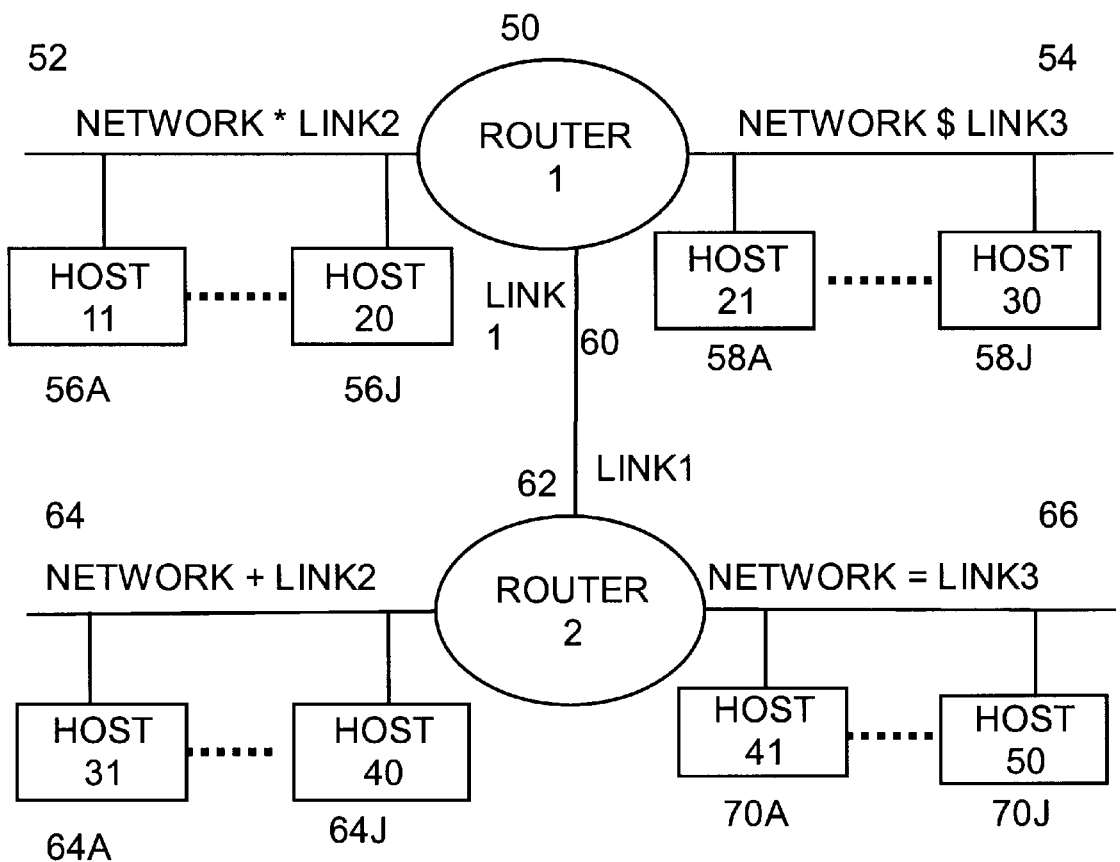
FIG. 9 shows how the network example of FIG. 8 are designated according to the illustrative embodiment of the present invention.

Clearly, with a sequenced and unique host number, all related network entities are easily discerned, as shown in the extended network of FIG. 8. In addition, host and routers need not have different identifiers. If all routers were treated as hosts for the sake of identification within a domain, they could be uniquely numbered before or after the hosts are numbered, as long as the maximum value would uniquely separate the quantities. In keeping with the example of ordering quantities from most influential as lowest numbered, number the routers from 1 to total routers as explained earlier. Numbering of the hosts should begin on the lowest numbered router, at a numeric quantity above the highest router number. The ordering of the hosts is as discussed hereinbefore with respect to routers. This is illustrated in FIG. 9.

This ordering allows unique identification of each entity within a domain by a single identifier, the host number. This means that a specific router has a unique number within the network domain, and that a host has a specific number within the network domain.

Figure 10:
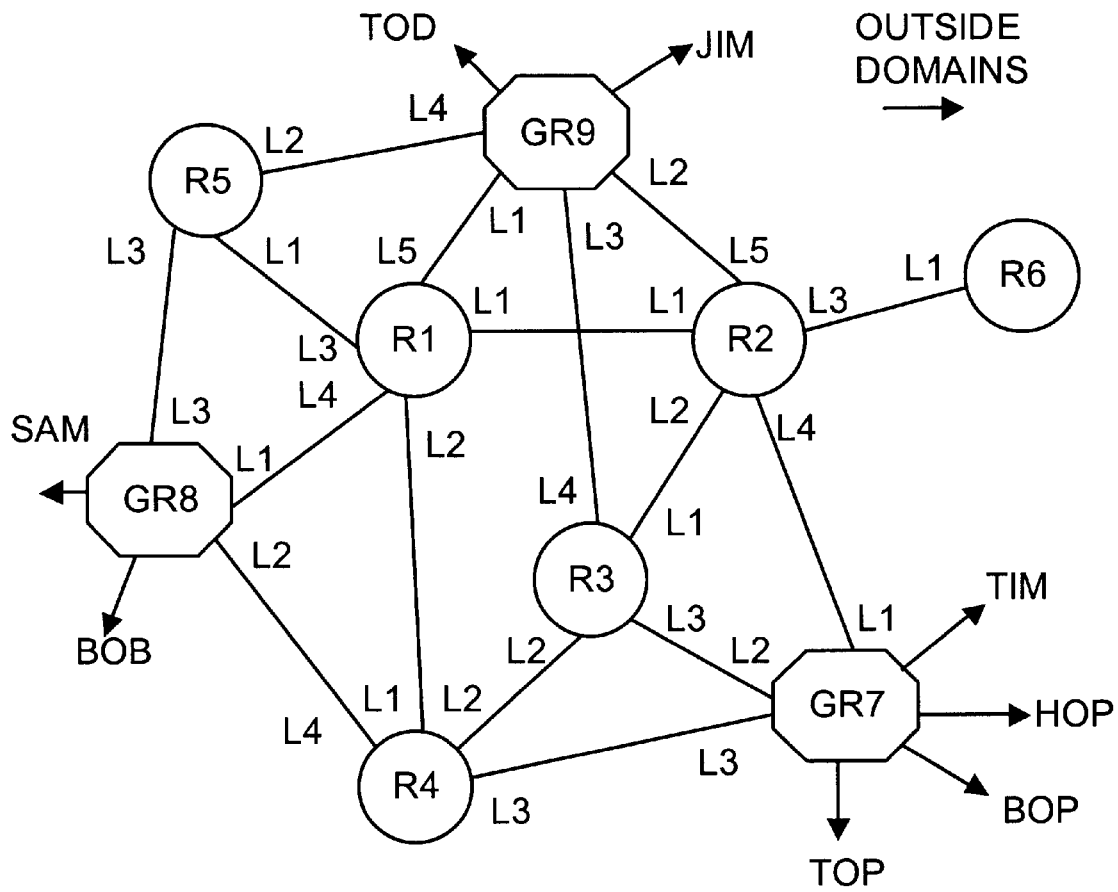
FIG. 10 shows an example network with links designated according to the illustrative embodiment of the present invention.

FIG. 10 shows an example of an ordered network with numbered router links according to the previous described steps. To maintain the selected ordering from most influential as low numbers to least influential as high numbers, on a router order each link connected to other routers first, and then all links connected to hosts only after all router to router links are sequenced. Of the router to router links, start number link1 as the link connected to the lowest numbered node on a specific router. Link2 would be the second lowest numbered connected node, and so on until all router to router links are numbered. Next number the host-only links starting with the next number in sequence after the highest link number. Such host-only link numbering is done starting from the link with the most hosts connected to it, incrementing up to the link with least number of hosts connected to it.

In FIG. 10, each GR# represents a GRACE node, R# is an IP router, and each L# is a network link. Network links are numbered router-relative and not network domain unique. Each arrow is a connection to a domain (either internal or external). Notice the centered characteristic of the lower numbered nodes, as relative addresses according to the invention are constructed.

Detailing the sequencing will help explain orthogonal data traffic classes and the simplified path switching explained in following sections. An auto-configuration algorithm can be implemented in order to facilitate ordered sequencing, as described.

Normal IP addressing, as known in the art, uses absolute, arbitrary, authoritative, and universally unique addressing. Each network connection within any inter-connected network domains has a unique IP address. In addition, each network entity has a unique name as well. Two unique identifiers within a domain of influence are redundant and create configuration complexity. One unique identifier would allow relative domain usage of the other redundant identifier. In other words, since network end stations are uniquely identified by a DNS name entry for a network universe, local domain and all reachable external domains, IP addressing could be made network entity relative instead of fixed. This would require network address translation across domain name space boundaries, but with proper handling relative addressing would simplify addressing within a network domain by significant levels. Equally true, relative IP addressing would be simpler if one addressing portion, the host number was fixed and unique within a domain. Accordingly, the illustrative embodiment implements relative addressing, which uses a standard four octet IP address. However, the present invention is not limited to such address structures.

For inter-domain communication between two pairs of hosts, a domain number and a unique host number are required. Simply put, if each domain within an interconnected network fabric had a unique relative number and each host within the destination domain had a unique identifier, these quantities allow selection of paths to destination domains and end stations. Since the numeric quantity of hosts within a domain is limited and the number of domains within a universe can be made limited, these quantities would allow space for relative path elements within a structure substantially like IP address.

Since the domain number typically has greater influence, the domain numbers are stored within a relative IP address in the higher bits. Since the host number is the last part of the relative IP address that must be constant as the relative IP address passes through network elements, the host number is stored in the lower ordered bits. Here are the fixed address portions of a Ordered Network relative address (effectively using the construct of an IP address): DomainNumber.0.0.HostNumber.

The quantities between the two fixed numbers represent path relative values filled in by the inter-connecting network fabric as the data passes across connecting domains. In reality, even for large networks within highly connected domains, there are enough relative bit positions to allow complex path designations. In the following sections, however, a minimal number of bit positions are required for path selection based on the fact that there are four base classes, i.e. two bit position, and a fixed upper limit to the number of links, usually under 64 numbers, i.e. 6 bit positions, to any individual router.

One unexpected result of this method is that within a domain, the destination domain number is no longer required. In addition, as the data approaches the host, less and less of the path information is required as well. On the final network, only the host number would be required to identify the individual end station, 0.0.0.hostnumber.

One spin-off of relative addressing is that the domain name space services are distributed across network routers to properly translate relative ON addresses between relatively positioned end stations. The relative destination address for a host within a remote domain would resolve through DNS to a different address from a host within the destination host's domain. Two hosts within the same destination domain, with different proximity to the destination host, would resolve to different addresses. The importance is that the relative addresses within the connecting fabric deliver data to the same destination host. Though relative addressing, the performance of forwarding will dramatically outweigh the overhead of fixed changes to (known) IP addresses by connecting network elements. The simplifications to the forwarding table lookups overshadow IP to relative address handling. Even inter-domain address conversion and network address translation to standard IP systems add insignificant performance costs to relative addressing compared to the performance increases of switching vs. routing for forwarding.

With regard to local router forwarding, when data arrives on any network link within an ordered domain for delivery to a host on that link, the local host's IP address is: 0.0.0.hostnumber. This is true for any host on any router on any network link.

The other zero quantities are used to route between hosts within the interior network domain. Once the data gets into a router that the host is attached to, the non-host part is masked away. This means all hosts within a domain appear to IP within the domain as if they were connected to the same physical network.

When data is being routed across network elements the address appearance will vary based on the connectivity of the two quantities. When two hosts on different networks are communicating through an adjoining router, the quantities appear as: 0.0.linknumber.hostnumber. Therefore the lookup for the router has been reduced to a direct index into an ordered array of quantities based on link number for this type of forwarding. This can be implemented in hardware as can the masking of the local IP address. Compatibility with standard IP on the end hosts is assured because to the two end hosts they appear on differing networks. End stations check the destination IP network address for a match with the source host's network to determine if it is a local address or not. If it is local, the hosts communicate together without a router. If the two addresses are different, the end stations send the IP data to their default router. This simplifies router lookup for this type of forwarding.

When data is being routed across two routers as in FIG. 9 an additional number is added to the IP address: 0.baseclasspath.linknumber.hostnumber.

Assume the following ordering of interior domain quantities to simplify the analysis:

Traffic Base Classes are numbered: 1—Interior, 2—Interior to Exterior, 3—Exterior to Interior, 4—Transitory.

There are 10 routers in the domain (only two are shown, 50 and 62), numbered R1 to R10.

Each router has two links, numbered L1 (52 and 64) and L2 (54 and 66).

Each link on each router has 10 hosts:

1. On Router 1 (50) Link 1 (52): hosts are numbered H11 (56*a*) to H20 (56*j*).
2. On Router 1 (50) Link 2 (54): hosts are numbered H21 (58*a*) to H30 (58*j*).
3. On Router 2 (62) Link 1 (64): hosts are numbered H31 (68*a*) to H40 (68*j*).
4. On Router 2 (62) Link 2 (66): hosts are numbered H41 (70*a*) to H50 (70*j*).

5. The same is true for R3 to R10, which are not shown in FIG. 9.

Figure 11:
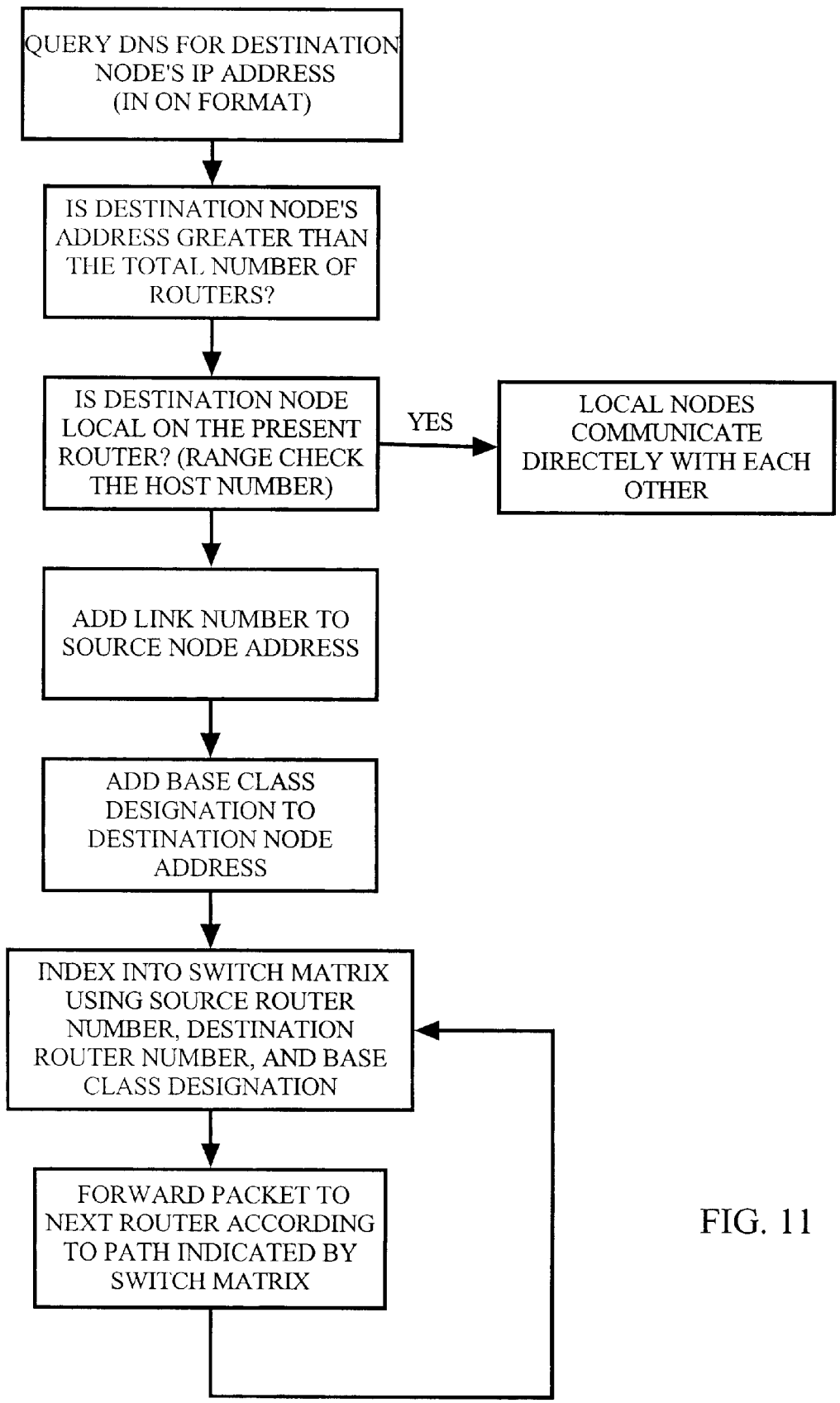
FIG. 11 is a flowchart of the steps performed for routing a package through an ON (Ordered Network) system.
Figure 12:
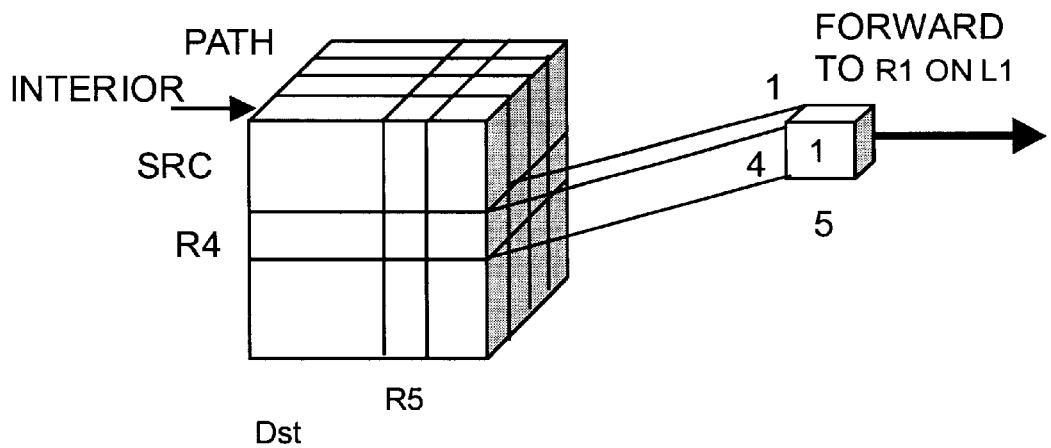
FIG. 12 is a sample three-dimensional matrix for selecting paths according to the illustrative embodiment.
Figure 13:
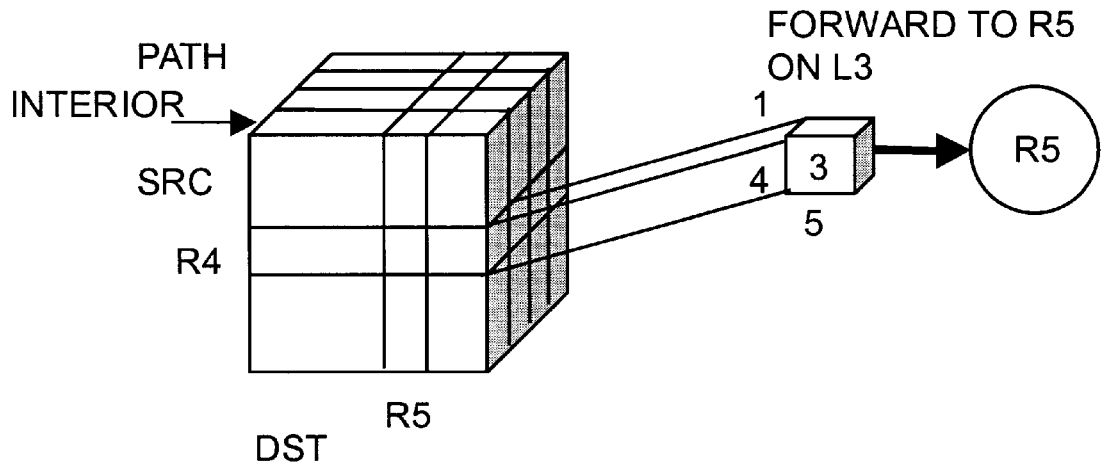
FIG. 13 is another sample three-dimensional matrix for selecting paths according to the illustrative embodiment.
Figure 14:
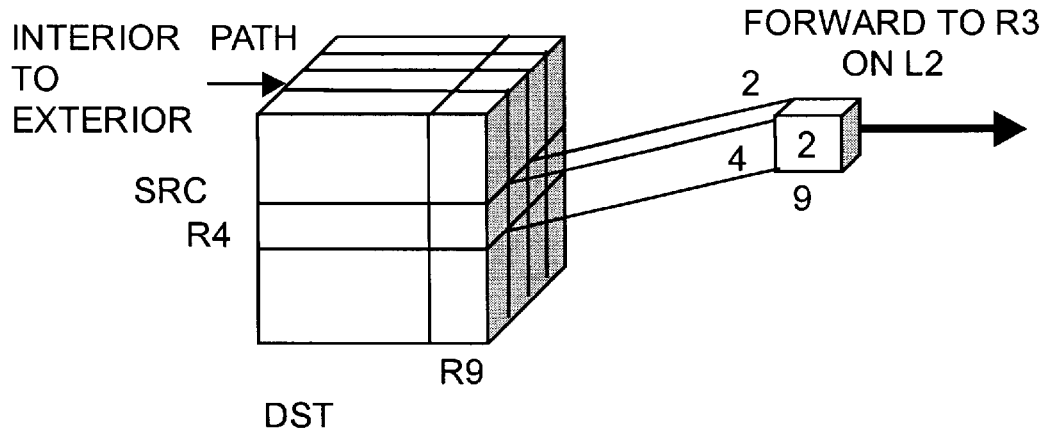
FIG. 14 is another sample three-dimensional matrix for selecting paths according to the illustrative embodiment.
Figure 15:
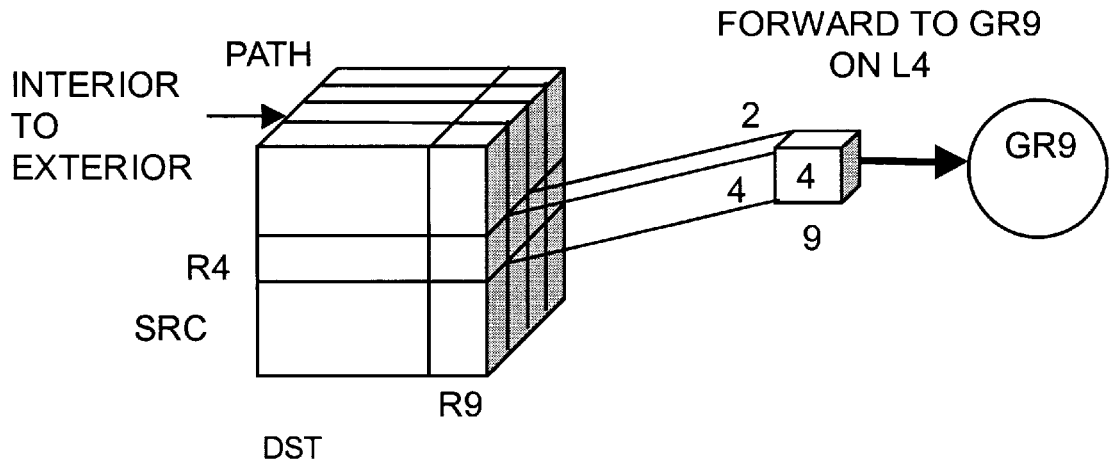
FIG. 15 is yet another sample three-dimensional matrix for selecting paths according to the illustrative embodiment.

The steps for forwarding traffic are outlined in FIG. 11. For this example, Host 11 (56a) needs to communicate with Host 50 (70j). In order to simplify matters for this example, it is assumed Host 11 (56a) queried DNS for Host 50's (70j) IP address, which is 0.0.3.50. Host 11(56a) delivers data destined for Host 50 to Router 1 (50), source address as 0.0.0.11 and destination address as 0.0.3.50. Router 1 (50) first looks at the destination address, host part only, to determine where to send it as follows:

1. Is the destination host number>total routers? This checks to see if the address is a router.
2. Is the destination address local to router 1, range check the host number? Here, it is not, it is destined for a host on another link.
3. Before forwarding, do the following:
    a) Add the Link number quantity to the source IP address, this allows source IP end station address to match the destination IP address for the source host. Therefore the source IP address becomes IP: 0.0.2.11
    b) Since both source and destination addresses are local and interior, the base class for this packet would be Interior. Add to the destination only, the base class designation, and the destination IP address: 0.1.3.50.

Note that once a packet leaves the Router connected to the source host, the packet is forwarded unaltered until it reaches the destination router, where only the non-host part gets masked off prior to local delivery to the destination.

4. The packet is ready for forwarding. Source IP—0.0.2.11, Destination IP—0.1.3.50.
5. Router 1 (50) indexes into a switch matrix using source router number, 1, and destination router number determined algorithmically from the destination host number, 2.
6. The base class is used as a third dimension, path. At the location is the interface number to forward the data based on Interior class shortest path first, link 1 (52). This has been previously filled by a topological path propagation or from router based calculation of base class paths between each node, according to the present invention.
7. Router 2 (62) receives the forwarded data from router 1 (50).
8. Router 2 (62) looks at the destination Host number and determines that it is local on interface (link) 3.
9. Router 2 (62) masks host number field and forwards the data to Host 50 (70j) on interface (link) 3: source—0.0.2.11 and destination—0.0.0.50.

Implementation of these steps is easily reduced to direct indexing into topologically static tables of values described hereinafter with reference to path switch matrices. This results in significant levels of efficiencies over current implementations of routers. One reason for this efficiency is the address directly indexes to the forwarding link rather than requiring walking unordered forwarding tables.

If the example had intermediate routers, these routers would use source and destination host numbers to determine source and destination routers. Then source router number, destination router number, and base class path class would be used as direct indexes into an array to determine the interface to forward the data packet on. This is a direct delivery. The array is different at every node in the path and can be thought of as a directional topological map of the internal domain. This array changes only on permanent topological changes.

According to the present invention, all external communication from a local domain to an external domain occurs within edge routers. In order to interface with external domains using previous protocols, network address translation is added to handle communication to and from the outside world. In this section, the elements of the internal IP address representation to forward to a correct edge router will be considered without examining the details of edge router address translation. The address translation is detailed hereinafter.

Each instance of an exterior domain exit point is sequenced. As with all other quantities, the sequencing is from most influential to least influential. Then select the edge routers with the internal connections, lowest numbered, and count the number of links that connect to outside domains. Number these sequentially 1 to last on the node. Move to the second most internally connected edge router and number each exterior link starting at a number greater than the previous node. Continue until all edge routers have been numbered.

When an interior node is in communication with an exterior node, the internal ON address appears as: Domain-Number.baseclasspath.linknumber.hostnumber.

The GR nodes in FIG. 10 would have domain numbers as follows:

GR7: tim—1, hop—2, bop—3, top—4.
GR8: sam—5, bob—6.
GR9: tod—7, jim—8.

If transitory class data was moving from domain tim to domain jim, the IP addresses would look like: Source—1.4.1.temphostnumtim, Destination—8.4.2.temphostnumjim. The temphost numbers are assigned by the domain map server, and are used for translation.

It should be appreciated that if an exterior path selection server were deployed in the network to monitor data flow and connection levels within the network, additional paths could be temporarily loaded into the topological arrays of each node to handle quality of service issues and network congestion.

Path Switch Matrix

An illustrative embodiment for ordered domain routing is implemented using a path switch matrix that is populated with multiple network topological paths for all routers within a domain. This path switch matrix is reloaded for permanent topological changes only. Temporary topological changes (such as down routers) simply requires path choices to circumvent problems, alternate paths are already loaded into each path switch matrix. Permanent topological changes would propagate from the interior most router to the exterior most router.

The interior router's path switch matrices could be loaded in many ways. A computer within the network could be used to store topological information and create media, flash memory, disk files, etc. whenever a change was required within the network. Alternatively, a computer could be used as an external path server and propagate path data to each node using the distribution algorithm detailed herein.

The routers may run a standard interior gateway protocol with the base class variants described to populate the switch matrixes locally. This choice most closely integrates with the previous networking model, however it may not be optimal.

In the illustrative embodiment, every node is loaded with a path switch matrix. Each path switch matrix is loaded with different data and represents a topological map of the entire domain from each router's perspective. One axis represents the source host's connecting router. Another axis represents the destination host's connecting router. The path axis represents four base class algorithmic paths, and potentially optional paths selected for specific traffic by an exterior path selection server. The element stored in the data selected by the three dimensions is the link interface number on the current router that the data should be forwarded onto. The source axis is determined by the source host number, range checked to determine the source router. The destination axis is determined by the destination host number and, range checked to determine the destination router. The path is determined from the path portion of the destination address.

As an example for this process, a procedure will be discussed to choose routes that would be made through path matrices for communication between a host on R4 and a host on R5, FIG. 10, via an interior base class route. Followed by, an interior to exterior base class route from a host on R4 to domain, tod, through GR9.

The shortest paths between R4 and R5 are: R4,L1 to R1,L3 to R5, and R4,L4 to GR8,L3 to R5.

The shortest paths between R4 and GR9 are: R4, L1 to R1 ,L6 to GR9, and R4, L2, to R3, L4 to GR9.

One path choice between the two different destination pairs would go through node R1. Using normal shortest path, this path would be selected by both destination pairs. But because of base class algorithmic differences the interior to exterior class selects shortest path with higher numbered nodes and interior class selects shortest path with lower numbered nodes.

The R4 to R5 would have selected path R4,L1 to R1, L3 to RS.

The R4 to GR8 would have selected path, R4, L2, to R3, L4 to GR9.

This example illustrates that base classes tend to balance load distribution better than non-directional path selection. FIGS. 12–15 show how the switch matrix, source and destination routers, and base classes are populated to facilitate this path selection capability. Both paths are shown with the path switch matrix populated for each node. The switch matrix uses the three indexes to quickly select the proper link for forwarding.

Included in Appendix A is an example analysis of the network shown in FIG. 10 according to the illustrative embodiment, along with the resulting PSM (path switch matrix) for each node. Typically, on any switch, there would be three empty positions in the PSM for each of the other classes. This is due to the orthogonality of the traffic classes. These unnecessary PSM locations handle temporary re-routing around failed links. These extra path choices provide pre-stored information that re-routes data around temporary link failures. This is also why the path switch matrix has three dimensions, without knowing the original source entry point in a network, a switch could not determine that data entered a node on an orthogonal path and route that data accordingly. The source and destination pair in combination with the PSM entry indicates an orthogonal path or a directed path. When on an orthogonal path, the path switch matrix at the orthogonal node for the source and destination address would have a zero in it. The link that entered the orthogonal node provides the switch with the information necessary to select a forwarding path toward the original path. Once the data re-acquires the directed path, the original source and destination addresses provide indexes into the PSM as detailed.

Alternatively, the path switch matrix could be loaded with optional paths in addition to the base class paths. The optional paths would allow selection based on different quality of service (QOS) types. If the optional paths are populated dynamically, these paths could be used with an exterior path selection node to dynamically load balance routes. In addition, unlike traditional routing protocols, all routers and paths are used regardless of redundancy or parallel loading.

Memory required by the matrix is minimal compared to the code size of standard protocols as the following table demonstrates.

TABLE 1

Memory required by path switch matrix according to the present invention.

| Number of Routers | Total memory (4 Base class Paths) | Total memory (4 Base + 10 optional): |
|---|---|---|
| 100 | 40K bytes | 400K bytes |
| 250 | 250K bytes | 2.5 M bytes |
| 1000 | 1 M bytes | 10 M bytes |
| 2500 | 25 M bytes | 250 M bytes |

In addition, networks can be expanded by adding connected domains, this would allow expansion without increasing the memory at every router when capacity within an area is reached.

The requirements for using a universal route distribution algorithm are: Each link address must be configurable under the control of software or hardware but not arbitrarily fixed. Current "Established protocols" require fixed and arbitrary addressing assigned not to facilitate routing but under control of an authority.

Each router node must have a unique identifier that can be controlled by software in a sequential way: node1, node2, node3, etc. node-number=1, node-number=2 etc.

Each router node must be capable of responding to a ring packet from the source node on one of the destination node's links to the source. There must be an inbound and an outbound path capable of reaching the source. Bi-directional communication over the same link is NOT required. This allows for unbalanced loading.

Each router's lowest level code should process responses and be capable of getting into the driver queue ahead of any data not already in the process of being transmitted. This is essential to get the most simplicity in implementation. If the ring/ring response sequence is effected by queued data, the "normal data flow status" capability will be limited.

The characteristics of the universal route distribution algorithm according to the present invention include:

Determines routes using a ring/ring response sequence and no other protocol.

All topological routes are determined including duplicates and unidirectional paths.

Only topological changes require auto-configure and base route distribution.

Multiple paths between source and destination should be maintained.

Broadcast is not used for the distribution of routes between nodes. All communications are directed. This reduces the amount of unnecessary information and only differences from existing information are delivered.

Topological state changes are not handled by the same mechanism as topological changes. Topological state changes disable selection of certain routes with a set of routes at each node. Topological state changes must be populated throughout the network in a coordinated way that does not create unnecessary packets, provide node route calculation as soon as possible, and does not rely on broadcast. There are various methods of distributing topological state information to routers. These methods suffer from the same basic drawbacks. If two routers detect topological state changes in neighbors in differing parts of a network, topological state information may be incorrectly gathered because of collisions of state packets. These are caused by the fact that the topological state changes are broadcast and because each node is then responsible for recalculating only one possible path between any two nodes. If each node maintained multiple sets of paths for each source and destination that used differing links, when a link went down somewhere else in the net, all that the node would need to know would be the effected paths. The node would disable those paths and route data to an accessible path from its list of predetermined sets of paths. In addition, if the link change was a transient condition, when the link came back up, the previous known paths could be re-enabled without re-calculation of the route from scratch. Permanent changes in topology only would necessitate redistribution of topological state information and recalculation of routes. Finally, if the problem of recalculation of routes is limited to topological changes and not transient link changes as well, there is less of a pressing need to disseminate the information quickly. A method of disseminating the topological change that guarantees no link state packet collisions would work for all conditions.

Since this model of the network has a predetermined structure designated from greatest connecting, interior node, out to the most remote and least connected node, a coordinated method of disseminating topologic change information can be used. Neither previous invalid routes should be used nor should unnecessary packets be generated. Understanding this algorithm is easier by looking at how initial routing information would be populated by a newly installed network. The more general case of disseminating permanent topological changes for addition/deletions of hosts, routers, and links on an existing network will be more straightforward.

All topological state models determine the nodes across a link on a particular node by ringing that interface and getting a response that identifies the router on that link, in this case by router number. This is done for each interface on a node. The set of links and associated nodes pairs for a specific node will be called a linkset. A linkset is a complete collection of link-node pairs associated with a particular node.

Figure 16:
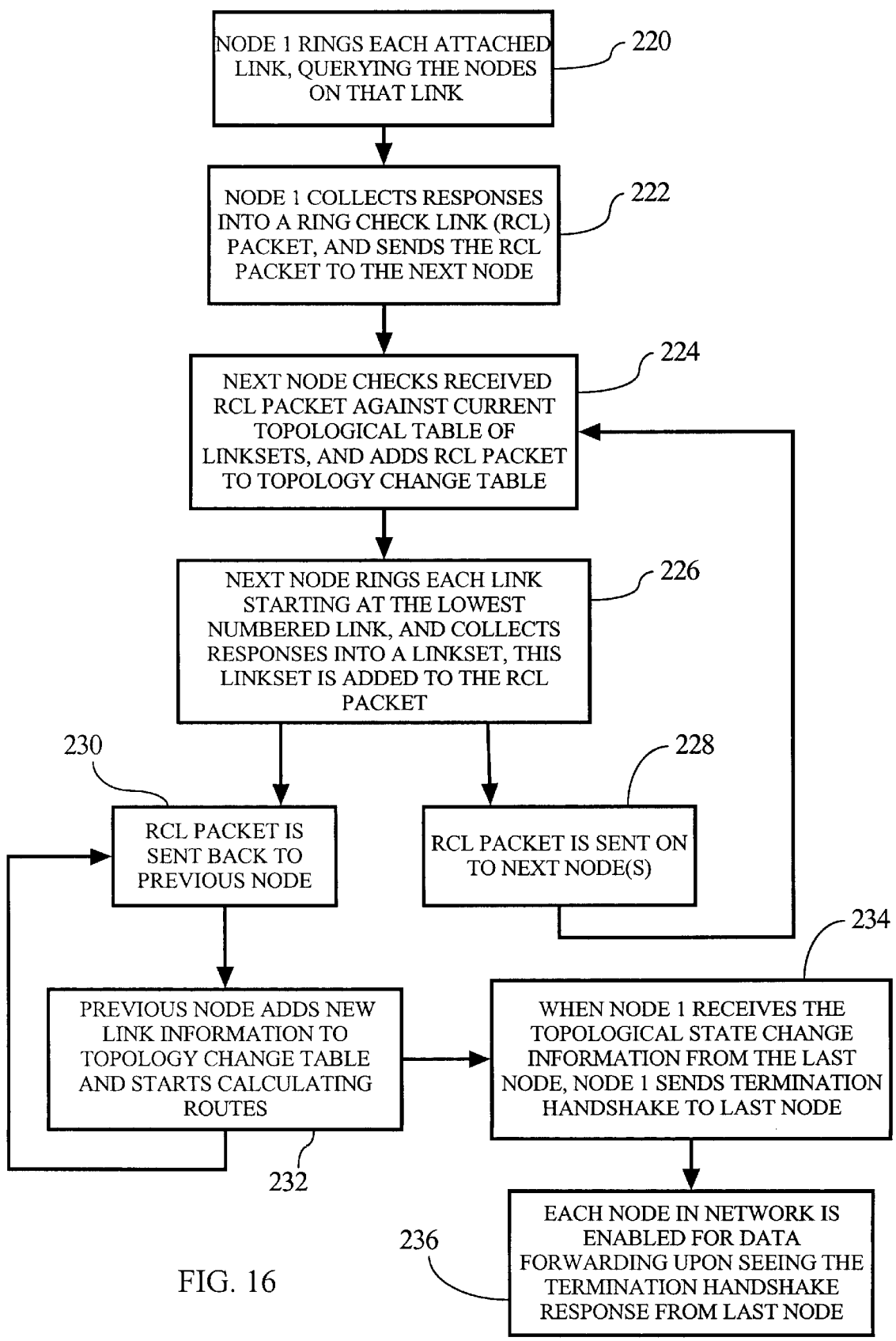
FIG. 16 is a flowchart of propagating node updating according to the present invention.

In an example of a network being started from scratch, no topological data is known. On node 1, each link is rung querying the node(s) on the other side of the link, step 220 FIG. 16. These responses are collected into a "ring check links" packet and directed to node 2, step 222. Node 2 checks the contents of the "ring check links" packet from node 1 against a current topology table of linksets, step 224. Since there are no previous linksets (startup condition), node 2 adds the link set to the topology change table and sees if there are any routes that can be calculated.

Node 2 now rings each individual interface starting with the lowest numbered link to the highest numbered link and assembles this data into a linkset, step 226. This linkset is added to the "ring check links" packet and the packet is directed back to node 1, step 230, and forwarded to node 3, step 228. Node 1 adds the new link information to node 1's topology change table and starts calculating routes, step 232. At the same time node 2 is doing the same thing and node 3 is ringing each of node 3's interfaces, step 226. Clearly, as this continues each node is progressively populated with new link information allowing each node to calculate routes as soon as possible, step 232. In addition, since all routes propagate from the same point in different directions there are no possibilities of topological state packet collisions. Finally, when the last node is reached, the "ring check links" packet is sent back through each node to node 1 (steps 230 and 232). This allows node 1 to verify that all links were traversed and all responses were properly determined, step 234. The last packet must have an entry with a linkset for each router node in the network. In addition, if any node gets a later "ring check links" packet with data that it may have missed during an earlier propagation, all new routes should be added in a sorted way based on the first node to the last node numerically.

This technique generates more packets than it needs to for two reasons. It allows each node to begin route calculations as early as possible and it minimizes the handshaking between each node because missed packet information is echoed in later packets. In addition, it does not require broadcast or multicast to be available on any link. When node 1 receives the topological state change packet from the last node, node 1 sends a "ring check links done" message directed to the last node, step 234. The last node is set up to repeat the last packet until node 1 sends this termination handshake. In addition, when the last node reflects the final "ring check links" packet back to node 1, each node upon receipt enables data forwarding on its interfaces, step 236. Nodes are initialized in three stages, control data only enabled, interior and control data enabled, and exterior and all data traffic enabled.

This sequence assures that all routes are populated with basic routes at the same time. This method has additional benefits when applying topological changes to an operational network. It minimizes the number of nodes operating on old topological data and maximizes the number of paths that will be populated with correct data. It also allows independent routing among old nodes and new topological nodes for the longest possible time.

In order to understand why there are several advantages to creeping topological state for propagating topological changes on an operational network, it is helpful to examine three classes of network traffic. They are interior traffic 42, FIG. 4, with source and destination terminating locally, transitory traffic 44 (starting outside and ending outside the local domain), and inter-domain terminated traffic 46, 48 that terminates in the local network at one end (source or destination).

The most effective routes selected for transitory traffic 44 would travel the edges of a domain between nodes that connect directly to other outside domains. This would allow interior network load to have little effect on transitory traffic and more importantly, the transitory traffic would have little effect on internal traffic, for example local NFS systems used only by internal hosts. Equally true, an intelligent network manager would connect public Web servers closer to the external domain edge routers, while internal web servers and disk servers would be connected closer to the interior with the greatest number of possible path combinations. This would minimize congestion on any link.

The effects of the inside to outside, progressive propagation of topological changes tends to have the least effect on the two greatest, i.e. highest volume, classes of data traffic, transitory and internal, when proper traffic based route selection algorithms are used. Since the interior nodes process the changes first, internal nodes will be the quickest to update their routes allowing communication of interior traffic 42 to begin earliest in time. The edges will detect the changes last but represent the data of least concern to a particular local domain, the transitory traffic 46, 48. Transit data should normally travel around the edges of the domain anyway. The most effected group would be those connections to and from the outside world and the local domain. By picking a time when people are less likely to be on the network, trying to communicate with the outside world, this impact will be negligible. This updating system guarantees a functional network.

The main difference in how the system and method of the present invention works on an operational network is that, the "ring check links" packet is originally populated with the previous topology of the network by node 1. As the check packet propagates from node to node, the linkset of the associated node is compared to the actual nodes topology. When there is a detected difference the entry is replaced and the packet is reflected back to the last node, who reflects it back to the node 1, until node 1 gets the packet. Thus, only changes propagate back from the point of change to the core of the network. This allows each router in between to begin calculating new routes as soon as possible. In addition, since the forward direction is doing a "compare and forward", the method moves quickly until a topological change is encountered.

If a router is added, the router will get a new node number that is a duplicate of an existing router. In order to minimize the impact, all interfaces on the new router are disabled. This will ensure that none of the interior nodes will attempt to route data to the node. As a "topology change complete" packet progresses toward the edge of the network, each renumbered router will have all interfaces disabled until the end is reached. When the packet is reflected back by the last router towards node 1, each node now properly numbered and topology tables updated will be re-enabled. This occurs progressively from outside to inside. Note that interior nodes not affected by the change can still communicate.

When links are added, the new links are disabled as well, but the renumbered links are enabled as soon as the duplicate link has been changed as sensed from the reflected "ring check links" packet. This minimizes the effect of additions, until the change is fully propagated. Deletions are far easier. If a link is deleted from a node, a disable packet is broadcast. This effectively, causes all paths using the link to be bypassed at each node. As the "ring check links" (RCL) packet progresses to a node causing another interface to be renumbered, that interface is disabled. Now as the reflected "ring check links" packets are received by a node that has a previously disabled interface caused by renumbering, that interface is re-enabled and each successive node processing "ring check links" packet enables the interface. This effectively prevents outer node traffic that is aware only of the old topology from delivering data on any renumbered interface until the topological change has fully propagated, while inside nodes, aware of the change can route data to other interior hosts also aware of the change.

Clearly, since two topologies are operational at the same time on one network domain, traffic will occasionally, route across a topological change boundary. This traffic should be dropped. There are several things a network administrator can do to minimize this. First, the network administrator should announce that a topological change will take place and that no connections into or out of the domain will be allowed, since this traffic class will cause the largest number of cross topology data packets. The network manager can even prevent this traffic, by disabling all interfaces associated with outside domains on GRACE nodes. Adding links and nodes will have almost no impact on the network as a whole, while adding nodes causes disruption from the new node outward. Nodes should be added only at specific times with minimum traffic. In addition, nodes can be propagated and added before they are actually installed. This has the effect of propagating node information to the routing tables and then having entries that rely on the missing node, disabled. This approach has the least effect on an operational network.

Integrating Ordered Network Domains

Figure 17:
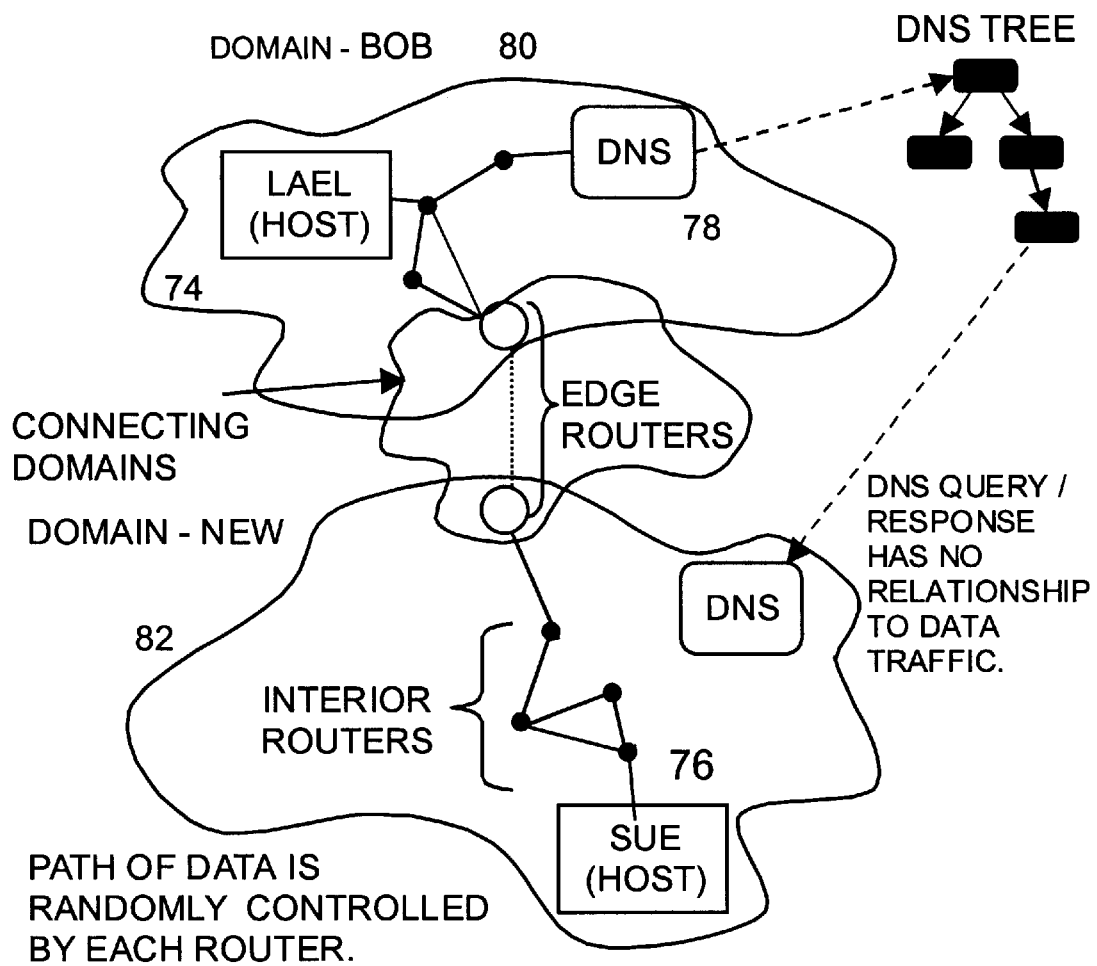
FIG. 17 illustrates standard IP Inter-domain communication elements.

The ordered domain model presented here is in contrast to the accepted IP network "cloud" model. The network "cloud," connectionless model creates more problems than it solves. FIG. 17 depicts the standard connectionless model elements for inter-domain communication.

In reality, there are spectrums of communications that can be broadly classified as tightly coupled communication and loosely coupled communications. Loosely coupled communication means the data exchange has fewer restrictions on participant communications and medium. Restriction types vary, for example: data acknowledgments, data flow characteristics, termination methods, active or passive participation, and other participants may be restricted. Tightly coupled communication is the classic TCP model, all aspects of communications between end points are defined and closely controlled. Both types, however, are connection oriented with the primary difference being the restrictions imposed on the communication participants, the medium, and the paths of data traffic. FIG. 17 depicts the loosely coupled network centered model which is the subject matter for the present invention.

The first function called by a program to begin communication is an acknowledgment of the connection oriented nature within the IP model. As known in the art, every program calls GetHostByName, this becomes a query/response sequence, establishing a source location's interest in communicating with a destination location. It is actually the limit of loosely coupled communications. Knowing the person on the other end is the bare minimum needed for two party communications. For group communication, this is not even required, only that someone out there wants to hear the communicator.

In FIG. 17, the host Lael 74 would attempt to communicate with host Sue 76 by querying DNS 78 for Sue's IP address. Because standard DNS 78 is floating within a domain rather than physically attached to network elements within the domain, nothing about paths or connectivity can be gleaned from the initial communication between domain BOB 80 and domain NEW 82 from this inter-domain exchange. If the DNS functionality were coupled to edge routers at each exterior domain connection, the DNS query could physically travel down multiple paths as it does for standard DNS. For standard DNS, however, the path is absolute from an arbitrary root node rather than egocentric from the domain of interest. If the query were sent out each edge router of the domain to determine relative paths to the destination domain, the DNS query could provide information about relative paths as well as absolute address translation. Each path that detects a unique connection to the destination domain could be used for data traffic as well. If there were multiple paths through different edge routers to the remote domain, selection of paths could be based on Quality of Service, QOS, criteria or available bandwidth.

Clearly, the initial DNS query represents a source domain/host's intention to communicate with a remote domain/host. This is the essence of loosely coupled communication. The limiting problem with standard DNS is that no physical relationship between the DNS server and the domain it serves relating to path selection is available. This limits network capacity to pre-determined end to end domain paths across adjoining network entities. Physically implementing DNS at edge routers makes domain resolution relative rather than absolute. Both instances of DNS, however, could peacefully co-exist without modification to end station IP software. Relative DNS domain paths and absolute DNS domain paths are interchangeable. In the real world, local mail, regional mail, and international mail do not necessarily always travel the same postal paths to get to their destinations. As long as the relative paths resolve to the same value as the absolute paths, harmony is assured. The standard model represents the limiting case, the relative path model represents the general case.

Figure 18:
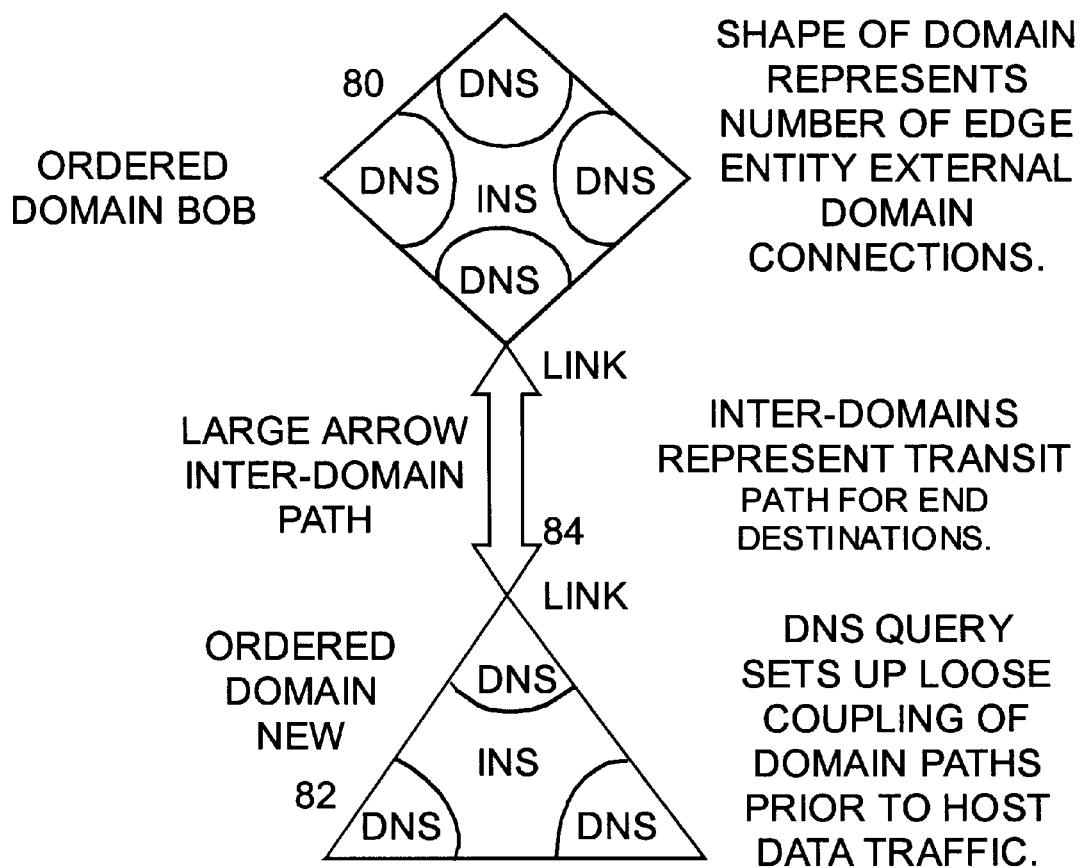
FIG. 18 illustrates a loosely coupled, network centered, inter-domain communication model according to the present invention.

In FIG. 18, an ordered, network centered, inter-domain network model, according to the invention, is presented. Within the source domain, interior routers provide both forwarding and INS name to relative IP address translation. The initial DNS query from the source domain to the destination domain loosely establishes multiple paths between the destination domain and the source domain. For ordered domains, the DNS query would return sets of paths between the two destinations as well as the absolute reference of standard DNS. This allows the source network or even the source end station to select the optimum path for the characteristics required by its communication application. Ordered networks using a relative version of DNS allows the source network entities control over network resource utilization by selecting a path. In addition, a distributed data base of each connecting element within a path is maintained and may be queried to determine dynamic path condition along any path between the source and destination domains. The large arrow 84 represents the inter-domain paths between the source and destination domains. Unlike the standard model, once the DNS query sequence has been established, each router between source and destination has been determined. The DNS query sequence aids in establishing inter-domain routes. This has the effect of recognizing that the DNS query sequence is actually a form of loose inter-domain coupling that is ignored in the standard connectionless model.

Within either source or destination end domains, the processing of data traffic relies on network quantity ordering and switching to deliver traffic from edge routers to host connected routers. The INS routers perform relative IP address manipulation within the interior namespace. At domain boundaries, the edge routers translate INS relative paths into inter-domain relative addresses. All transit routers within the network interrogate the packet and perform direct indexed delivery.

Figure 19:
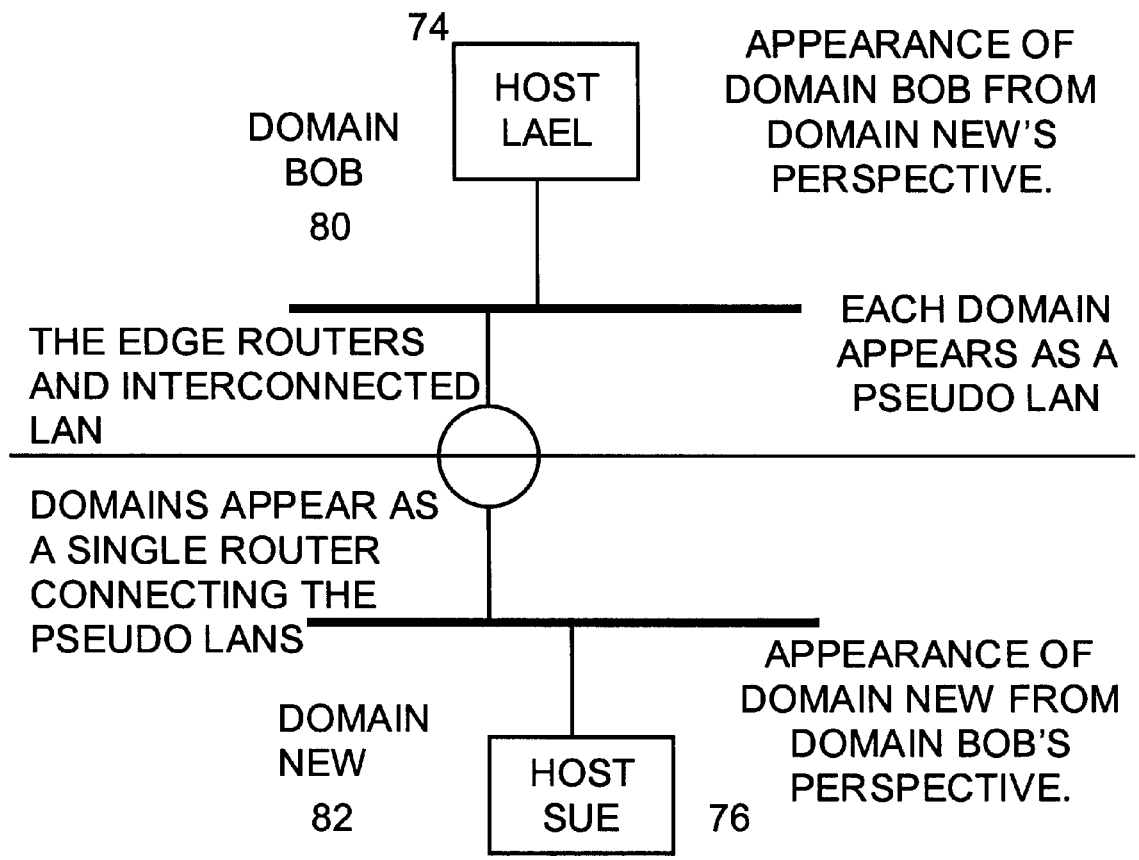
FIG. 19 illustrates a relative appearance of ordered domains according to the present invention

Because relative IP addressing modifies the apparent address of traffic data, the physical appearance of a domain is relative rather than permanent. In standard IP, each network looks like a cloud because the path choices are randomly distributed across all connecting routers between two destinations and all IP addresses are permanent. With relative addressing, the network appearance changes with the perspective of the observer. For example, on the source host, the connection from host to destination looks as depicted in FIG. 19

Figure 20:
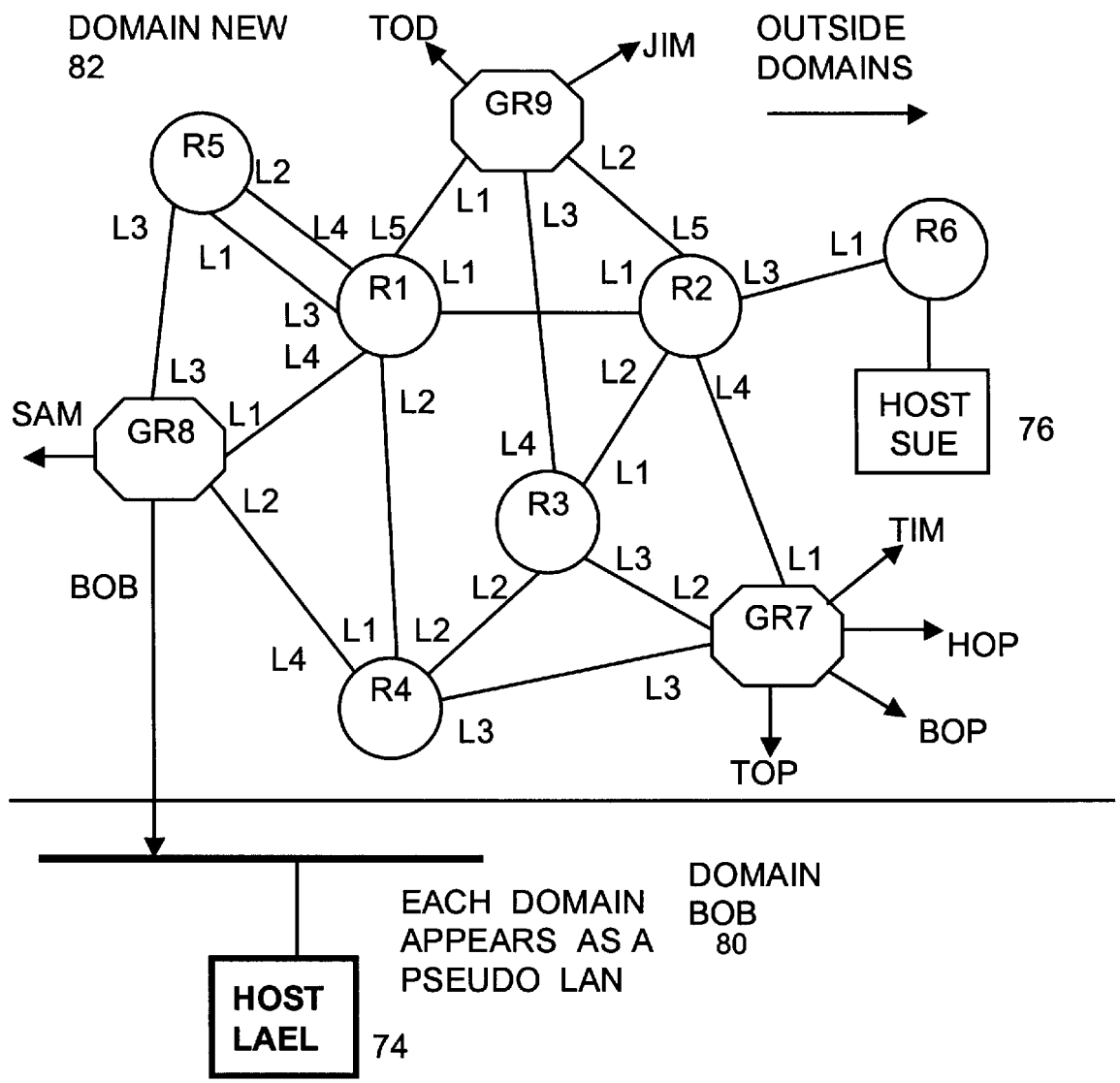
FIG. 20 illustrates a perspective of another domain, from Domain NEW.

The destination host has the same perspective of the source host's domain. Each domain however, sees its own complexity. FIG. 20 depicts an interior perspective of domain NEW 82 coupled with the apparent perspective of domain BOB 80.

The Domain Name Server (DNS) must integrate with the ordered model to co-exist with the standard IP model. The standard IP model for DNS as a floating server loosely connected to a domain must be made more physical. In addition, the standard IP world is strongly entrenched in permanent IP addressing and the ordered domain uses relative addressing to simplify routing. Thus there must be a translation of the Interior Name Space (INS) with the exterior Domain Name Space. Finally, exterior domains rely on standard routers to move data, these ordered domains require no routing protocols at all. This difference must be bridged. The following list summarizes the functionality required for domain integration:

IP's connectionless model must work with the loosely coupled connection oriented model of the ordered domain.

Standard Domain Name Servers must become physical rather than floating within a domain.

Interior network addresses must be translated into standard IP (Internet) addresses.

Ordered domains without routing protocols must be integrated with exterior domains requiring them.

IP Connectionless Model: an Instance of a Loosely Coupled Network Model

The standard IP connectionless, router centered, network model actually maps easily into this new "ordered network" model once the elements of IP that perform the connection establishment are identified.

Before any two IP hosts may begin communication, the two hosts must determine each other's identity within the network,— i.e. each others IP address. A program on either host calls an application program interface to the domain name server client, GetHostByName, with the hostname and domain of the other host. This translates to a query/response sequence to domain name servers that eventually translates into the IP address of the remote host. This sequence may be idled locally or it may be sent by the local DNS services to the remote domain of the remote host for resolution. The reason for the delivery to the remote DNS system is that only the remote domain knows the physical characteristics, including IP address, of that domain's hosts. If a local host had previously sought the name to address translation, the local DNS may respond with previously stored data. However, in either case, the local DNS server's query was previously delivered to the remote DNS system, to provide the local domain with the remote systems IP address. This "end to end" exchange is the essence of establishing a loosely coupled communication mechanism. The difference between this model and the standard IP model, is that other connection requirements will be tentatively established during this connection setup in addition to IP address, for example, inter-domain path selection and interior to exterior router path selection within the remote domain.

This new ordered network model replaces the connectionless IP model with a network centered, loosely coupled connection oriented model, as described hereinbefore. This model is based on map resolution of "end to end" paths from source to destination. The map resolution has two components, interior domain destination map resolution, and inter-domain map resolution. Thus far, the details of the interior domain map resolution for local interior host communication have been addressed. Communication with outside host must be handled within the model to make this model's usage practical. Three forms of communication that must be mapped into this model, include:

1. Outside domain transiting data through the local domain to another outside domain, transitory traffic 44.

2. Local host sending traffic to a host at a remote domain. (interior to exterior traffic)

3. Remote domain host sending traffic to a local host. (exterior to interior traffic?)

Unlike the cloud model, this model assumes that every aspect of the local network is well known. Only the information connecting the outside world to the inside domain may not be known. By looking at each of outside domain communication paths, it can be determined what local characteristics must be known to handle the exterior data traffic from within the local domain.

To handle transitory traffic, the local edge router closest to the source domain must be known and the edge route closest to the destination domain must be known. No local host numbers are required. Nothing but a path between the local domain edge routers is required to deliver data across the local domain. The following presents a summary of transitory traffic requirements for the local domain:

- Source domain's closest local edge router must be known. This requires knowledge of a domain map at edge routers.
- Destination domain's closest local edge router must be determined. This requires knowledge of a domain map at edge routers.
- Path from source edge router to destination edge router must be selected. This uses a source and destination edge routers and transitory class path index.
- No information about source and destination host is required.
- The IP source and destination network addresses must be in each IP packet when the edge router forwards the packet out of the domain. Address translation from interior temporary transit addresses must be translated to valid IP addresses for standard IP.

The interior domain is mapped into a standard router at the edge routers to translate this interior model to the standard IP model. Because the existence or even the need of an inter-domain mapping function does not exist, this type of traffic must map into existing methods. Once inter-domain mapping becomes a normal approach to transitional domain path resolution, a simplified method of handling transitory traffic is possible. Extensions for inter-domain communications are required if connecting domains use this ordered network model.

For a local host sending traffic to a remote host in another domain, the local host needs to know the local edge router with the closest connection to the remote domain. A path between the local host's connected router to the edge router closest to the remote domain must be chosen. The local source host number must be translated into a valid IP address at the edge router. The destination IP host address must be correct in the packet forwarded by the edge router. A local interior representation of the destination IP address must be chosen to facilitate routing from the local host to the destination edge router. A summary of local source and remote destination traffic requirements for the local domain are:

- Destination domain's closest local edge router must be known.
- A local representation for the remote IP address must be used on interior addresses.
- Path from local source host's router to destination edge router must be selected.
- The IP source host must be translated into a valid IP address for the edge router to forward.
- The remote host IP network address must be in the packet for the edge router to forward.

For a host in a remote domain, sending traffic to a local host, the edge router closest to the remote domain is easily identified by the point of entry of the remote host data to the local domain. A path between the edge router and the local host must be selected. An internal representation for the remote host based on host number must be used for interior path determination. The local host's exterior IP address must be translated into an interior host number representation. The following provides a summary of remote source to local destination traffic requirements for the local domain:

- Representation for the remote IP address to local host number must take place.
- The local destination host's exterior IP address must be translated into a local host number.
- The internal path between edge router and destination local router must be determined.

In order to take advantage of the Domain Name Server (DNS) connection initiation characteristics, an instance of DNS, as known in the art, must exist at each edge router. This instance will actually be broken into two coupled versions of DNS representing a view of the exterior domain representations and a view of the interior domain representations of hosts and switches. The following sections will attempt to clarify how these DNS instances provide interior and exterior address mapping and domain resolution. The interior instance represents name space quantities by domain number and host number. The exterior instance represents name space quantities by network address and host number. The translation performed at the edge routers involves translation of these representations and determination of domain to edge router mapping.

Domain name servers primarily resolve domain and host names into network and host IP addresses. Using the model described here, fixed network IP addresses are not used internally. Therefore, the nature of domain name space for this model exists at the edges of the domain, the edge routers. Any domain name space resolution must occur at the edge routers and is not required within the domain. Within the domain, only a resolution between hostname and internal host number is required to resolve internal domain name server queries. Therefore, it is desirable to implement the domain name server functionality within the edge routers. This would make the domain name space a physical entity at the position within the domain requiring resolution. In addition, since the internal name space translates into the hostnames and associated host numbers, internal name space resolution could be performed at each internal router. The result is that hostname to address resolution would be simplest at the lowest distribution level, the router. This takes the distributed nature of the DNS model to the maximum distribution level. Thus in ordered networking according to the invention, each router would maintain a list of hostnames and associated addresses, as well as host numbers in all ordered networks. The edges need only deal with the domain in relationship to other domains, in order to represent the highest level of order within a domain.

Each instance of a router appears as an instance of DNS for an ordered domain. This will be referred to as "Interior Name Service" (INS). The distinction is made because the functionality operates on the same query/response packets but is an extremely reduced functional set, based on the level of proximity of routers within the overall distributed structure. For networks connected with multiple routers, the highest numbered router is designated as the primary INS router and any other routers are designated as secondary, INS routers. The distinction between INS and DNS does not carry to end station hosts. Hosts will have a primary DNS and secondary DNS designations to the closest INS routers. By designating the higher numbered routers as primary, the loading of more connected nodes is minimized, and INS functionality is distributed over the least connected nodes. Equally true, since router 1 is always the most connected node, as established by the ordering mechanism described hereinbefore, no primary INS functionality is performed there. The reason each router on a network is designated as primary or secondary, is in the event that a router is temporarily disconnected from operation, in which case another router(s) on the network link can respond to queries.

Interior Name Space service provides an ordered domain with domain name space resolution for names and addresses within an ordered domain in the same way that DNS provides name service resolution for standard DNS. Other network characteristics, not currently provided by DNS, are provided to support functionality not currently available with standard DNS and IP networks. The Interior Name Service (INS) provides distributed storage for interior network quantities that will aid in facilitating features not easily handled by standard IP, for example IP groups, pre-allocated bandwidth, pre-determined paths, etc. The additional features that are provided by INS that are not currently provided by DNS, include:

Relative proximity resolution for edge router to interior host path selection when both edge routers have the same shortest path to the exterior domains.

Ability to query network quantities along "end to end" paths allowing either end users or network domains to select communication paths based on verified Quality Of Service criteria. Each network entity has entries in the distributed database, available to the next higher element in the domain hierarchy.

Ability to resolve Group Names into path designations within a domain, providing built-in group handling capability. This will eliminate broadcast storms and facilitate group communication on both multi-cast and non-multicast network links.

Built in redundancy protection against network element failures.

"End to End" determination of network characteristics allowing source end stations control over path selection criteria.

Elimination of router network functionality except forwarding through "end to end" network characteristic determination before the introduction of data network traffic.

INS service provides two main functions. The resolution of internal relative IP addresses between interior network entities, host or routers. Hierarchical distributed storage for network data entities across the domain with access by both interior and exterior network entities through a common query/response facility. This will provide "end to end" network characteristics for multiple paths giving both end stations and end station domains the ability to select a path among sets of paths based on independent criteria. Quality of Service control is returned to the parties attempting to communicate, rather than the routers providing communication.

As described, Interior Name Space service is a reduced functional set of standard DNS service. INS service provides host name to relative IP address resolution of interior domain host(s). All other DNS queries and requests are forwarded to edge routers for processing through standard DNS. In an alternative embodiment, INS service routers to provide for "end to end" network characteristics determination could process additional queries. Minimally, INS must process host name to relative IP address resolution in order for the performance improvements of switch IP forwarding. In addition, each INS router only processes queries for attached hosts. A query destined for a host on another router is directly forwarded to the other router for INS processing. Queries for exterior hosts are forwarded to the closest edge router for resolution into an interior relative IP address and an exterior IP address (either relative or standard depending on the connected domain). In addition, a network address translation entry is created within the edge router for traffic bound for the outside destination.

Figure 21:
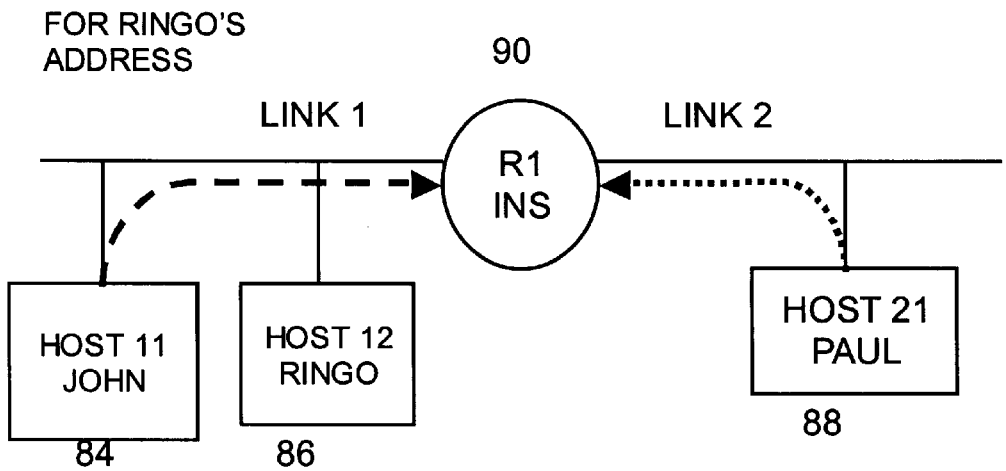
FIG. 21 illustrates the INS query resolution processing for two hosts connected to the same router on the same links.
Figure 22:
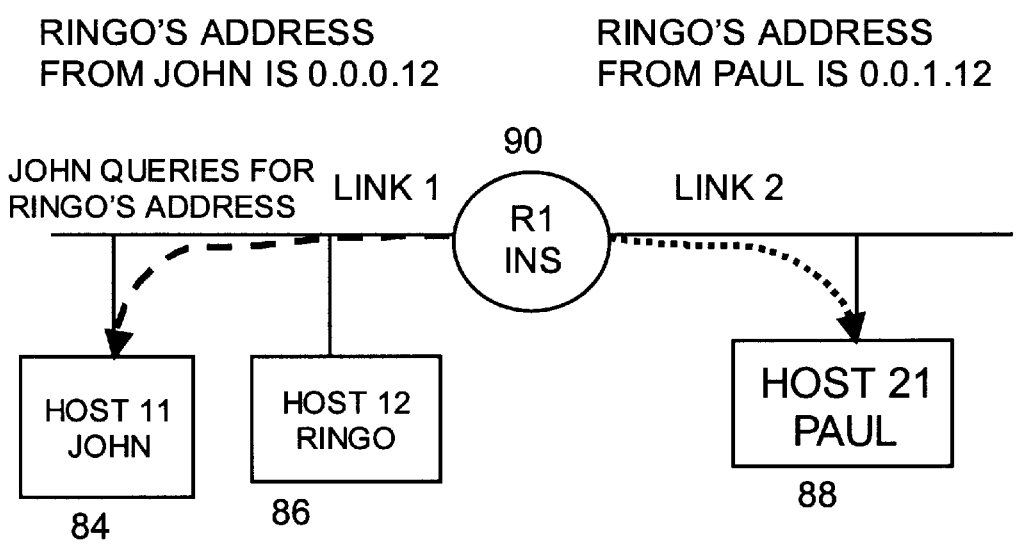
FIG. 22 shows the router's INS response to the to the query shown in FIG. 21.

FIG. 21 illustrates the INS query resolution processing for two host connected to the same router on and the same links. Host John 84 queries for host Ringo's 86 address. At the same time host Paul 88 queries for host Ringo's 86 address. FIG. 22 shows router R1's (90) INS response for Ringo to John and Paul.

Clearly, router R1 90 is in a position to correctly respond to relative address queries and will return the correct address regardless of the local interface of the host to which it is attached. Note that although the addresses appear different to each host, end station communication will correctly send data to the right host because of the relative address processing with each router.

Figure 23:
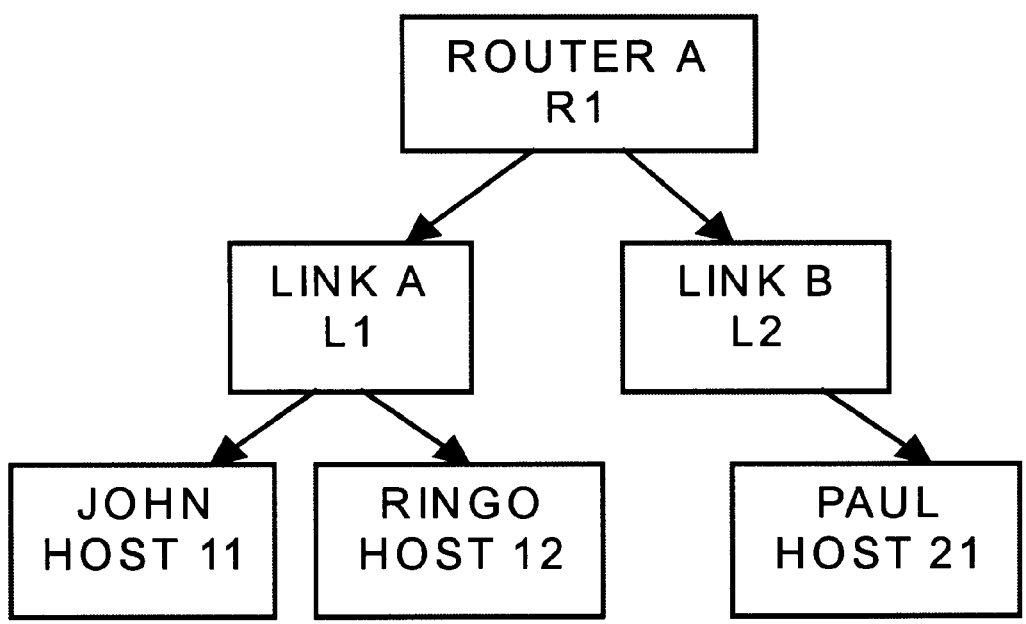
FIG. 23 shows an INS Database Structure for an isolated router according to the illustrative embodiment.

Unlike normal DNS with an arbitrarily located server responding to absolute addressing queries, INS must be distributed to the connected router because of the relative address resolution requirement. INS database queries are minimally limited to host name resolution only because within a domain the domain and sub domain portions are constant. The actual database structure for an INS isolated router according to the illustrative embodiment is shown in FIG. 23. Note that combining INS with router functionality eliminates the need for configuring multiple network support servers within the host end stations.

Unlike DNS, all network entities have entries within INS. The functions of DNS and INS differ. INS works to architecturally anchor objects within a network. This distributed database structure facilitates abstract network object queries for characteristics along a path or multiple paths between other network objects. Although this example has focused on using INS to determine relative IP addresses, INS is also intended to allow distributed data flow characteristics queries, capacity queries, quality of service queries, group capabilities, and bandwidth pre-allocation queries. Each entry. at a distribution level is an object class abstraction. This allows integration of future components within the distributed architecture while assuring compatibility with older object instances. Note also that all entities are physical rather than abstract. Part of the confusion introduced by DNS centers around the abstraction selected in the naming conventions used by the roots of DNS. A network is a physical distributed traffic system, yet the naming of root elements for DNS are based on a categorical rather than a physical traffic system. The present invention alleviates this problem in that the hierarchy is based on network connectivity rather than on abstract layering.

Figure 24:
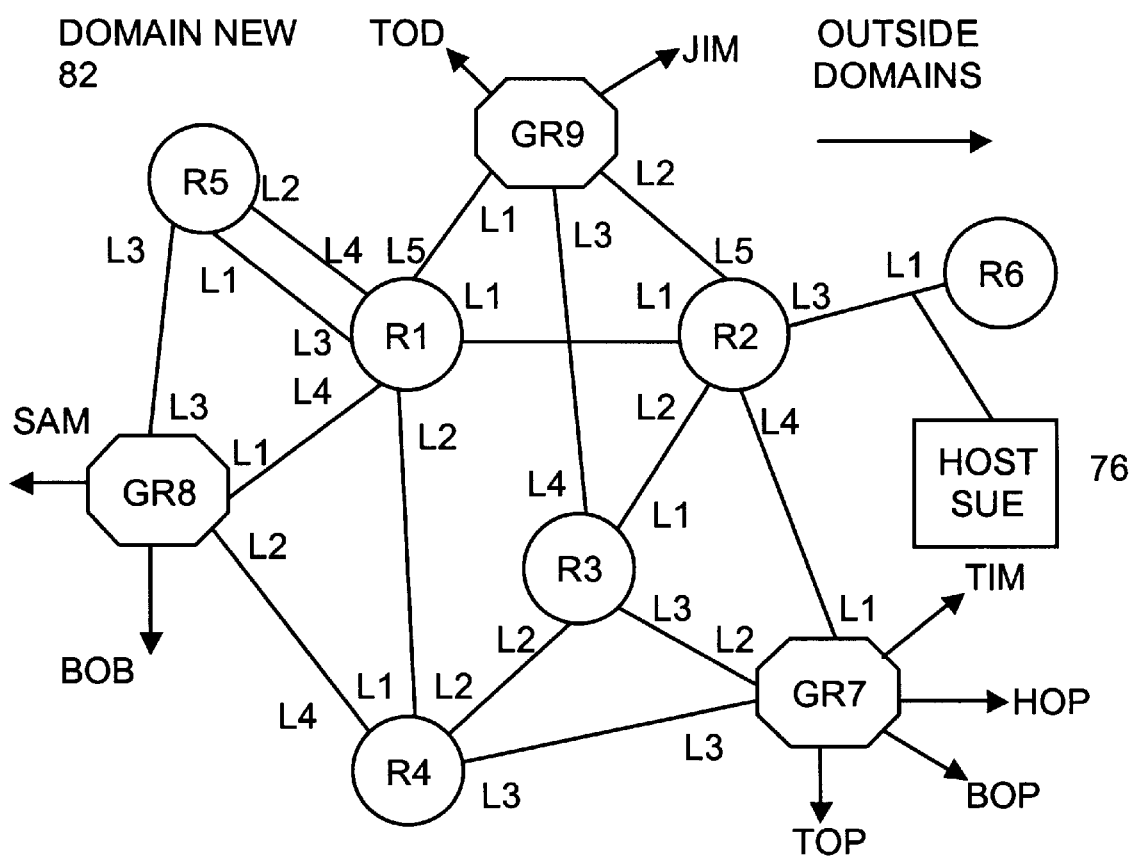
FIG. 24 shows an ordered domain to demonstrate the structure and processing of INS within a more complex ordered network.

FIG. 24 shows a domain to demonstrate the structure and processing of INS within a more complex ordered network, similar to the network shown in FIG. 10. Each router in domain NEW would be at the same level and organized from lowest to highest numbered. Each link on each router would be shown the same way followed by each host. Another way to consider INS is as a physical database of interior network connective entities. This includes servers required to perform network connections like DNS and INS, but not servers that provide host system support functions utilizing the network, like network disk servers. Ordered networking architecture is based on clearly separating networking connective functions from network support functions to minimize the complexity of communication elements. The support functions may be integrated in parallel with the networking functions but are separable from the network functions. Ordered network components will migrate within the network based on outages, capacity changes, and temporary configuration alignments for scheduled traffic.

Figure 25:
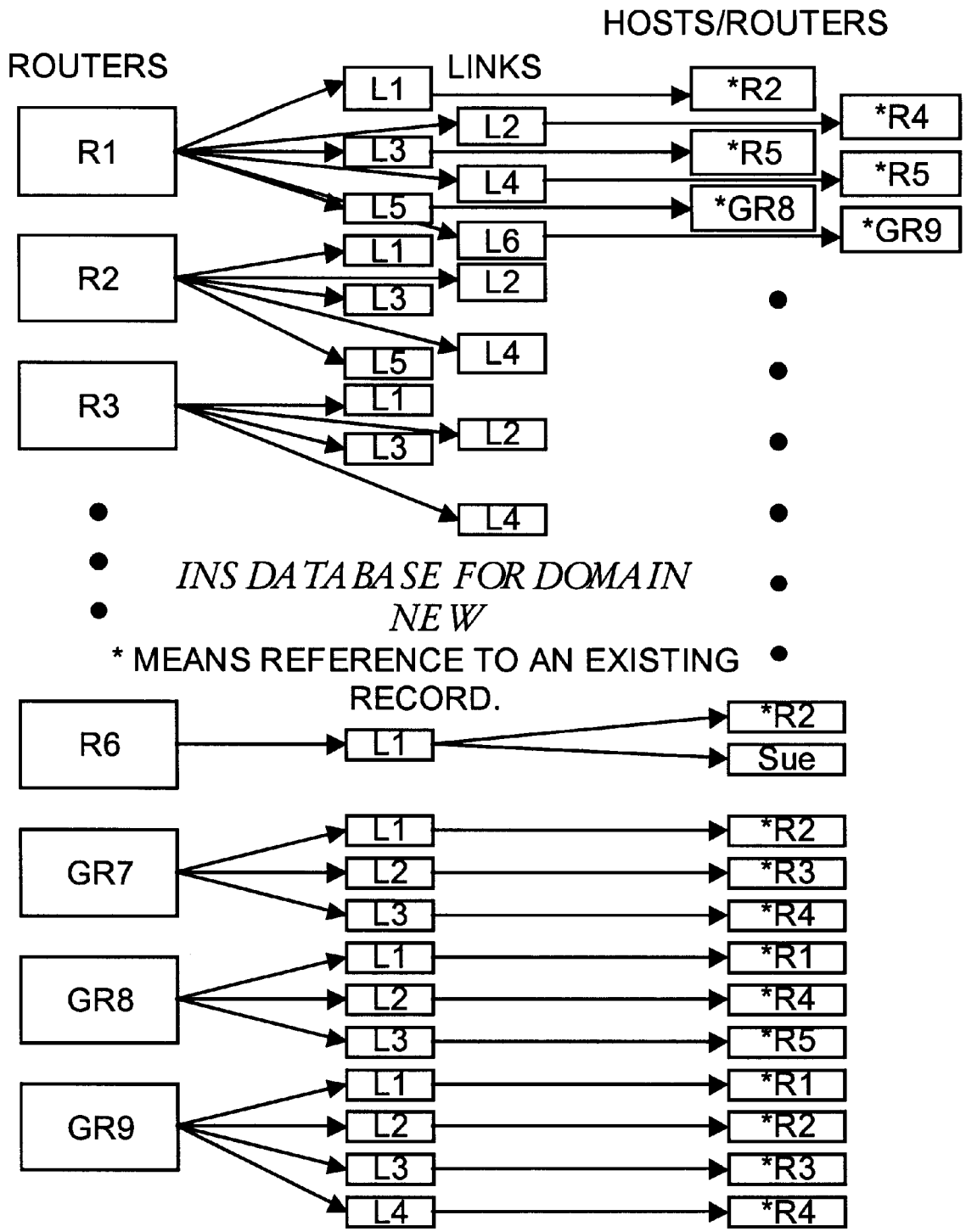
FIG. 25 shows an INS database according to the illustrative embodiment for the domain shown in FIG. 24.

FIG. 25 shows the INS database according to the illustrative embodiment for the domain shown in FIG. 24. Note that both the interior and exterior routers are listed This database exhaustively contains records required by each network entity or network element required to characterize and control an entire interior domain. This database when combined with either a similar database for exterior ordered domains or a GRACE node routers for compatibility with standard IP provides networking without protocols. No other information is typically required.

Interior Name Space—Distributed Network Data Service

In the last section, how the INS database resolved relative addresses was described. Additional data in the INS database provides support for every other network ordered network function. The following list details ordered network element hierarchy that uses the INS database.

A. Physical Network Elements—Input to the INS database
 1. Routers/Switches—Interior or Edge.
 2. Links—Network connections.
 3. Hosts—End stations running standard IP applications.

B. Aggregate Network Elements—Abstractions
 1. Universe—Domains using the same unique domain naming convention.
 2. Groups—Collection of diverse hosts organized to communicate in parallel.
 3. Domains—Organization of mutually controlled network entities.
 4. Areas—Abstract subset of network entities within a domain organized to handle a network characteristic.
 5. Paths—Interior or Inter-domain "end to end" specific set of connections.

C. Network Support Servers
 1. INS—Interior Name Service. Resolves relative addresses and provides distributed physical network database.
 2. DNS—Domain Name Service. Required for compatibility with standard IP.
 3. DMS—Domain Map Service. Provides inter-domain map determination and relative domain address resolution for order network edge routers. Responds to Exterior Path queries.
 4. IMS—Interior Map Service. Provides topological map determination, path selection, and path switch matrix data distribution. Responds to Interior Path queries.
 5. EPS—Exterior Path Selection. Provides quality of service monitoring and path selection.

Figure 34:
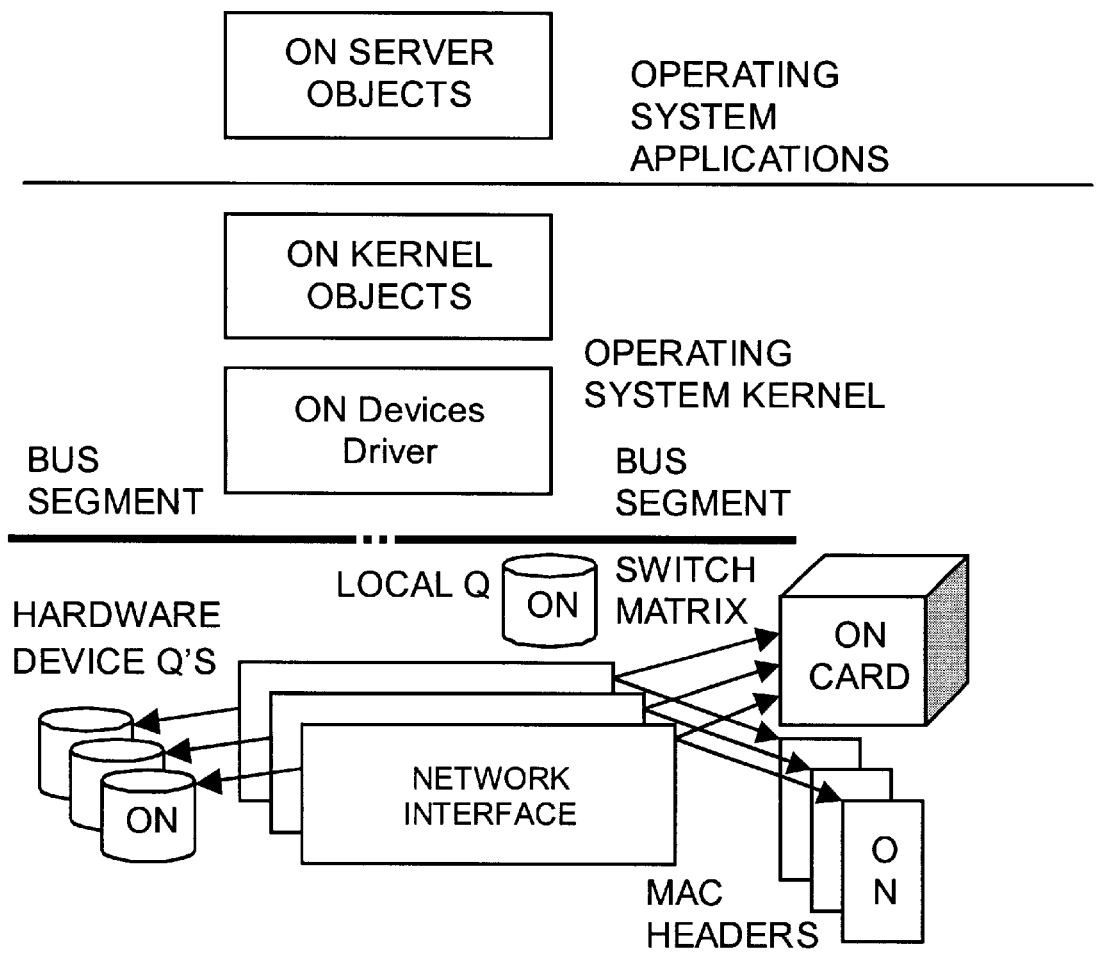
FIG. 34 is a block diagram of the elements of the illustrative embodiment for controlling a router.

FIG. 34 shows typical components which are part of a node or switch implementing Ordered Networking according to the illustrative embodiment. The functions by the DMS and IMS map servers are essentially the same, and the software is the same within the two types of servers. Only the location within the network and the network scale differs between the two servers, domain topological scale interior switch topological scale, area topology scale, etc. The map server processes the link sets that describe the topological neighbor nodes within a bound network. The map server then attempts to determine the center node or center nodes within the network. These Centering algorithms have been previously described. Note that if creeping network distribution is used to distribute link sets within a network, every switch within the network has all the information required to become a map server. In fact, the position of the map server at "cold-start" initialization does not matter. Even if every node within the network performed the same analysis independently, the same data would be used as input at each node and the exact same results would be obtained by each independent topological analysis.

Once the map server has identified the center or centers of the network, the topological analysis assesses the memory capacity and CPU capacity of each switch. If the static structures required by Ordered Networking data forwarding; the path switch matrix and the link header tables, exceeds the capacity of any node within the network, topological analysis will suggest breaking the network into areas. Areas reduces the memory and CPU requirements of switches by breaking the network into smaller sub networks. This effectively scales the forwarding complexity and reduces resource requirements at each switch. Center analysis occurs before resource checking so that for multi-centered topologies, the areas will be organized around each independent center switch node. A multi-centered network is a network with two or more equally likely center nodes that are not connected directly to each other. A dual centered network is a network with two equally likely centers that are in close or direct proximity to each other. A map server would then be designated in each area, and the boundaries or edges of each area would be identified. The analysis would begin all over again within each area. The topological analysis determined a center or list of centers, the switches have capacity to store all topological data structures. The map server next begins the process of applying an Ordering Algorithm from the center of the network out to the edges. There are several viable ordering algorithms. Many ordering algorithms exist but for an algorithm to work properly, it should allow for separation of traffic along either physical direction (as with the base classes detailed) or quality of service requirements. Without directional separation, recovery from temporary link disruption will not result in re-establishment of an original path but will result in a new path choice possibly further disruption data flow within the network. The ordering algorithm ranks switches within the network. The map server distributes this ranking to each switch within the network through the named entity addressing method. Ordering allows identifying of proximity and connective direction within a bound network.

Each switch, once given a rank designation within the network, has the ability to resolve addresses for networking entities directly connected to it. Once the map server has disseminated the network rank, based on the ordering algorithm, each switch knows the addresses to assign to directly connected network objects. The ranking guarantees that each address within the overall network is unique and deducible by the host number.

The map server next discerns paths to every switch. Each path must be unique and without loop paths. Details of this are provided in Appendix A in reference to the example network in FIG. 10.

In addition, the database information for each element is obtained with an identical query/response sequence regardless of the entity type. Ordered networking attempts to design the network as an entity, rather that connecting independently designed elements together to form a network. This is done by clearly defining the physical elements and their inter-relationships. Creating object abstractions that map over the physical layers to obtain an object structure network instead of a protocol structured network. In addition, since a network is distributed and therefore redundant, ordered networking uses this redundancy to handle dynamic conditions within the network. In fact, every support server function could run on any host or router on any arbitrarily small section of a network domain should that section become isolated. This happens automatically without user configuration or intervention. Equally true, independently controlled areas of a network can be combined by re-ordering the network entities and combining the INS database elements.

Integrating Ordered Network Domains With Standard IP—Ordered Interior Address Translation to Standard IP Addresses An authority assigns Standard IP addresses in a block for a particular company or organization. If a network grows beyond a previous range and is given a new IP address block, this space would not be contiguous to the previous range. In other words, mapping from Ordered IP addresses to Standard IP addresses may be non-contiguous in addressing. This is the only limiting factor in raw translation. Each block, however, will have a known consecutive range.

If the entire range of Ordered addresses maps into a single standard IP addressing block, simply "Or" (inclusive or) the Ordered addresses with the IP address base:

IP Base Address ^ Hostnumber=Standard IP Address

If there are ranges of IP Base Addresses, store them in a table. The host numbers are adjusted to map into each base range:

int CumulativeRange=0;
For (I=0; Hostnumber<CumulativeRange; CumulativeRange+=IP Base Range[I], I++);
IP Base Address[I–1] ^(Hostnumber–CumulativeRange)= Standard IP Address A concept of "areas" can be used to eliminate this software storage step. Areas are abstractions created in the network hierarchical model to facilitate the handling of physical issues. For example, assignment and allocation of standard IP addresses are easily handled by an area. An area represents a set of network elements that is ordered sequentially in the same manner as described hereinbefore, but in isolation from other network elements within the domain. Then the separate areas within the domain are ordered relative to each other. Area numbering fixes base ranges for individual entity numbering within the area. Within the domain, each area's base addresses are sequenced numerically by the area numbers. As relative addresses crossing an area boundary calculations are automatically made zero base sequential, prior to table lookup, by subtracting the area base host number. This results in the term (Hostnumber–CumulativeRange) being calculated automatically within an area and the term IP Base Address[I–1] already being used as a base. In other words, by declaring an area or areas within a network, the mapping of Ordered Addresses to IP addresses will automatically be handled by the Ordered Network objects and algorithms without additional software.

Areas may be used for a variety of physical groupings. The problem of packet congestion from exterior traffic on shortest internal routes is handled by declaring two or more geographically distinct areas. Each area is then restricted from exporting neighbor routes to the exterior view of the domain from the other area. Note that this restriction has no effect on the interior domain. The interior domain can access neighbors from either domain portal with no fear of these neighbors plugging up the local domain.

The ordered network design criteria centers on two primary distinctions from current router based networking. Hosts and routers are treated the same both by hardware and by software, and topology and data flow are the primary design aspects instead of protocols and hardware connectivity.

Both hosts and routers generate data. Both hosts and routers sink data. Routers interpret protocols and host applications transfer data between each other. Both require similar resources, CPU power, memory, and storage space for network or user programs. The previous reason for the distinction is that network protocol software required too many resources to perform both user functions and network support functions. Because ordered networks eliminate protocols in favor of distributed data structures, little software is required beyond handling of the universal distribution algorithm and the network objects that apply to host end stations. The amount of code and CPU power utilized by a standard IP host to handle IP far exceeds the capacity requirements of ordered network-forwarding support only.

Figure 26:
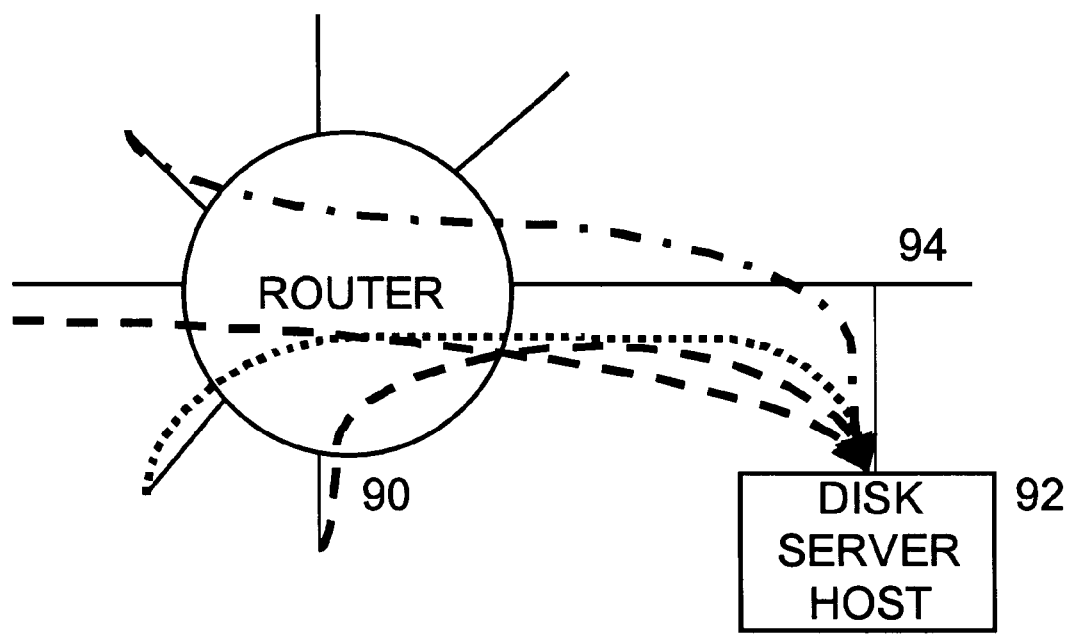
FIG. 26 is a block diagram showing how networked disk servers for routers are connected by network links.
Figure 27:
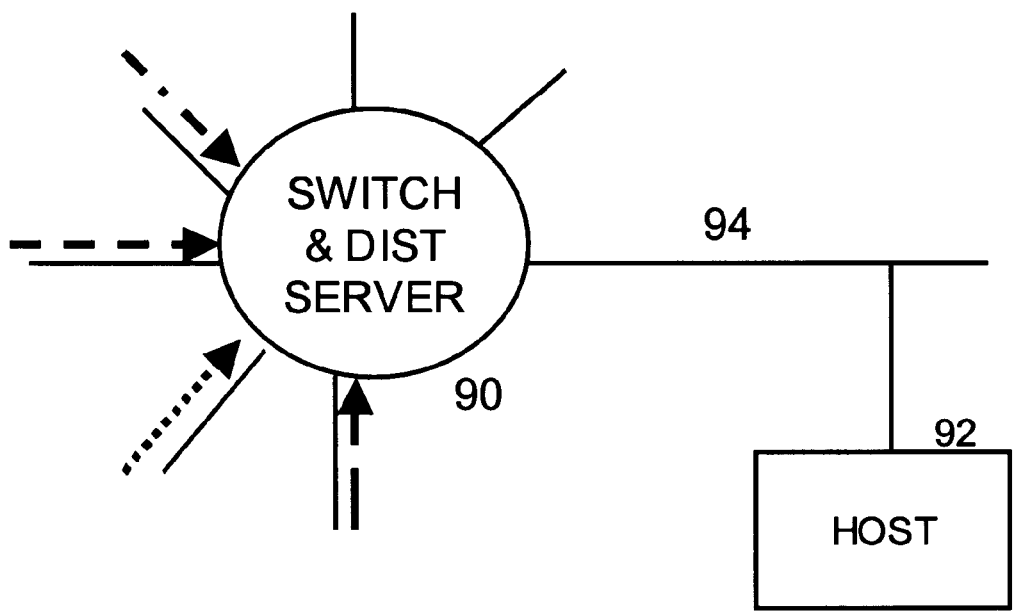
FIG. 27 is a block diagram showing how network traffic is reduced if the memory requirements for the router are fully contained within the router.

In addition, compare the current restriction that support servers like disk servers, 92 FIG. 26 be relegated to host systems on individual network links 84, as compared to data flow levels when the server functionality migrates into a router or switch, 90 FIG. 27. Clearly, the standard router 90 and disk server 92 consumes considerably more network resources. The router 90 forwarding functions carry traffic from four different disk access sources. The disk server's local network handles the aggregate bandwidth of four request sources as well. If the switch 90 could also function as a disk server, consider the drop in network resources. Remember that forwarding is the primary function of a switch and requires little or no CPU and system resources in an ordered network design. No switch forwarding resources are consumed because the disk requests terminate in the switch at the disk server object. In addition, the network consumption is limited to the paths required for the request sources and not the destination link of the disk server. Simply by migration of the service function to a network switch, resource consumption drops dramatically without affecting switch-forwarding capability.

Support services migration to switches adheres to the first two design criteria for dramatic reductions in network resource consumption. Any support server function will use fewer resources when implemented within a network switch provided that switch is not already providing service functions that require the same resources, CPU or system memory.

Further design criteria for ordered networking as described herein, include the replacement of software and software protocols with distributed network data structures when ever possible. Additionally, functionality will migrate from routers/switches to support servers if that functionality would be similar across all routers within a domain or that functionality is software intensive.

Figure 28:
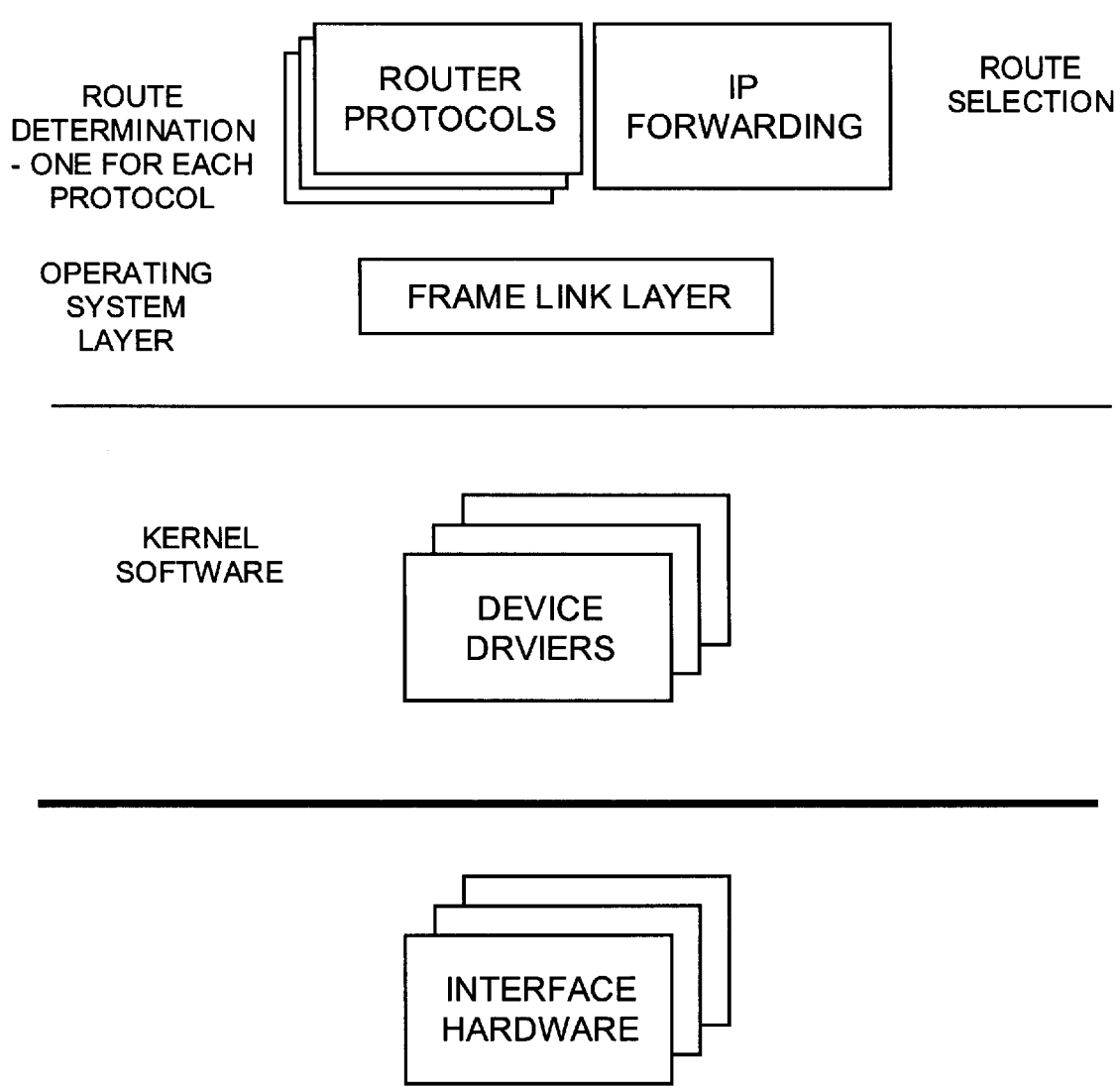
FIG. 28 is a block diagram of layers of network support functions of a typical network.
Figure 29:
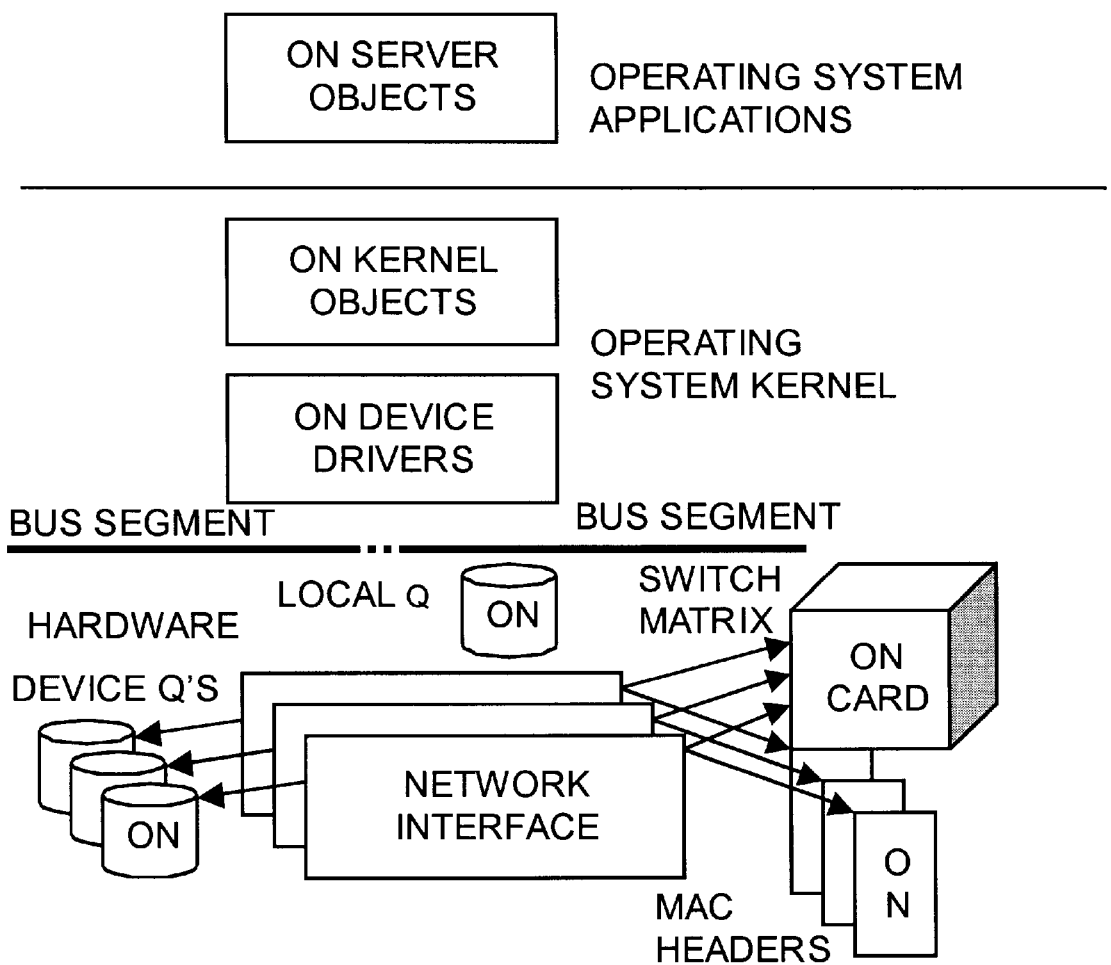
FIG. 29 is a block diagram of the components of an ON Switch according to the illustrative embodiment.

The diagram in FIG. 28 shows a breakdown of hardware and software functionality required for supporting routing, as known in the art. In addition, for each protocol supported for route determination function that the router supports, an additional software box is required. Clearly, the standard approach is software intensive as opposed to data structure and hardware intensive. By contrast the ON ("ordered network") switch central processor does nothing when the switch is forwarding. Equally true, an ON switch has no route determination function. A switch matrix data structure and network distribution object used to load the switch matrix has replaced the route determination function. The switch matrix data is calculated by one of two map servers, an interior map server and an exterior map server for interior and edge switches respectively. This reduces the unnecessary software redundancy inherent in the current router design. ON switches according to the present invention have redundancy at each switch on distributed data structures so that in the event any network component fails a neighboring component may replace that entity without user intervention or network configuration. The redundancy in current routers poses no benefit to the network as a whole and squanders precious CPU capacity and memory.

Ordered networks reduce software complexity by separating the route determination function from the route selection function. The route selection function or forwarding function, once separated, will migrate into the hardware. The route determination function will migrate into communication support servers. The gap between functions is bridged by shared distributed data structures. By this migration, the initial design requires no changes in the hardware interface cards to operate on ordered networks, and new functionality is added in a kernel mode driver layered above the standard hardware interface drivers, since the kernel driver interrogates static data structures populated by network support servers. This limited functionality is preferably implemented entirely by hardware.

As functionality gates from software calculated to hardware static data structures, several design characteristics emerge: hardware functionality becomes static and limited, and software functionality becomes fluid and distributed.

To eliminate special hardware boxes for forwarding, all forwarding will migrate to hardware by adding an ON Switch, Ordered Network, board. This hardware module provides enough memory for switching matrixes and interface media header tables for every locally connected hosts or switches. This memory is dedicated to network forwarding queues and topologically static data structures but may be accessed by the CPU when network changes are required. In addition, the host acquires data terminating locally from the ON Switch and never from the network interface cards. With two minor architectural changes to today's standard PC bus structure. These changes are network card to card data accessor forwarding, and multiport, multicard shared memory for local data collections. The CPU actually sees reductions in both bus utilization and interrupt generation on local host transfers. The ON Switch board aggregates and processes all interface cards prior to generating notification of locally terminated data, thereby reducing CPU overhead. In addition, the CPU will perceive no bus utilization from the forwarding with enhancements to interface boards and the introduction of ON switch network boards.

With the requirement of special router boxes removed from the network, software network design becomes extremely flexible. If both hosts and routers were designed to be the same, the network software developed for either would be indistinguishable. This would include host end station software, ON Switch driver software, ON communication support server software, and all other network software provided. When a network function is required, the resources are available, and a host or switch should perform a support function, that network device will automatically perform that function.

A network entity -when networking conditions require it- can perform any function required by the network automatically and fluidly without configuration or user intervention. A determination that certain defined conditions are occurring, at this physical point in the overall network, is required for a process to start and begin handling network conditions for neighboring hosts, switches, or related communication servers. The conditions for execution are defined as part of the individual network objects. All network object entities, taken as a whole, represent the Ordered Network Object Entity and the capability of the network domain.

With the design change, previous distinct network entities are collapsed into a single software design. At the same time, distinct software threads will have the apparent ability to instantaneously move around a network to provide support function on dynamically changing network conditions. Certain constraints, however, should be noted in the overall network design. No protocol layers will be allowed on network systems providing Ordered Network support functions combined with host end station functions. If a system is providing Ordered Networking functions, standard IP functions will not work until the IP libraries have been enhanced to support Ordered Network objects.

Further, known protocol layers eliminate the possibility of fluidity and are the primary reasons that special router boxes were needed in the first place. Although IP can be layered on ordered network objects, until this occurs and has been integrated with operating system layering to support applications, standard host running network support software will not act as both IP host and Ordered Network support entities. This restriction may easily be removed but not by the design of an Ordered Network, only by the acceptance and integration of ordered networking by operating systems.

Since every ON Switch has standard host capability, a certain design criteria should be enforced. An Ordered Network switch should be configured so that it never drops local domain destined packets unless a data flow profile indicates that delay introduced in storing them locally would render the packet meaningless at the terminating end system. Network faults, topological changes, and capacity changes may cause network support functions to change location within the network. Functions previously implemented in the network that were better implemented in the source and destination systems will migrate to the host application objects of ordered network entities. Network congestion control focuses on monitoring network link capacity and limiting source traffic before exceeding a network profile. The source switch nearest a particular source will remove/reflect packets from/to a source, if that source improperly generates more data than a network profile would allow. Reflected packets indicate to the source that network throttling needs adjustment. (it is also a way for the source to measure the amount of exceeded bandwidth). If a source continues to generate excess packets, the network will logically disconnect that source. If any Ordered Network entity behaves in an unordered or suspicious way, the network will logically disconnect that entity.

The foregoing represent the primary design criteria behind the design of Ordered Network objects. As each network entity's specific design is examined, these criteria will be followed so that the network as a entity will operate in an ordered, distributed, and fault tolerant way. Significant improvements over current networking are achieved by the first two elements alone.

A further design consideration is that nothing in an Ordered Network should happen by accident or in an uncoordinated way. The network ultimately controls the connectivity, configuration, and distributed data for each individual network entity. Information presented by one network entity will be distributed to any other entity that would be affected by that information. The rest of the network will assimilate no local change of a single network entity until the change has been coordinated within the network hierarchy by the network support servers described hereinbefore. Ordered Networks maintain compatibility at a domain border and host end station only. Connectivity with interior routers running standard protocols is sub-optimal. A domain or sub domain should be all Ordered or all Standard IP.

An ordered network is constructed of ordered network (ON) components including ON switches which are the basic Ordered Network forwarding components, and which incorporate ON support servers. Support servers in the architecture according to the invention include: an inter-Domain Map Server or service (DMS); a Domain Name Server or service (DNS, as known in the art); an Interior Map Server or service (IMS); and an Interior Name Server or service (INS), as described. The support servers, generally, provide a communication support function for proper Ordered Network operation. The INS in each host, switch, and edge switch performs distributed database and relative addressing functions. That is, the Ordered Network Interior Name Service, is a server providing name to relative address resolution. In addition, INS is configured as a distributed database component used by all network elements to coordinate communication capacity information.

The Ordered Network Interior Map Service (IMS) is a server providing mapping for interior switches. The IMS mapping service is provided by the switch that is typically the lowest number in an area or domain, determined as described hereinbefore. The IMS determines the topology of the region and distributes that topology to individual switches to load their respective path switch matrix.

The ON DNS is Ordered Network server support of a standard Domain Name Space server known in the art. The DNS, as described hereinbefore, is known to be located in edge switches for performing exterior to interior name resolution.

The ON DMS, or Ordered Network Domain Map Service, is a server providing inter-domain mapping for edge switches and IP compatibility/inter-operability. The DMS in each edge node is designated to perform a mapping function for exterior domains to determine both relative domain name paths and interior to exterior network address translation for exterior IP or ON domains.

Ordered Networking architecture according to the invention further involves network objects to provide inter-networking communication between network entities both local and remote. Network objects, which are distributed at each node, include a SWITCH object and a LINK object. Network objects (SWITCH and LINK) use the same control mechanism regardless of an object's function, position, or particular data structure. In addition, objects support two access levels for inter-object control communications; named object access and directed object access. Named object access allows communication between network entities without knowledge of relative addresses, while directed object access allows network objects to communicate using relative network addresses. Since forwarding requires distributed data structures populated for transmitting addressed data between network entities, the named object mechanism allows network entities to communicate before populating these data structures throughout the network. After these structures are populated by support servers, the directed mechanism utilizes the forwarding path. The named mechanism requires thread processing at each forwarding network element or switch, while the directed mechanism requires no processing above the hardware-forwarding or driver-forwarding component. Either mechanism processes Query, Check, Announce, Set and Response control requests. These messages allow co-ordination between all distributed data structures within an Ordered Network.

An ordered network requires networking functions and data. When functions and data are combined together in a structured way, an object (e.g. LINK or SWITCH) is created. Objects are data and functions operating on that data. For an object definition at the Ordered Network level to be viable, different physical networks should map into the network objects with the same level of control, configuration, and performance.

The Ordered Networking Architecture according to the present invention replaces forwarding protocols with topologically static data structures. These data structures directly tie source and destination relative addresses to an end-to-end network path for data traffic between a source system and one or more destinations systems. If the source and destination addresses are equal, then the network path is a group path. If the source and destination addresses differ, then the network path is a point-to-point path. This is the only distinction required to perform group multi-point transfers at the forwarding level within an Ordered Network.

In order to simplify table access descriptions for the switch matrices discussed hereinbefore the following nomenclature is used. Any table takes access data and uses that access data to return stored data. Optional arguments are marked by a *. Return arguments are shown after "=>". For example a table access nomenclature is depicted as follows:

Table ( AccessData1, AccessData2, *OptionalAccessData3 )=> {ReturnData1, ReturnData2, *OptionalReturnData3 }|{0}

This example means that if AccessData1 and AccessData2 and optionally OptionalAccessData3 are presented for the table access, the table will return ReturnData1, ReturnData2, and OptionalReturnData3 or the value 0 if the access data is out of range. Optional values are indicated by an *. An optional field may contain a comment specifying the condition for the optional data as follows:

Table ( AccessData1, *OptionalAccessData3 )=> {*OptionalRetunData3:"Present if OptionalAccessData3 is specified" }

In addition to specifying a table access function in this manner, this nomenclature may specify any data structure consisting of substructures. If an address field is comprised of subfields, the address may be specified as follows:

Address ( Domain ( *Darea: DA, Dnumber: DN), Path, Link, Host ( *Harea: HA, Hnumber: HN) )

In the illustrative embodiment, an address consists of four main fields; Domain, Path, Link, and Host, as described hereinbefore. Two of those fields optionally consist of sub fields for Darea and Dnumber of Domain and Harea and Hnumber of Host. Since the area parts have the optional indicator, when the area part is zero then the Domain field consists of the Dnumber and the Host field consists of the Hnumber fields. Note that the comment field indicates a notation name alias for each sub field. For example, the Darea part of the Domain may be designated for simplicity as DA and the Dnumber part of the Domain may be designated as DN. The Harea part of the Host may be designated as HA and the Hnumber part of the Host may be designated as HN. Note that when a structure is designated in table nomenclature, nothing appears after the access fields. This implies that accessing the structure yields the indicated access fields.

Forwarding Data Structures are as follows. The In Transit Data Structure at the Transport Level within an Ordered Network for Forwarding is:

Packets ( Transport Header(*SrcAddress, DstAddress, *Sequencing, *OtherFields, . . . ), TransportData )

The In Transit Data Structure used by an Ordered Network for Forwarding are:

SrcAddress ( Domain ( *Darea: DA, Dnumber: DN ), Path, Link, Host ( *Harea: HA, Hnumber: HN ))

DstAddress ( Domain ( *Darea: DA, Dnumber: DN ), Path, Link, Host ( *Harea: HA, Hnumber: HN ))

During transit, only the address fields of a packet provide information required for forwarding. This results in the flexibility of Ordered Networking methods and implies that Ordered Networking will work for any transport protocol that has addressing fields. In addition, Ordered Networking imposes no structure on this address other than the indicated fields. In other words, this architecture will work with future transport protocols that may have larger size fields for addressing than exist today.

Because Ordered Networking architecture supports two views for network aggregates, at times several of the addressing fields are associative with a specific view. The Domain fields are always associated with the external view. The Host fields are always associated with the internal view. The Path and Link fields are associative and change association as the addresses are translated between network control authorities. In order to indicate the association of the optional fields during the following table discussions an addition to the nomenclature indicates the field association.

SrcAddress ( [Domain ( *Darea: DA, Dnumber: DN ), Path, Link], Host ( *Harea: HA, Hnumber: HN))

Brackets around the Path and Link fields associate the fields when indicating a specific view. The above address implies an external view because the associative fields are bracketed with the Domain and the Domain field is associated with the external view.

DstAddress ( Domain ( *Darea: DA, Dnumber: DN ), [Path, Link, Host ( *Harea: HA, Hnumber: HN )])

The above address implies an internal view because the associative fields are bracketed with the Host and the Host field is associated with the internal view. If no brackets are indicated, then the discussion applies to either view.

Conceptually, the source and destination address pair can be viewed as a co-ordinate system presented to the network for path association. The network decodes the various fields into directional traffic classes and aggregate entity associations. Each aggregate entity then associates a specific path through its control area with the source and destination address pair. As the packet moves through the network, different parts of the address determine the forwarding path. Within a control area, the core network lookup data structure is the path switch matrix, (PSM). Within a control authority, traversing between source and destination network entities through multiple connective entities requires accessing the path switch matrix to discern the next forwarding link (or links for groups) on the end-to-end path.

Turning now to base address class designations as illustrated in and previously discussed with respect to FIG. 4, for Ordered Network addressing, the Domain and Host portions of an address represent two scales of addressing information that are directly associated with two mapping scales. Inter-domain mapping is associated with the Domain address portion. Interior Domain mapping is associated with the Host address portion. The Area subfields of both the Host and Domain address portions represent additional scaling levels. The basic address class designations considered here are for the Domain and Host scales. However, if the focus shifts to either Area scale, the class designations may be used relative to that Area scale. The general format is as follows:

SrcAddress ( Domain, Path, Link, Host )
DstAddress ( Domain, Path, Link, Host )

For the interior traffic class 42:

SrcAddress ( Domain=0, *Path, *Link, Host )
DstAddress ( Domain=0, *Path, *Link, Host )

If both the source and destination Domain are zero, then the traffic class for the associated Transport Packet is interior. Note, because the Host portion of the address contains enough information based on the network-ordering algorithms to discern the link and the path fields, these fields are optional. However, since the bit positions associated with the domain fields are unused within a local control area or domain, adding these optional fields to the address will expedite forwarding at each interior switch, by allowing direct index look up for local link delivery. This bypasses algorithmically determining them from the host number.

For the interior to exterior traffic class 46:

SrcAddress ( Domain=0, *Path, *Link, Host )
DstAddress ( [Domain !=0, Link: EVLink: "Exterior View"], *Path, Host )

If the source domain is zero, the source host is local. If the destination domain is non-zero, the destination host is remote (non-local). Therefore, the traffic class for the Transport Packet is Interior to Exterior Class. Note that the destination link is exterior view associative and not optional. This means that this link number references an inter-domain scale and is required by the network to determine forwarding path.

For the exterior to interior class 48:

*SrcAddress ( [Domain !=0, Link: EVLink: "Exterior View"], *Path, Host )
DstAddress ( Domain=0, *Path, *Link, Host )

If the source domain is non-zero, the source host is remote (non-local). If the destination domain is zero, the destination host is local. Therefore, the traffic class for the Transport Packet is Exterior to Interior Class. Note that the source link is exterior view associative and not optional. This means that this link number references an inter-domain scale and is required by the network to determine forwarding path.

For the transitory traffic class 44:

*SrcAddress ( [Domain !=0, Link: EVLink: "Exterior View"], *Path, Host )
DstAddress ( [Domain !=0, Link: EVLink: "Exterior View"], *Path, Host )

If both the source and destination domains are non-zero the traffic class is transitory. In addition, both Link fields are exterior view associative, which means the links are relative to inter-domain connections.

With regard to interior traffic class network data structures, interior complexity grows as network element inter-connections increases. The following list covers the step by step complexity increases that require additional network data structures for interior traffic handling.

The Local Link with Multiple Hosts Network Data Structures, require ON Link Objects at each Host. No ON Switch Objects are required. The Local Switch Network Data Structures, require ON Link Objects for each Host, One ON Switch Object with a Link Object for each Switch Local Link. The Multiple Switch Network Data Structures, require ON Link Objects for Source and Destination Hosts, Switch Objects at each Source and Destination Connective Entity, and Switch Objects at each Intermediate Connective Entity.

Transit supplied data structures attained from the Transport Packet:

Packets ( Transport Header( *SrcAddress, DstAddress, *Sequencing, *OtherFields, . . . ), TransportData )

*SrcAddress ( Domain=0, *Path, *Link, Host: SrcHost )

DstAddress ( Domain=0, *Path, *Link, Host: DstHost )

For Local Link with Multiple Hosts Network Data Structures; for Src and Dst NE's on the same network link communicating, the addresses look like this:

*SrcAddress ( Domain=0, *Path=0, *Link=0, Host: SrcHost )

DstAddress ( Domain=0, *Path=0, *Link=0, Host: DstHost )

Since there are no Path or Link fields, the source host Link Object processes the packet. Each Network Entity would look up the associated MAC frames maintained in it's Link Object and add the local MAC framing such that the data was directly sent over the local link to the attached destination Host.

Link Object Data Structures:

Here are the data structures required by the source Host Network Link Object to process the Transport Packet, where Host is the SrcAddress Host portion:

The ConnectiveEntityLookup core function implemented in software or hardware:

ConnectiveEntityLookup ( SrcHost, OrderMethod )=> { Sw: "Switch associated with this Host number", Link: "Link associated with this Host number" HostNumberBase: "Numeric value for lowest numbered host on the link.", . . . }

MacTable ( DstHost( Hnumber )—BaseHostNumber: "Becomes base relative HostNumber" )=> { MacAddress }

MacFrame ( SrcMacAddress: "Constant for a specific NE and Link", DstMacAddress:"From MacTable", *Size, *MacDependentFields, Transport Packet )

For Local Switch Network Data Structures; for Src and Dst NE's on the same network switch but different links communicating, the addresses look like:

*SrcAddress ( Domain=0, *Path=0, *Link: SrcLink, Host: SrcHost )

DstAddress ( Domain=0, *Path=0, *Link: DstLink, Host: DstHost )

Link Object Data Structures:

Here are the data structures required by the source Host Network Link Object to process the Transport Packet, where Host is the SrcAddress Host portion:

The ConnectiveEntityLookup core function implemented in software or hardware:

ConnectiveEntityLookup ( SrcHost, OrderMethod )=> { Sw: "Switch associated with this Host number", Link: "Link associated with this Host number" HostNumberBase: "Numeric value for lowest numbered host on the link.", . . . }

MacSwTable ( Sw )=> { SwMacAddress: DstMacAddress }: "Single entry table or multi-entry depending on Topology"

MacFrame ( SrcMacAddress: "Constant for a specific NE", DstMacAddress:"From MacSwTable", Size, *MacDependentFields . . . , Transport Packet )

Because the destination has a Link number associated with the address, the destination is not link local, but there is no path number, therefore it is switch local. The Host Link Object forwards the data to the local switch based on the source address.

Switch Object Data Structures:

At the Source switch, the following data structures are required:

Because the DstAddress Path=0, the link is Source Sw local:

SwitchTable ( DstLink )=>{ MacTable, MacSwTable, BaseHostNumber, SwLinkMacAddress, . . . }

Where DstMacAddress is accessed from the MacTable returned by the SwitchTable Lookup:

MacTable ( DstHost ( Hnumber )—BaseHostNumber: "Becomes base relative HostNumber" )=> { MacAddress: DstMacAddress }

MacFrame ( SrcMacAddress: "From SwLinkMacAddress", DstMacAddress: "From MacSwTable", *Size, *MacDependentFields, Transport Packet )

The local switch does not need to call the ConnectiveEntityLookup lookup because the DstAddress contained all of the necessary information for forwarding. Two direct index lookups results in proper data forwarding to the local destination host by the local switch.

With regard to Multiple Switch Network Data Structures, for Src and Dst NE's in the same network but different switches and links communicating, the addresses look like:

*SrcAddress ( Domain=0, *Path, *Link: DstLink, Host: DstHost )

DstAddress ( Domain=0, *Path !=0: DstPath, *Link: SrcLink, Host: SrcHost )

The source and destination host ON Link Objects will use the same data structures as previously described in the simpler network case.

Starting with data arriving at the Source connected Switch and finishing with data arriving at the Destination connected Switch, Source Switch Object Network Data Structures, when both the SrcHost and the DstHost are from the inbound Transport Packet:

ConnectiveEntityLookup ( SrcHost, OrderMethod )=> { Sw: SrcSw: "Switch associated with this Host number", Link: SrcLink: "Link associated with this Host number" HostNumberBase: "Numeric value for lowest numbered host on the link." }

ConnectiveEntityLookup ( DstHost, OrderMethod )=> { Sw: DstSw: "Switch associated with this Host number", Link: DstLink: "Link associated with this Host number" HostNumberBase: "Numeric value for lowest numbered host on the link." }

Since the DstPath !=0, the switch will perform the following steps to forward the data to the next switch along the path:

PathSwitchMatrix ( *SrcSw, DstSw, Path ) { Link: LinkN: "Link to forward the data to", *Sw: SwN: "Switch to receive forwarded data" }

If the network operates with access relative source addressing, the path switch matrix is reduced to a two dimensional structure. However, the efficiency for failure path handling dramatically reduces. In addition, the switch designation stored data, SwN, is required only for networks that support more than two switches per link. Most networks restrict topologies to two switches per link. Multiple switches per link usually occur in high-level fault tolerance networks only. Ordered Networks will operate properly under both conditions. If the network topology supports more than two switches per link, Ordered Networking architecture allows for load balancing between switches under control of the Interior Map Server.

Once the next link and next switch are known, the following steps are performed:

SwitchTable ( LinkN )=> { MacTable: MacSwTable: SrcMacSwTable, BaseHostNumber, SwLinkMacAddress: "Constant for a specific Switch and link", . . . } where:
  SrcMacAddress=SwLinkMacAddress;
  DstMacAddress=MacSwTable (SwN);
The following function then forwards the frame to the first intermediate switch:
  MacFrame ( SrcMacAddress: "From SwLinkMacAddress", DstMacAddress: "From MacSwTable", *Size, *MacDependentFields . . . , Transport Packet )

Next is the Intermediate Switch Object Network Data Structures. In the following description, for each intermediate switch, N will be incremented, until the next switch matches the DstSw. This indicates that the data is being forwarded to the switch connected to the destination Connective Entity.

Both the SrcHost and the DstHost are from the inbound Transport Packet:
  ConnectiveEntityLookup ( SrcHost, OrderMethod )=> { Sw: SrcSw: "Switch associated with this Host number", Link: SrcLink: "Link associated with this Host number" HostNumberBase: "Numeric value for lowest numbered host on the link." }
  ConnectiveEntityLookup ( DstHost, OrderMethod )=> { Sw: DstSw: "Switch associated with this Host number", Link: DstLink: "Link associated with this Host number" HostNumberBase: "Numeric value for lowest numbered host on the link." }
  PathSwitchMatrix ( *SrcSw, DstSw, Path)=> { Link: LinkN: "Link to forward the data to", *Sw: SwN: "Switch to receive forwarded data" }

The forwarding is continued by performing the following steps until the DstSw==SwN, this indicates that the destination switch connected to the destination Connective Entity has been reached and the processing of the next section should follow.

Once the next link and next switch are known, the following steps are performed:
  SwitchTable ( LinkN )=> { MacTable: MacSwTable, BaseHostNumber, SwLinkMacAddress: "Constant for a specific Switch and link", . . . }
where:
  SrcMacAddress=SwLinkMacAddress;
  DstMacAddress=MacSwTable (SwN);
The following forwards the frame to the next intermediate switch:
  MacFrame ( SrcMacAddress: "From SwLinkMacAddress", DstMacAddress: "From MacSwTable", *Size, *MacDependentFields . . . , Transport Packet )
It should be noted that these are the same steps as the Source Switch Object, as described hereinbefore.

Now the Destination Switch Object Network Data Structures are considered. Because the DstSw==SwN, the data is forwarded to the destination host, with the DstLink and the DstHost from the inbound Transport Packet. At the Destination switch, the following data structures are required:
  SwitchTable ( DstLink )=> { MacTable, MacSwTable, BaseHostNumber, SwLinkMacAddress, . . . }
where:
  SrcMacAddress=SwLinkMacAddress;
  DstMacAddress=MacTable ( DstHost ( Hnumber )—BaseHostNumber: "Becomes base relative HostNumber")=> { MacAddress }
The following function forwards the Packet to the destination:
  MacFrame ( SrcMacAddress: "Constant for a specific NE", DstMacAddress: "From MacSwTable", *Size, *MacDependentFields, Transport Packet )

Note that the local switch does not need to call the ConnectiveEntityLookup lookup because the DstAddress contained all of the necessary information for forwarding. Two direct index lookups results in proper data forwarding to the local destination host by the local switch. It should be noted that Local Destination Switch Object steps are the same whether local or intermediate switches are involved.

For Interior to Exterior Traffic Class 46, illustrative ordered network Data Structures are as follows. Data originating inside of the local domain or area but terminating remotely requires one additional step for interior switch processing. In addition, the edge switches may or may not have additional processing depending on the control agreement for the shared inter-domain link. Since the additional processing step is required regardless of whether the switch is an intermediate or a source switch, only the intermediate switch case will be detailed.

Transit supplied data structures attained from the Transport Packet:
  Packets ( Transport Header(*SrcAddress, DstAddress, *Sequencing, *OtherFields, . . . ), TransportData )
  *SrcAddress ( Domain=0, *Path, *Link, Host )
  DstAddress ( [Domain !=0, Link: DstEVLink: "Exterior View"], *Path, Host )

Since the path switch matrix is used for forwarding, the required input to access the stored data is as follows:
  Source Switch—Obtained from the locally relevant Source Host Address.
  Destination Switch—Unknown because the Destination Host is not locally relevant.
  Path—Obtained from the locally relevant Path portion of the Destination Address.

Since the source switch is determined from the Connective Entity of the local Source host, the address contains this information. Equally true the path information is locally relevant and obtained from the address. The Destination Switch, however, cannot be determined from the Destination Host number. The Destination Address host number has relevance within the destination domain only. The shared link to the destination, however, is shown as Exterior View relevant and not optional. Each exterior link is numbered consecutively and attached to the switch that represents the last stop before exiting the local domain. Thus a table is used to translate the exterior link numbers to interior edge switches. The path switch matrix as described in detail hereinbefore performs this function.

For Intermediate Switch Object Network Data Structures; for each intermediate switch, N will be incremented, until the next switch matches the DstSw. This indicates that the data is being forwarded to the switch connected to the destination Connective Entity.

Both the SrcHost and the DstEVLink are from the inbound Transport Packet.
  ConnectiveEntityLookup ( SrcHost, OrderMethod )=> { Sw: SrcSw: "Switch associated with this Host number", Link: SrcLink: "Link associated with this Host number" HostNumberBase: "Numeric value for lowest numbered host on the link." }
The additional step required to access the Path Switch Matrix is:
  ExteriorLinkSwTable ( EVLink ) { EdgeSw }
  DstSw=ExteriorLinkSwTable ( DstEVLink )
  PathSwitchMatrix ( *SrcSw, DstSw, Path )=>{ Link: LinkN: "Link to forward the data to", *Sw: SwN: "Switch to receive forwarded data" }

The following steps are performed on a continuing basis until the DstSw==SwN, which indicates that the destination switch connected to the destination Connective Entity has been reached and exterior to interior processing may follow.

Once the next link and next switch are known, the following steps are performed:

SwitchTable ( LinkN )=>{ MacTable: MacSwTable, BaseHostNumber, SwLinkMacAddress: "Constant for a specific Switch and link", . . . } where

SrcMacAddress=SwLinkMacAddress;
DstMacAddress=MacSwTable (SwN);

The following forwards the frame to the next intermediate switch:

MacFrame ( SrcMacAddress: "From SwLinkMacAddress", DstMacAddress: "From MacSwTable", *Size, *MacDependentFields . . . , Transport Packet )

Data originating outside of the local domain or area but terminating locally, i.e. exterior to interior traffic, requires one additional step over interior switch processing. In addition, the edge switches may or may not have additional processing depending on the control agreement for the shared inter-domain link. Since the additional processing step is required regardless of whether the switch is a intermediate or a destination switch, only the intermediate switch case will be detailed.

Transit supplied data structures attained from the Transport Packet:

Packets ( Transport Header(*SrcAddress, DstAddress, *Sequencing, *OtherFields, . . . ), TransportData )
  *SrcAddress ( [Domain !=0, Link: SrcEVLink: "Exterior View"], *Path, Host )
  DstAddress ( Domain=0, *Path, *Link, Host )

The path switch matrix is used for forwarding and the required input to access the stored data is the source switch, which is unknown because the Source Host is not locally relevant; the destination switch, which is obtained from the locally relevant Destination Host Address; and the path, which is obtained from the locally relevant Path portion of the Destination Address.

Since the destination switch is determined from the Connective Entity of the local destination host, the address contains this information. Equally true the path information is locally relevant and obtained from the address. The Source Switch, however, cannot be determined from the Source Host number. The Source Address host number has relevance within the Source domain only. The shared link to the Source, however, is shown as Exterior View relevant and not optional. Again, since each exterior link is numbered consecutively and attached to the switch that represents the first stop upon entering the local domain, a table, i.e. the path switch matrix, is used to translate the exterior link numbers to interior edge switches. In the following discussion, for each intermediate switch N will be incremented, until the next switch matches the DstSw. This indicates that the data is being forwarded to the switch connected to the destination Connective Entity.

Both the SrcEVLink and the DstHost are from the inbound Transport Packet.

ConnectiveEntityLookup (DstHost, OrderMethod)=> { Sw: DstSw: "Switch associated with this Host number", Link: DstLink: "Link associated with this Host number" HostNumberBase: "Numeric value for lowest numbered host on the link." }

The additional step required to access the Path Switch Matrix is:

ExteriorLinkSwTable ( EVLink ) { EdgeSw }
SrcSw=ExteriorLinkSwTable ( SrcEVLink )
PathSwitchMatrix (*Src Sw, DstSw, Path )=>{ Link: LinkN: "Link to forward the data to", *Sw: SwN: "Switch to receive forwarded data" }

In this illustrative embodiment the following steps will be performed until the DstSw==SwN, which indicates that the destination switch connected to the destination Connective Entity has been reached and the transitory traffic processing should follow.

Once the next link and next switch are known, the following steps are performed:

SwitchTable ( LinkN )=>{ MacTable: MacSwTable, BaseHostNumber, SwLinkMacAddress: "Constant for a specific Switch and link", . . . }
SrcMacAddress=SwLinkMacAddress;
DstMacAddress=MacSwTable (SwN);

The following forwards the frame to the next intermediate switch:

MacFrame ( SrcMacAddress: "From SwLinkMacAddress", DstMacAddress: "From MacSwTable", *Size, *MacDependentFields . . . , Transport Packet )

Finally, the transitory traffic class network data structures are described.

Transit supplied data structures attained from the Transport Packet:

Packets ( Transport Header(*SrcAddress, DstAddress, *Sequencing, *OtherFields, . . . ), TransportData )
  *SrcAddress ( [Domain !=0, Link: SrcEVLink: "Exterior View"], *Path, Host )
  DstAddress ( [Domain !=0, Link: DstEVLink: "Exterior View"], *Path, Host )

Since the path switch matrix is used for forwarding and the required input to access the stored data is:

Source Switch—Unknown because the Destination Host is not locally relevant.
Destination Switch—Unknown because the Source Host is not locally relevant.
Path—Obtained from the locally relevant Path portion of the Destination Address.

The path information is locally relevant and obtained from the address. The Source and Destination Switches, however, cannot be determined from the Source and Destination Host numbers. The Addressees' host numbers have relevance within the remote domains only. The shared links to the addresses, however, are shown as Exterior View relevant and not optional. Each exterior link is numbered consecutively and attached to the switch that represents the first stop upon entering or exiting the local domain. Again, the path switch matrix includes a table that translates the exterior link numbers to interior edge switches.

In the following discussion, for each intermediate switch, N should be incremented until the next switch matches the DstSw. This indicates that the data is being forwarded to the switch connected to the destination Connective Entity.

Both the SrcEVLink and the DstEVLink are from the inbound Transport Packet.

Again, additional steps are required to access the Path Switch Matrix:

ExteriorLinkSwTable ( EVLink ) { EdgeSw }
SrcSw=ExteriorLinkSwTable ( SrcEVlink )
DstSw=ExteriorLinkSwTable ( DstEVlink )
PathSwitchMatrix ( *SrcSw, DstSw, Path )=>{ Link: LinkN: "Link to forward the data to", *Sw: SwN: "Switch to receive forwarded data" }

Once the next link and next switch are known, the following steps are performed:

SwitchTable ( LinkN ) { MacTable: MacSwTable, BaseHostNumber, SwLinkMacAddress: "Constant for a specific Switch and link", . . . }
SrcMacAddress=SwLinkMacAddress;
DstMacAddress=MacSwTable (SwN);

The following forwards the frame to the next intermediate switch:

MacFrame ( SrcMacAddress: "From SwLinkMacAddress", DstMacAddress: "From MacSwTable", *Size, *MacDependentFields . . . , Transport Packet )

In order to understand the additional processing required for Ordered Network edges switches, and edge forwarding data structures, the three types of shared links (connective entities) must be understood.

Absolute Authoritative Shared Links, are links which map to standard IP, and are only implicated if ordered networking is implemented in the context of standard IP.

Mutually Controlled Shared Links, are links in which all connected entities agree to a control authority that is responsible to provide inter-domain mapping information and proper forwarding, if inter-connected entities obtain Domain addresses for Transport packets from the Mutual Control Authority. Mutually shared links require no translation for forwarding because the destination domain address fields will be relevant to the domain on the other side of the shared link. This type of control facilitates efficient backbone Fabric Domains.

Independently Controlled Shared Links are links where each entity connected by the shared link independently determines inter-domain maps. Each shared link responds to DMS neighbor queries to create Network Address Translation (NAT) tables. These NAT entries translate locally relevant Domain addresses into neighbor relevant Domain addresses as packets pass the inter-domain shared link. The translation is from locally relevant local tables to neighbor relevant upon domain exit. This allows inbound inter-domain packets to already be relevant to the local domain upon entry.

Independently controlled Shared Links require network address translation upon exit of a domain. Data entering a domain will already be translated to locally relevant domain addresses and require no additional translation. The Domain Map Server (DMS) is responsible for maintaining the edge switch Network Address Translation table at each edge switch for each independently controlled domain shared link. The required translation table follows:

Transit supplied data structures attained from the Transport Packet:

Packets ( Transport Header(*SrcAddress, DstAddress, *Sequencing, *OtherFields, . . . ), TransportData )
DstAddress ( [Domain !=0, Link: DstEVLink: "Exterior View", *Path], Host )

For DstAddress, the bracket fields are translated prior to creating the MacFrame.

SwitchTable ( LinkN )=>{ MacTable: MacSwTable, BaseHostNumber, SwLinkMacAddress: "Constant for a specific Switch and link", IndependentNAT, . . . }
IndependentNAT ( Domain, Link, Path )=>{ NeighborDomain, NeighborLink, NeighborPath }
DstAddress ( [Domain=NeighborDomain, Link=NeighborLink, Path=NeighborPath], Host )
Packets ( Transport Header(*SrcAddress, DstAddress, *Sequencing, *OtherFields, . . . ), TransportData )

Once translated, add framing as previously discussed. No other processing is required at Ordered Network inter-domain independently controlled-shared links.

Fabric Domains or backbone networks provide inter-connections not between hosts but between domains. With Ordered Networking, substantially every data structure and algorithm previously explained applies directly to backbone inter-connections with a simple change of scale. In each of the previous discussions, the source and destination address pair represented a co-ordinate system for a local interior domain consisting of hosts. If the word host is replaced with domain, and each of the access fields was changed from host address fields to domain address fields, nothing else would be required. The exact same data structures will work for inter-domain. Only the ordering applied to the addresses must be applied to the domain numbering within the backbone fabric. The following duplicates the intermediate switch section and highlights the change required to properly work with a Fabric Domain Ordered Network.

In the following discussion, for each intermediate switch N should be incremented, until the next switch matches the DstSw. This indicates that the data is being forwarded to the switch connected to the destination Connective Entity.

Both the SrcDomain and the DstDomain are from the inbound Transport Packet.

ConnectiveEntityLookup ( SrcDomain, OrderMethod ) { Sw: SrcSw: "Switch associated with this Domain number", Link: SrcLink: "Link associated with this Domain number" DomainNumberBase: "Numeric value for lowest numbered Domain on the link." }
ConnectiveEntityLookup ( DstDomain, OrderMethod ) { Sw: DstSw: "Switch associated with this Domain number", Link: DstLink: "Link associated with this Domain number" DomainNumberBase: "Numeric value for lowest numbered Domain on the link." }
PathSwitchMatrix ( *SrcSw, DstSw, Path ) { Link: LinkN: "Link to forward the data to", *Sw: SwN: "Switch to receive forwarded data" }

Once the next link and next switch are known, the following steps are performed:

SwitchTable ( LinkN ) { MacTable: MacSwTable, BaseDomainNumber, SwLinkMacAddress: "Constant for a specific Switch and link", . . . }
SrcMacAddress=SwLinkMacAddress;
DstMacAddress=MacSwTable (SwN);

The following forwards the frame to the next intermediate switch:

MacFrame ( SrcMacAddress: "From SwLinkMacAddress", DstMacAddress: "From MacSwTable", *Size, *MacDependentFields . . . , Transport Packet )

Just as the above Fabric Domains use the domain address fields as a higher scale from the host fields, the Darea field of the Domain address may be used to create an additional scale level within a Fabric Domain. Interior Fabric Domain scaling allows aggregation of smaller sized domains to provide for efficient high-speed backbone switch usage. Again, nothing changes to provide for this efficiency except a change of scale. Only the ordering applied to the addresses must be applied to the Domain Area numbering within the backbone fabric domain.

The following, as with the Fabric Domain section hereinabove, effectively duplicates the intermediate switch data structures and highlights the minimal change required to properly work with Areas (i.e. higher scale than Fabric Domain) in an Ordered Network configuration according to the invention.

Both the SrcDarea and the DstDarea are from the inbound Transport Packet.

ConnectiveEntityLookup (SrcDarea, OrderMethod ) {
        Sw: SrcSw: "Switch associated with this Darea number", Link: SrcLink: "Link associated with this Darea number" DareaNumberBase: "Numeric value for lowest numbered Darea on the link." }
    ConnectiveEntityLookup (DstDarea, OrderMethod ) {
        Sw: DstSw: "Switch associated with this Darea number", Link: DstLink: "Link associated with this Darea number" DareaNumberBase: "Numeric value for lowest numbered Darea on the link." }
    PathSwitchMatrix ( *SrcSw, DstSw, Path ) { Link: LinkN: "Link to forward the data to", *Sw: SwN: "Switch to receive forwarded data" }

Once the next link and next switch are known, the following steps are performed:

SwitchTable ( LinkN ) { MacTable: MacSwTable, BaseDareaNumber, SwLinkMacAddress: "Constant for a specific Switch and link", . . . }
    SrcMacAddress=SwLinkMacAddress;
    DstMacAddress=MacSwTable (SwN);

The following forwards the frame to the next intermediate switch:

MacFrame ( SrcMacAddress: "From SwLinkMacAddress", DstMacAddress: "From MacSwTable", *Size, *MacDependentFields . . . , Transport Packet )

Interior Domain Area scaling allows aggregation of smaller sized interior network elements to provide for efficient control and network resource usage. Again, nothing changes to provide for this efficiency except a change of scale. Only the ordering applied to the addresses must be applied to the Interior Area numbering within the local domain. The following section duplicates the intermediate switch section and highlights the minor changes required to properly work with Interior Areas according to the Ordered Network concept(s).

Again, both the SrcHarea and the DstHarea are from the inbound Transport Packet.

ConnectiveEntityLookup (SrcHarea, OrderMethod ) {
        Sw: SrcSw: "Switch associated with this Harea number", Link: SrcLink: "Link associated with this Harea number" HareaNumberBase: "Numeric value for lowest numbered Harea on the link." }
    ConnectiveEntityLookup (DstHarea, OrderMethod ) {
        Sw: DstSw: "Switch associated with this Harea number", Link: DstLink: "Link associated with this Harea number" HareaNumberBase: "Numeric value for lowest numbered Harea on the link." }
    PathSwitchMatrix ( *SrcSw, DstSw, Path) { Link: LinkN: "Link to forward the data to", *Sw: SwN: "Switch to receive forwarded data" }

Once the next link and next switch are known, the following steps are performed:

SwitchTable ( LinkN )=>{ MacTable: MacSwTable, BaseHareaNumber, SwLinkMacAddress: "Constant for a specific Switch and link", . . . }
    SrcMacAddress=SwLinkMacAddress;
    DstMacAddress=MacSwTable (SwN);

The following forwards the frame to the next intermediate switch:

MacFrame ( SrcMacAddress: "From SwLinkMacAddress", DstMacAddress: "From MacSwTable", *Size, *MacDependentFields . . . , Transport Packet)

This type of scaling could be used to create virtually indefinite levels of segmented control, but the practical limit is two. Two interior scales and two exterior scales provide for solutions to even the most complex of inter-networking problems with astronomical gains in forwarding efficiency. The complexity level of these forwarding data structures facilitates a hardware level implementation.

If the abstract objects created provide a consistent service standard regardless of the physical underlying networks, the goals of Ordered Networking are achieved. The implementation of each physical abstract object may vary with the physical underlying networks. However, the aggregate objects will combine the physical abstract objects in a uniform, functional, and reliable manner.

In the following sections, several networks are analyzed to further characterize the communication functions, communication characteristics, and end station functions of ordered networking. The networks progress from simple to moderately complex. Particular physical networks are not considered. Individual network specifics are implementation details that are generalized by the network object abstractions described hereinbefore. Each specific network, however, must be accurately represented by the object abstractions, as illustrated.

For simplification of description purposes, communication functions in an ordered network are analyzed hereinafter with respect to a simple network illustrated in FIG. 30, which shows the minimalist network, comprising a single link 96 with 2 Hosts 98, 100. The communication functions involved in such a network, according to ordered networking of the invention are:

ON Address Assignment: a host must identify itself to the other host and assign Ordered Network addresses.
    ON Address to Physical Address Association: Ordered Network addresses must be mapped onto the physical network link addresses.

The communication characteristics of such a simple network are, since each host can talk to the other, there is one bi-directional connection on one path (Bob 98 to/from Jim 100), two unidirectional connections on one path (Bob 98 to Jim 100, Jim 100 to Bob 98), and no multi-point connections on one path.

Regarding communication bandwidth on such a simple network, since each host can determine the amount of inbound data arriving, each host can determine the outbound network capacity available on the local network simply by knowing the total network link capacity link and subtracting the inbound network capacity. This assumes inbound and outbound traffic shares the network medium. Since each host communicates through their computer directly to the connecting link, latency is fixed and constant with respect to a given direction. The latency per direction, however, may be different based on the types of computers, communication cards, and software on each system.

Figure 30:
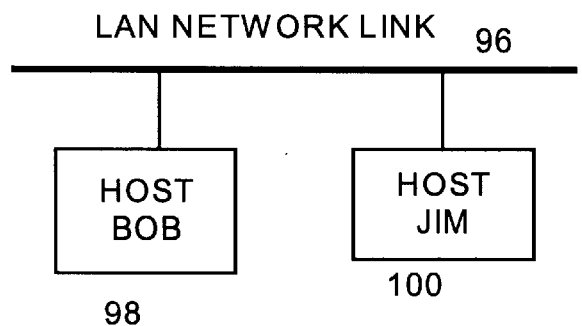
FIG. 30 is a block diagram of a minimal network with two hosts.

In the network of FIG. 30, end station functions should include data chopping. Chopping the data is required because the physical network link transfer size will be limited and most likely smaller than that of the application transfer data size. Data sequencing between the two end stations may be included if the two applications required sequential data and the physical network can drop or cause erroneous packets. If the two applications need all data to arrive sequentially, the applications may use a window acknowledgment method as known in the art. If the applications require all data exchanged but not necessarily sequenced, the applications may use a mosaic acknowledgment method as known in the art. If the applications are stream oriented, data outages may require nothing more than quantification of non-acknowledged data.

In such an implementation, packet integrity is provided for header and payload at the physical interface layer. Note that sequencing functionality is listed as part of the end station functionality. Topological considerations may require sequencing, although the host end station applications do not require it. Since sequencing, as a function, will use less software when performed at the source, it is listed as an end station function for both situations. Sequencing data at the network introduces tremendous overhead, while adding it to the source causes virtually no additional overhead. Also note, that chopping functionality is not referred to as framing. Ordered networks have the source chop data into the smallest possible frame size required by links along the selected path. This data, however, will be aggregated along the path when transiting links of larger frame size. When the data traverses a smaller link, the data will automatically be framed for the smaller link without software intervention. This occurs because the chopped pieces have proper addressing already in place as they leave the source. Remember that nothing in an ordered network is layered except the end station software. In fact, switch forwarding requires substantially no software at all.

Figure 31:
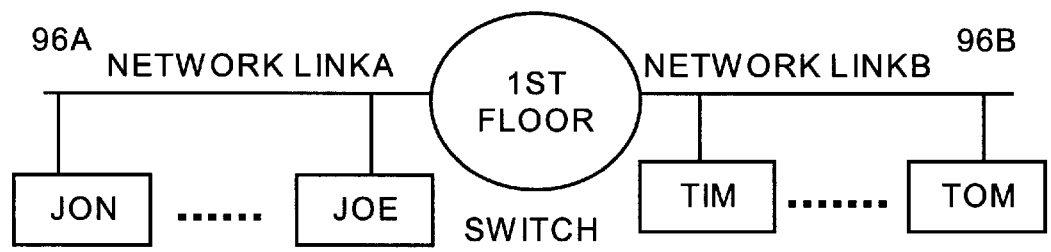
FIG. 31 expands on the network of FIG. 30 to show a simple network with many hosts.

Now the description will focus on a slightly higher level of network complexity: a single physical network with multiple hosts, as shown in FIG. 31. Several functions, characteristics, and control methods become more complex.

Communication functions still require ON address assignment. Hosts must identify themselves to the other hosts and Ordered Network addresses must be assigned. However, this function now requires coordination. The network needs to assign the addresses to each host upon request. This implies a network entity must be designated to assign unique ON addresses in a coordinated way, as described hereinbefore. In addition, each address and host name has to be unique for this single link network. Once the choice is made to designate an assignment entity, the risk of failure must be addressed such that if the assignment entity disappears, the network address assignment function continues to work properly.

In this more complex configuration, ON address to physical address association must be done. Ordered Network addresses must be mapped onto the physical network link addresses. Since the ON assignment entity will receive ON address requests framed by the MAC address of the physical layer, this entity could provide the mapping function between inter-network to physical network mapping as well during the request handling. This would make the address assignment entity responsible for ON address assignment, and ON address to MAC (Medium Access Control) address mapping.

Since each host can talk to any other, there are multiple communication connections, N—Hosts per single link. More specifically there are:
1. $\Sigma(N-1)$, N=1 to N=H, bi-directional connections on one shared path.
2. $2*\Sigma(N-1)$, unidirectional connections on one shared path.
3. $\Sigma(\Sigma(N-1))$, N=N-1 to N=H, initial N=3, multi-point connections on one shared path.

Pertinent to bandwidth considerations, multiple communications between differing independent hosts or sets of hosts (multi-point) can occur at the same time. Without the network coordinating the beginning and ending of communications or querying all active hosts in an ordered, low bandwidth consuming way, bandwidth capacity will be random and uncoordinated. ON local bandwidth checking can be effected, including querying/controlling the number of simultaneously active host, multi-point groups, etc. Similarly, querying/controlling of locally active host and simultaneous connection levels, and querying/controlling active host data source throttling can be effected. Since each host communicates through their computer directly to the connecting link, the latency will be a function of the number of simultaneously active parallel connections and the transfer characteristics of the physical network plus the fixed overhead of the local host. To control latency capacity the same criteria for bandwidth would apply.

End station functions in the more complex configuration include chopping the data into packets, which is required because the physical network link transfer size will be limited and most likely smaller than that of the application transfer data size. As with the less complex case data may require sequencing between two end stations. Each network application may open communications with multiple hosts simultaneously. Equally, differing applications may be communicating simultaneously on the same host. Consequently, once the data arrives at the local host end station a mechanism for delivering the data to specific application code threads must exist.

Generally, transfer characteristics for networks, like Ethernet, token ring, etc. for a known packet size starts out linear until a certain number of connects is exceeded. After hitting this "knee", usually a sudden and exponential drop in capacity occurs. By coordinating the number of simultaneous connections, the network may be kept from exceeding this knee thereby maintaining a predictable performance for both capacity and throughput. Regardless of the characterization functions for specific networks, without a mechanism to coordinate shared capacity on a link, the number of simultaneous connections will collapse network devices using back-off algorithms like most LANs. The only way to have predictable communication would be to coordinate connectivity and data throttle by the network for each data source. If the mechanism for coordinating can be applied generally, characterizing the physical network is the easiest part. In addition, no users suffer, if the duration of connectivity during peak periods is limited and application were designed to accept these limits by operating in the background or rescheduling network activity, everyone is better off.

Figure 32:
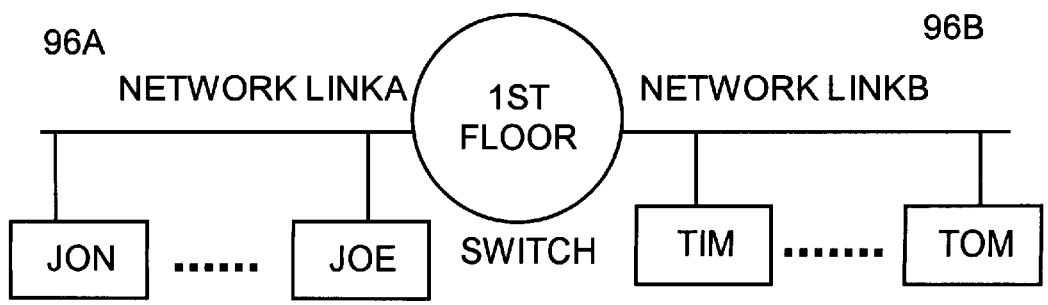
FIG. 32 is a block diagram of a simple switched network with one switch and two links with many hosts.

A still more complex single switch network with multiple links and hosts, as shown in FIG. 32, is now discussed. By connecting multiple physical links with a forwarding switch, additional functions are required to determine relative position, co-ordinate communication characteristic differences, and sequence the overall connectivity. Communication functions in such a network include ON Address Assignment wherein hosts must identify themselves to the other hosts and Ordered Network addresses must be assigned. This function now, requires coordination at two levels.

On each link either each host has to have the address previously configured or the network needs to assign the addresses to each host upon request. The latter implies a network entity designated to assign addresses in a coordinated way so that no two addresses are assigned to the same host. In addition, each address and host name has to be unique within this network. Once the choice is made to designate an assignment entity, the risk of failure must be addressed such that if the assignment entity disappears, the network address assignment function continues to work properly.

On each switch once each independent network link becomes active and the switches are identified, ON address reordering for link identification takes place. This reordering enables the host addresses to identify specific links as well as specific hosts.

ON name resolution, via the ON Interior Name Service, is implicated in that each link's hosts need to be known across links. In addition, those names need translation into relative ON addresses to locate hosts. Since only the switch knows about both links, this functionality belongs on the switch.

Similarly, ON Mapping (i.e. ON address to network link association, is implicated in that hosts on one link must be differentiated from hosts on another link by assigned addressing space. Each links' addresses are assigned by an independent method before co-ordination by a switch. Each link initializes as an independent network. When the switch initializes, the single link addresses must be re-ordered. The re-ordered address identifies both a specific link as well as a specific host. This assignment is required when multiple links attach by the same switch. This implies that the switches should be responsible for that assignment. This ON mapping function is performed by the ON Interior Map Service, ON IMS, described hereinbefore.

Further, Ordered Network addresses must be mapped onto the physical network link addresses. Since the ON assignment entity will receive ON address requests framed by the MAC address of the physical layer, this entity could provide the mapping function between Inter-network to physical network mapping as well during the request handling. Although this function has not changed, other address related requirements have created two network entities: ON Interior Name Service and ON Interior Map Service. This functionality could be incorporated into either but since it is primarily database in nature, it belongs in the ON Interior Name Service. This would make the address assignment entity responsible for ON address assignment, and ON address to MAC address mapping.

Multiple communications between differing independent hosts or sets of hosts (multi-point) can occur at the same time. With the introduction of multiple links, each connection becomes inter-dependent on the activity of other links. Without the network coordinating the beginning and ending of communications or querying all active hosts in an ordered, low bandwidth consuming way, bandwidth capacity will be random and uncoordinated. ON Bandwidth Query, Check, & Set are used to control link capacity of local transfers, including: querying/controlling the number of simultaneously active host, multi-point groups, etc; querying/controlling locally active host and simultaneous connections levels; and querying/controlling active hosts' data source throttle.

This information must then be broken down into local link traffic for each independent link and shared link traffic. The shared link traffic is limited to the capacity available of the lowest capacity link for the current data traffic flow. A higher capacity link feeding a lower capacity link cannot generate more data than the low capacity link will handle without wasting bandwidth of the higher capacity link. Without consideration of the capacity of each link in a multi-link path, the higher capacity links waste bandwidth because if more capacity is generated than can be delivered, the network capacity from the source to the point that the network drops the data is wasted. This capacity could have been used by traffic terminating before the bottleneck occurs. The only way to minimize bandwidth waste is to coordinate capacity for each new connection, i.e. ensure the capacity exists before data traffic begins. The only way to control congestion is to prevent congestion. Ordered networks prevent congestion by allowing connections when capacity is available.

Once a connection spans a switch, the latency of the switch's forwarding must be considered as well as the latency inherent in individual network links and host end stations. Characterizing the latency of the switch depends on whether the forwarding is done in software or hardware. If done in hardware, the switch latency should be constant within physical queue depth limits. If done in driver software, the switch latency will be dependent on memory and CPU capacity as well.

Again, end station functions include chopping the data into packets because the physical network link transfer size will be limited and most likely smaller that of the application transfer data size. As connections span multiple links, the smallest frame size of a link limits the source chop size. Note that because of the way ON switched process queued data, these smaller packets will be aggregated across larger frame size links automatically. When going from a large size to a smaller frame size link, the data will be chopped smaller as well, if the source originally chopped the data into the smallest possible pieces. The frame size data aggregation by intermediate switches does not require the data be destined for the same place, only that while transiting the current area, the data is destined for the same local exit point. Data sequencing between the two end stations will be required as well.

With the increased complexity, each network application may open communications with multiple hosts simultaneously. Consequently, once the data arrives at the local host end station a mechanism for delivering the data to specific application code threads must exist.

A map server computer should be able to analyze the inter-dependencies of multiple links spanning diverse networks in order to control connections and have predictable communication behavior. This is the algorithmic goal of ordered networking. Equally true, by detailing the limits associated with basic quantities during design, a choice of calculating versus. pre-storing information in tables should be made. As the number of connections quickly increases, data associated with these connections would exhaust large amounts of memory. Nevertheless, the total number of hosts associated with a particular link is a relatively fixed quantity by comparison, the data associated with each host is accessed often for mapping and resolution. Putting this into a table would save considerable processing.

Ordered Networks according to the invention, are composed primarily of distributed data structures, calculated performance data, and network forwarding elements. All support server functions either load forwarding data structures, calculate performance capacity, or resolve relative addresses. Consequently, each object responds to the same set of commands; i.e. query, set, and check. Query allows dynamic determination of a request. Check allows information presented to be compared to network data that may be either dynamic or static in nature. Set allows the user, the network manager, or the network to modify network data or conditions. If an object supports multiple commands, these may be combined or made conditional, i.e. If (Query>Check) then Set. This simple control set allows the elimination of other network protocols and allows consistent, uniform development of distributed network applications. Aggregate network abstractions, like paths, domains, etc. may be queried for multiples, but a set may only operate on an individual instance. Conditionals allow for combinations of plurals as long as the conditional evaluates to one instance. For example, a command set ON Query, Check, and Set Best Path, will query all paths between a source and destination, compare the paths dynamic performance against the profile represented by the Check data, and sets the best-fit path.

Figure 33:
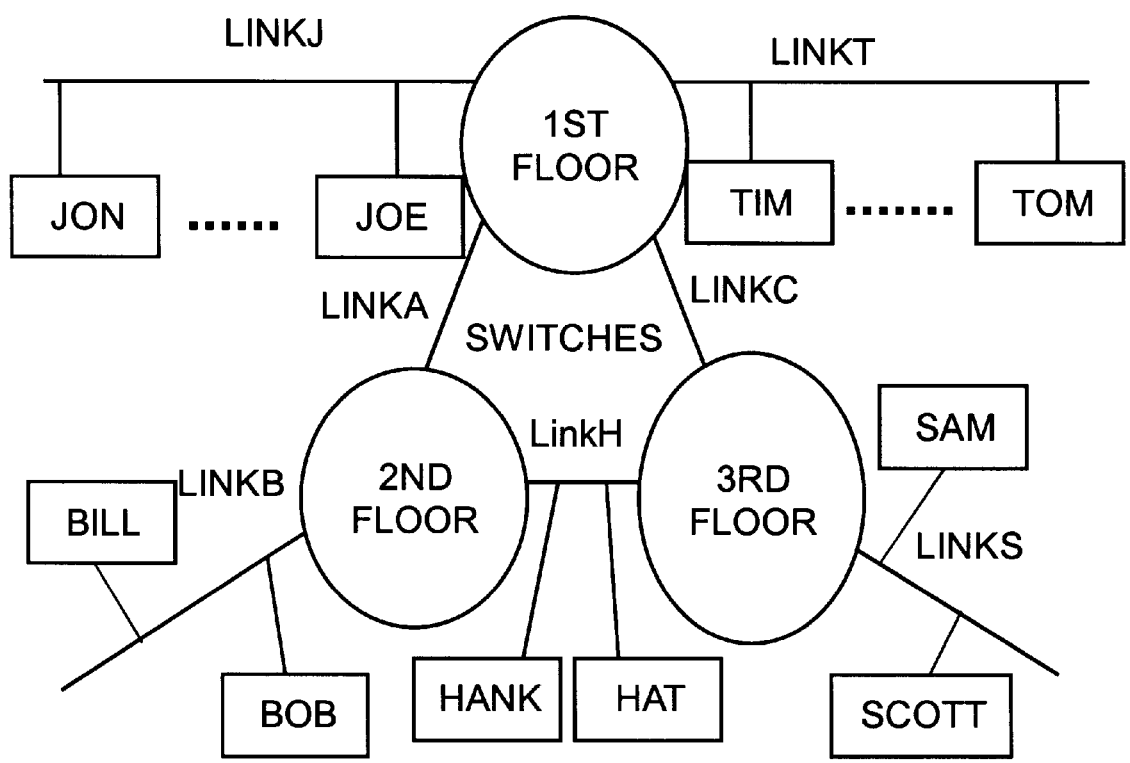
FIG. 33 is a block diagram of a network with multiple forwarding switches connected by multiple physical links and many hosts.

Finally, a network with multiple forwarding switches connected by multiple physical links is described, as shown in FIG. 33. This network requires additional functions to determine relative switch location, to co-ordinate inter-switch ordering, and to sequence the overall connectivity.

Hosts must identify themselves to the other hosts and Ordered Network and addresses must be assigned. This function now, requires coordination at three levels. On each link a network entity must be designated to assign addresses in a coordinated way so that no two addresses are assigned to hosts on the same network link. Again, once the choice is made to designate an assignment entity, the risk of failure must be addressed such that if the assignment entity disappears, the network address assignment function continues to work properly.

On each switch, once each independent network link becomes active and the switches are identified, ON Address reordering for hosts and links must take place. In addition, the switches will be reordered based on the ON IMS interior map, according to ON address reordering for switch identification. The reordering enables the host addresses to identify specific switches, links and hosts. This function is implemented in each switch object but is controlled by the ON IMS. The ON IMS switch is normally designated as the lowest ordered, highest connected switch, as described hereinbefore.

Each link's hosts also need to be known across links. In addition, those names need translation it into relative ON addresses to locate hosts. Since only the switch knows about multiple links, this functionally belongs on the switch. When multiple switches exist, a specific switch aggregates all interior name resolution for the interior domain. Normally, this information is stored and duplicated in each domain edge switch. When a network has no edge switches, the control entity becomes the highest ordered network switch.

Hosts on one link must be differentiated from hosts on another link by assigned addressing space. Link addresses are assigned by an independent method before co-ordination by a switch. Each link initializes as an independent network. When the switch initializes, the individual link addresses must be re-ordered. The re-ordered address identifies a specific switch, a specific link, as well as a specific host. This assignment is required when multiple links attach by the same switch. This implies that the switches should be responsible for that assignment. Re-ordering switches in multi-switch networks is ON Mapping, and is performed by the ON Interior Map Service.

Likewise, Ordered Network addresses must be mapped onto the physical network link addresses. Since the ON assignment entity will receive ON address requests framed by the MAC address of the physical layer, this entity could provide the mapping function between Inter-network to physical network mapping as well during the request handling. Although this function has not changed, other address related requirements have created two network entities: ON Interior Name Service and ON Interior Map Service. This functionality could be incorporated into either but since it is primarily database in nature, it belongs in the ON Interior Name Service. This would make the address assignment entity responsible for assigning ON addresses and ON address to MAC address mapping.

Multiple paths are introduced when multiple switches are interconnected. Multiple switches with multiple interconnecting links create multiple paths. The ON IMS determines these path relationships. Both the number switches and the number of links effect the total number of path combinations.

Multiple communications between differing independent hosts or sets of hosts (multi-point) can occur at the same time. With the introduction of multiple links, each connection becomes inter-dependent on the activity of other links. Without the network coordinating the beginning and ending of communications or querying all active host in an ordered, low bandwidth consuming way, bandwidth capacity will be random and uncoordinated. ON bandwidth commands Query, Check, & Set are used to control link capacity of local transfers as with other less complex cases.

As connections span differing bandwidth links, the switches queue depth must be designed in conjunction with the source data throttle and switch data flow profile mechanism. To compound the complexity, the number of connections from independent sources through the same link effects queuing as well. Queue depth at a switch for no drop conditions may ultimately be the limiting factor to the number of concurrent connections per link as opposed to link capacity. Once a connection spans a switch, the latency of the switch's forwarding must be considered as well as the latency inherent in individual network links and host end stations. Characterizing the latency of the switch depends on whether the forwarding is done in software or hardware. If done in hardware, the switch latency should be constant within physical queue depth limits. If done in driver software, the switch latency will be dependent on memory and CPU capacity as well.

End station functions in this complex case illustrated in FIG. 33 are substantially the same as described hereinbefore in less complex cases, and include data chopping, data sequencing and data separation, as previously discussed.

It should be noted that the ON IMS and ON INS services are ordinarily at opposite ends of the network. ON IMS functionality is calculation intensive and outbound data intensive. ON IMS functions distribute data to switch for handling topology, data flow, and quality of service issues (which are beyond the scope of this application). The more connected the switch the shorter, better the outbound data distribution. The ON INS functions primarily as a distributed database processor to resolve queries and store dynamic responses. This data is not directly required for forwarding by switches and therefore, is less time critical. The less connected a switch, the less forwarding traffic, therefore, the more capacity for incoming request handling. Spreading functionality across a network minimizes control-related congestion. Note also that requests will often effect both senders at the same time. If a query and check paths request were processed, the ON IMS server would identify the sets of topological links, while the ON INS server collected the link capacity information for those links. Finally, the ON IMS would aggregate this data and compare the data to the users data flow profile. The ON IMS would return the set of paths ordered from closest profile matching to least profile matching to no capacity paths. When the user responds with a Set Path, the ON IMS would distribute the path switch matrix information required, establishing the path. The ON INS server would distribute connectivity and profile data as required by the path elements. Each server effectively relies on the same distributed database for information. Other than the Request/Response, little information is exchanged between the servers. Each server, however, performs those services required by the request within its charter. The ON INS handles distributed database related services. The ON IMS handles path calculation and switch matrix data distribution. Both services are required for request handling but by distributing the workload, the network as a whole becomes resilient.

In the previous section, network topology analysis showed that as network complexity increased the functions required by the network to control and coordinate communications increased (even if slightly) and shifted position within the network. For simple topologies, host end stations could perform all functions necessary to coordinate communications but as individual links were interconnected by switches additional server functions were required to coordinate and control communications paths, network topologies, and network addressing.

While the ordered network implementation described hereinbefore included four particular traffic classes described as domain traffic including interior class, transitory class, interior to exterior and exterior to interior traffic, it should be appreciated by those skilled in the art that other classes of traffic can be defined, and might be defined as a function of the "layer" at which ordering is imposed. For example, data traffic classes for physical link categorization might include: Local Traffic where source and destination systems terminate on the same link; Transit Traffic where source and destination systems are both on different links than the selected link, the selected link is an intermediate link on an end to end path; Source Traffic where the local link has the source system attached but not the destination; and Destination Traffic where the local link has the destination system attached but not the source.

Further, it should be appreciated that analysis of data flow for a single interconnected network link applies equally when focus shifts to inter-domain data flow. The same quantities and reasoning that applies at this lowest level will apply to inter-domain data flow equally well. Equally true, the Interior Map Service algorithms that allow mapping for an interior network domain are the same algorithms applied to the Domain Map Service for inter-domain mapping. In fact, although the network lists the ON DMS and ON IMS as separate entities, and they physically are within the network, these two servers use the substantially the same algorithms and control queries but differ in perspective. The software to implement the two servers is substantially the same with slight variations in packet definitions only. They are maintained as physically different within the network domain because the interior map service belongs at the highest interior connectivity point or the domain center and the inter-domain map server belong where exterior domains connect to the local domain or at the domain edges (this natural duality in function and characterization is why the previous topological analysis stopped short (for the sake of simplicity) of fully considering connecting the interior domain with exterior domains). The algorithms for interior topology and data flow apply directly to inter-domain communications as well with only a change in perspective required.

Although the ordered networking implementation herein is described including particular servers (e.g. IMS, DNS etc) it should be appreciated that other services can be implemented for extending the concepts of ON, such as with an ON EPS or Exterior Path Selection Service which could be extensions to ON IMS for quality of service, multiple parallel paths, and group support or the like.

Although the invention has been shown and described with respect to exemplary embodiments thereof, various other changes, omissions and additions in the form and detail thereof may be made therein without departing from the spirit and scope of the invention.

APPENDIX A

The following analysis shows the possible paths of the sample network shown in FIG. 10, starting at node 1 and traversing unique path combinations, starting from the shortest to the longest. The map server determines path combinations for all source and destination pairs within a network segment. Then the map server sorts them according to the base class algorithms documented earlier. The path switch matrixes at each switch point are loaded with directed paths as well as failure link rerouting alternatives. Direct connections. Paths marked with a * are alternate but unique routes, which become orthogonal path choices in the PSM:

R1 on L1 to R2
R1 on L2 to R4
R1 on L3 to R5
R1 on L4 to GR8
R1 on L5 to GR9
Single Hop Connections R1 on L1 to R2 on L2 to R3
R1 on L1 to R2 on L3 to R6
R1 on L1 to R2 on L4 to GR7
R1 on L1 to R2 on L5 to GR9 *
R1 on L2 to R4 on L2 to R3 *
R1 on L2 to R4 on L3 to GR7 *
R1 on L2 to R4 on L4 to GR8 *
R1 on L3 to R5 on L2 to GR9 *
R1 on L3 to R5 on L3 to GR8 *
R1 on L4 to GR8 on L2 to R4 *
R1 on L4 to GR8 on L3 to R5 *
R1 on L5 to GR9 on L2 to R2 *
R1 on L5 to GR9 on L3 to R3 *
R1 on L5 to GR9 on L4 to R5 *
2 Hop Connections R1 on L1 to R2 on L2 to R3 on L2 to R4 *
R1 on L1 to R2 on L2 to R3 on L3 to GR7 *
R1 on L1 to R2 on L2 to R3 on L4 to GR9 *
R1 on L1 to R2 on L4 to GR7 on L2 to R3 *
R1 on L1 to R2 on L4 to GR7 on L3 to R4 *
R1 on L1 to R2 on L5 to GR9 on L3 to R3 *
R1 on L1 to R2 on L5 to GR9 on L4 to R5 *
R1 on L2 to R4 on L2 to R3 on L1 to R2 *
R1 on L2 to R4 on L2 to R3 on L3 to GR7 *
R1 on L2 to R4 on L2 to R3 on L4 to GR9 *
R1 on L2 to R4 on L3 to GR7 on L1 to R2 *
R1 on L2 to R4 on L3 to GR7 on L2 to R3 *
R1 on L2 to R4 on L4 to GR8 on L1 to R5 *
R1 on L3 to R5 on L2 to GR9 on L2 to R2 *
R1 on L3 to R5 on L2 to GR9 on L3 to R3 *
R1 on L3 to R5 on L3 to GR8 on L2 to R4 *
R1 on L4 to GR8 on L2 to R4 on L2 to R3 *
R1 on L4 to GR8 on L2 to R4 on L3 to GR7 *
R1 on L4 to GR8 on L3 to R5 on L2 to GR9 *
R1 on L5 to GR9 on L2 to R2 on L2 to R3 *
R1 on L5 to GR9 on L2 to R2 on L3 to R6 *
R1 on L5 to GR9 on L2 to R2 on L4 to GR7 *
R1 on L5 to GR9 on L3 to R3 on L1 to R2 *
R1 on L5 to GR9 on L3 to R3 on L2 to R4 *
R1 on L5 to GR9 on L3 to R3 on L3 to GR7 *
R1 on L5 to GR9 on L4 to R5 on L3 to GR8 *

3 Hop Connections

R1 on L1 to R2 on L2 to R3 on L2 to R4 on L3 to GR7 *
R1 on L1 to R2 on L2 to R3 on L2 to R4 on L4 to GR8 *
R1 on L1 to R2 on L2 to R3 on L3 to GR7 on L3 to R4 *
R1 on L1 to R2 on L2 to R3 on L4 to GR9 on L4 to R5 *
R1 on L1 to R2 on L4 to GR7 on L2 to R3 on L2 to R4 *
R1 on L1 to R2 on L4 to GR7 on L3 to R4 on L2 to R3 *
R1 on L1 to R2 on L4 to GR7 on L3 to R4 on L4 to GR8 *
R1 on L1 to R2 on L5 to GR9 on L3 to R3 on L2 to R4 *
R1 on L1 to R2 on L5 to GR9 on L3 to R3 on L3 to GR7 *
R1 on L1 to R2 on L5 to GR9 on L4 to R5 on L3 to GR8 *
R1 on L2 to R4 on L2 to R3 on L1 to R2 on L3 to R6 *
R1 on L2 to R4 on L2 to R3 on L1 to R2 on L4 to GR7 *
R1 on L2 to R4 on L2 to R3 on L1 to R2 on L5 to GR9 *
R1 on L2 to R4 on L2 to R3 on L3 to GR7 on L1 to R2 *
R1 on L2 to R4 on L2 to R3 on L4 to GR9 on L2 to R2 *
R1 on L2 to R4 on L2 to R3 on L4 to GR9 on L4 to R5 *
R1 on L2 to R4 on L3 to GR7 on L1 to R2 on L2 to R3 *
R1 on L2 to R4 on L3 to GR7 on L1 to R2 on L3 to R6 *
R1 on L2 to R4 on L3 to GR7 on L1 to R2 on L5 to GR9 *
R1 on L2 to R4 on L3 to GR7 on L2 to R3 on L4 to GR9 *
R1 on L2 to R4 on L4 to GR8 on L1 to R5 on L2 to GR9 *
R1 on L3 to R5 on L2 to GR9 on L2 to R2 on L2 to R3 *
R1 on L3 to R5 on L2 to GR9 on L2 to R2 on L3 to R6 *
R1 on L3 to R5 on L2 to GR9 on L2 to R2 on L4 to GR7 *
R1 on L3 to R5 on L2 to GR9 on L3 to R3 on L1 to R2 *
R1 on L3 to R5 on L2 to GR9 on L3 to R3 on L2 to R4 *
R1 on L3 to R5 on L2 to GR9 on L3 to R3 on L3 to GR7 *
R1 on L3 to R5 on L3 to GR8 on L2 to R4 on L2 to R3 *
R1 on L3 to R5 on L3 to GR8 on L2 to R4 on L3 to GR7 *
R1 on L4 to GR8 on L2 to R4 on L2 to R3 on L1 to R2 *
R1 on L4 to GR8 on L2 to R4 on L2 to R3 on L3 to GR7 *
R1 on L4 to GR8 on L2 to R4 on L2 to R3 on L4 to GR9 *
R1 on L4 to GR8 on L2 to R4 on L3 to GR7 on L1 to R2 *
R1 on L4 to GR8 on L2 to R4 on L3 to GR7 on L2 to R3 *
R1 on L4 to GR8 on L3 to R5 on L2 to GR9 on L2 to R2 *
R1 on L4 to GR8 on L3 to R5 on L2 to GR9 on L3 to R3 *
R1 on L5 to GR9 on L2 to R2 on L2 to R3 on L2 to R4 *
R1 on L5 to GR9 on L2 to R2 on L2 to R3 on L3 to GR7 *
R1 on L5 to GR9 on L2 to R2 on L4 to GR7 on L2 to R3 *
R1 on L5 to GR9 on L2 to R2 on L4 to GR7 on L3 to R4 *
R1 on L5 to GR9 on L3 to R3 on L1 to R2 on L3 to R6 *
R1 on L5 to GR9 on L3 to R3 on L1 to R2 on L4 to GR7 *
R1 on L5 to GR9 on L3 to R3 on L2 to R4 on L3 to GR7 *
R1 on L5 to GR9 on L3 to R3 on L2 to R4 on L4 to GR8 *
R1 on L5 to GR9 on L3 to R3 on L3 to GR7 on L1 to R2 *
R1 on L5 to GR9 on L3 to R3 on L3 to GR7 on L3 to R4 *
R1 on L5 to GR9 on L4 to R5 on L3 to GR8 on L2 to R4 *

4 Hop Connections

R1 on L1 to R2 on L2 to R3 on L2 to R4 on L4 to GR8 on L3 to R5 *
R1 on L1 to R2 on L2 to R3 on L3 to GR7 on L3 to R4 on L4 to GR8 *
R1 on L1 to R2 on L2 to R3 on L4 to GR9 on L4 to R5 on L3 to GR8 *
R1 on L1 to R2 on L4 to GR7 on L2 to R3 on L2 to R4 on L4 to GR8 *
R1 on L1 to R2 on L4 to GR7 on L3 to R4 on L2 to R3 on L4 to GR9 *
R1 on L1 to R2 on L4 to GR7 on L3 to R4 on L4 to GR8 on L3 to R5 *
R1 on L1 to R2 on L5 to GR9 on L3 to R3 on L2 to R4 on L3 to GR7 *
R1 on L1 to R2 on L5 to GR9 on L3 to R3 on L2 to R4 on L4 to GR8 *
R1 on L1 to R2 on L5 to GR9 on L3 to R3 on L3 to GR7 on L3 to R4 *
R1 on L1 to R2 on L5 to GR9 on L4 to R5 on L3 to GR8 on L2 to R4 *
R1 on L2 to R4 on L2 to R3 on L1 to R2 on L5 to GR9 on L4 to R5 *
R1 on L2 to R4 on L2 to R3 on L3 to GR7 on L1 to R2 on L3 to R6 *
R1 on L2 to R4 on L2 to R3 on L3 to GR7 on L1 to R2 on L5 to GR9 *
R1 on L2 to R4 on L2 to R3 on L4 to GR9 on L2 to R2 on L3 to R6 *
R1 on L2 to R4 on L2 to R3 on L4 to GR9 on L2 to R2 on L4 to GR7 *
R1 on L2 to R4 on L2 to R3 on L4 to GR9 on L4 to R5 on L3 to GR8 *
R1 on L2 to R4 on L3 to GR7 on L1 to R2 on L2 to R3 on L4 to GR9 *
R1 on L2 to R4 on L3 to GR7 on L1 to R2 on L5 to GR9 on L3 to R3 *
R1 on L2 to R4 on L3 to GR7 on L1 to R2 on L5 to GR9 on L4 to R5 *
R1 on L2 to R4 on L3 to GR7 on L2 to R3 on L4 to GR9 on L2 to R2 *
R1 on L2 to R4 on L3 to GR7 on L2 to R3 on L4 to GR9 on L4 to R5 *
R1 on L2 to R4 on L4 to GR8 on L1 to R5 on L2 to GR9 on L2 to R2 *
R1 on L2 to R4 on L4 to GR8 on L1 to R5 on L2 to GR9 on L3 to R3 *
R1 on L3 to R5 on L2 to GR9 on L2 to R2 on L2 to R3 on L2 to R4 *
R1 on L3 to R5 on L2 to GR9 on L2 to R2 on L2 to R3 on L3 to GR7 *
R1 on L3 to R5 on L2 to GR9 on L2 to R2 on L4 to GR7 on L2 to R3 *
R1 on L3 to R5 on L2 to GR9 on L2 to R2 on L4 to GR7 on L3 to R4 *
R1 on L3 to R5 on L2 to GR9 on L3 to R3 on L1 to R2 on L3 to R6 *
R1 on L3 to R5 on L2 to GR9 on L3 to R3 on L1 to R2 on L4 to GR7 *
R1 on L3 to R5 on L2 to GR9 on L3 to R3 on L2 to R4 on L3 to GR7 *

R1 on L3 to R5 on L2 to GR9 on L3 to R3 on L2 to R4 on L4 to GR8 *
R1 on L3 to R5 on L2 to GR9 on L3 to R3 on L3 to GR7 on L1 to R2 *
R1 on L3 to R5 on L2 to GR9 on L3 to R3 on L3 to GR7 on L3 to R4 *
R1 on L3 to R5 on L3 to GR8 on L2 to R4 on L2 to R3 on L1 to R2 *
R1 on L3 to R5 on L3 to GR8 on L2 to R4 on L2 to R3 on L3 to GR7 *
R1 on L3 to R5 on L3 to GR8 on L2 to R4 on L3 to GR7 on L1 to R2 *
R1 on L3 to R5 on L3 to GR8 on L2 to R4 on L3 to GR7 on L2 to R3 *
R1 on L4 to GR8 on L2 to R4 on L2 to R3 on L1 to R2 on L3 to R6 *
R1 on L4 to GR8 on L2 to R4 on L2 to R3 on L1 to R2 on L4 to GR7 *
R1 on L4 to GR8 on L2 to R4 on L2 to R3 on L1 to R2 on L5 to GR9 *
R1 on L4 to GR8 on L2 to R4 on L2 to R3 on L3 to GR7 on L2 to R2 *
R1 on L4 to GR8 on L2 to R4 on L2 to R3 on L4 to GR9 on L2 to R2 *
R1 on L4 to GR8 on L2 to R4 on L2 to R3 on L4 to GR9 on L4 to R5 *
R1 on L4 to GR8 on L2 to R4 on L3 to GR7 on L1 to R2 on L2 to R3 *
R1 on L4 to GR8 on L2 to R4 on L3 to GR7 on L1 to R2 on L3 to R6 *
R1 on L4 to GR8 on L2 to R4 on L3 to GR7 on L1 to R2 on L5 to GR9 *
R1 on L4 to GR8 on L2 to R4 on L3 to GR7 on L2 to R3 on L1 to R2 *
R1 on L4 to GR8 on L2 to R4 on L3 to GR7 on L2 to R3 on L4 to GR9 *
R1 on L4 to GR8 on L3 to R5 on L2 to GR9 on L2 to R2 on L2 to R3 *
R1 on L4 to GR8 on L3 to R5 on L2 to GR9 on L2 to R2 on L3 to R6 *
R1 on L4 to GR8 on L3 to R5 on L2 to GR9 on L2 to R2 on L4 to GR7 *
R1 on L4 to GR8 on L3 to R5 on L2 to GR9 on L3 to R3 on L1 to R2 *
R1 on L4 to GR8 on L3 to R5 on L2 to GR9 on L3 to R3 on L2 to R4 *
R1 on L4 to GR8 on L3 to R5 on L2 to GR9 on L3 to R3 on L3 to GR7 *
R1 on L5 to GR9 on L2 to R2 on L2 to R3 on L2 to R4 on L3 to GR7 *
R1 on L5 to GR9 on L2 to R2 on L2 to R3 on L2 to R4 on L4 to GR8 *
R1 on L5 to GR9 on L2 to R2 on L2 to R3 on L3 to GR7 on L3 to R4 *
R1 on L5 to GR9 on L2 to R2 on L4 to GR7 on L2 to R3 on L2 to R4 *
R1 on L5 to GR9 on L2 to R2 on L4 to GR7 on L3 to R4 on L2 to R3 *
R1 on L5 to GR9 on L2 to R2 on L4 to GR7 on L3 to R4 on L4 to GR8
R1 on L5 to GR9 on L3 to R3 on L1 to R2 on L4 to GR7 on L3 to R4 *
R1 on L5 to GR9 on L3 to R3 on L2 to R4 on L3 to GR7 on L1 to R2 *
R1 on L5 to GR9 on L3 to R3 on L2 to R4 on L4 to GR8 on L3 to R5 *
R1 on L5 to GR9 on L3 to R3 on L3 to GR7 on L1 to R2 on L3 to R6 *
R1 on L5 to GR9 on L3 to R3 on L3 to R7 on L3 to R4 on L4 to GR8*
R1 on L5 to GR9 on L4 to R5 on L3 to GR8 on L2 to R4 on L2 to R3 *
R1 on L5 to GR9 on L4 to R5 on L3 to GR8 on L2 to R4 on L3 to GR7 *

Fig. 10: Node 1 Distribution of Alternative Paths

| Node 1 to Others | Hops = 0 | Hops = 1 | Hops = 2 | Hops = 3 |
|---|---|---|---|---|
| Node R1 | None | None. | None. | None. |
| Node R2 | 1 | 1 | 5 | 12 |
| Node R3 | None | 2 | 8 | 7 |
| Node R4 | 1 | 2 | 6 | 8 |
| Node R5 | 1 | 2 | 4 | 6 |
| Node R6 | None | 1 | 2 | 7 |
| Node GR7 | None | 2 | 7 | 17 |
| Node GR8 | 1 | 3 | 4 | 8 |
| Node GR9 | 1 | 3 | 6 | 11 |

The number in the box tell the number of path unique alternatives determined for the source and destination pairs and the number of network hops (intermediate switches). Depending on the topology, the map server will crunch paths until enough alternates to populate the path switch matrix have been determined. Some topologies in example trees, will not provide for alternate routes for all combinations of source and destination pairs. The map server will analyze the topology to determine and identify isolation links, a link that when broken cause section of the network to become isolated. For the topology in FIG. 10, with two hops, there are more than enough alternate paths determined. Except for the isolated R6 node branch. This node would be flagged as an isolated node.

The topological analysis provides path lists for each combination of source and destination node pairs within the network. The map server would now sort these combinations based on the shortest path first and traffic classes. Only paths with two hops or less are maintained and longer paths should be removed from the sort to minimize the calculation time. The following tables contain the path information for each of the other nodes reduced to two hops or less.

FIG. 10: Node 2 Paths
Direct Connections

R2 on L1 to R1
R2 on L2 to R3
R2 on L3 to R6
R2 on L4 to GR7
R2 on L5 to GR9
Single Hop Connections R2 on L1 to R1 on L2 to R4
R2 on L1 to R1 on L3 to R5
R2 on L1 to R1 on L4 to GR8
R2 on L1 to R1 on L5 to GR9 *
R2 on L2 to R3 on L2 to R4 *
R2 on L2 to R3 on L3 to GR7 *
R2 on L2 to R3 on L4 to GR9 *
R2 on L4 to GR7 on L2 to R3 *
R2 on L4 to GR7 on L3 to R4 *
R2 on L5 to GR9 on L1 to R1 *
R2 on L5 to GR9 on L3 to R3 *
R2 on L5 to GR9 on L4 to R5 *
2 Hop Connections R2 on L1 to R1 on L2 to R4 on L2 to R3 *

R2 on L1 to R1 on L2 to R4 on L3 to GR7 *
R2 on L1 to R1 on L2 to R4 on L4 to GR8 *
R2 on L1 to R1 on L3 to R5 on L2 to GR9 *
R2 on L1 to R1 on L3 to R5 on L3 to GR8 *
R2 on L1 to R1 on L4 to GR8 on L2 to R4 *
R2 on L1 to R1 on L4 to GR8 on L3 to R5 *
R2 on L1 to R1 on L5 to GR9 on L3 to R3 *
R2 on L1 to R1 on L5 to GR9 on L4 to R5 *
R2 on L2 to R3 on L2 to R4 on L1 to R1 *
R2 on L2 to R3 on L2 to R4 on L3 to GR7 *
R2 on L2 to R3 on L2 to R4 on L4 to GR8 *
R2 on L2 to R3 on L3 to GR7 on L3 to R4 *
R2 on L2 to R3 on L4 to GR9 on L1 to R1 *
R2 on L2 to R3 on L4 to GR9 on L4 to R5 *
R2 on L4 to GR7 on L2 to R3 on L2 to R4 *
R2 on L4 to GR7 on L2 to R3 on L4 to GR9 *
R2 on L4 to GR7 on L3 to R4 on L1 to R1 *
R2 on L4 to GR7 on L3 to R4 on L2 to R3 *
R2 on L4 to GR7 on L3 to R4 on L4 to GR8 *
R2 on L5 to GR9 on L1 to R1 on L2 to R4 *
R2 on L5 to GR9 on L1 to R1 on L3 to R5 *
R2 on L5 to GR9 on L1 to R1 on L4 to GR8 *
R2 on L5 to GR9 on L3 to R3 on L2 to R4 *
R2 on L5 to GR9 on L3 to R3 on L3 to GR7 *
R2 on L5 to GR9 on L3 to R3 on L4 to GR8 *
R2 on L5 to GR9 on L4 to R5 on L1 to R1 *
R2 on L5 to GR9 on L4 to R5 on L3 to GR8 *
FIG. 10: Node 3 Paths
Direct Connections R3 on L1 to R2
R3 on L2 to R4
R3 on L3 to GR7
R3 on L4 to GR9
Single Hop Connections R3 on L1 to R2 on L1 to R1
R3 on L1 to R2 on L3 to R6
R3 on L1 to R2 on L4 to GR7 *
R3 on L1 to R2 on L5 to GR9 *
R3 on L2 to R4 on L1 to R1
R3 on L2 to R4 on L3 to GR7 *
R3 on L2 to R4 on L4 to GR8
R3 on L3 to GR7 on L1 to R2 *
R3 on L3 to GR7 on L3 to R4 *
R3 on L4 to GR9 on L1 to R1 *
R3 on L4 to GR9 on L2 to R2 *
R3 on L4 to GR9 on L4 to R5
2 Hop Connections R3 on L1 to R2 on L1 to R1 on L2 to R4 *
R3 on L1 to R2 on L1 to R1 on L3 to R5 *
R3 on L1 to R2 on L1 to R1 on L4 to GR8 *
R3 on L1 to R2 on L1 to R1 on L5 to GR9 *
R3 on L1 to R2 on L4 to GR7 on L3 to R4 *
R3 on L1 to R2 on L5 to GR9 on L1 to R1 *
R3 on L1 to R2 on L5 to GR9 on L4 to R5 *
R3 on L2 to R4 on L1 to R1 on L1 to R2 *
R3 on L2 to R4 on L1 to R1 on L3 to R5 *
R3 on L2 to R4 on L1 to R1 on L4 to GR8 *
R3 on L2 to R4 on L1 to R1 on L5 to GR9 *
R3 on L2 to R4 on L3 to GR7 on L1 to R2 *
R3 on L2 to R4 on L4 to GR8 on L1 to R1 *
R3 on L2 to R4 on L4 to GR8 on L3 to R5 *
R3 on L3 to GR7 on L1 to R2 on L1 to R1 *
R3 on L3 to GR7 on L1 to R2 on L3 to R6 *
R3 on L3 to GR7 on L1 to R2 on L5 to GR9 *
R3 on L3 to GR7 on L3 to R4 on L1 to R1 *
R3 on L3 to GR7 on L3 to R4 on L4 to GR8 *
R3 on L4 to GR9 on L1 to R1 on L1 to R2 *
R3 on L4 to GR9 on L1 to R1 on L2 to R4 *
R3 on L4 to GR9 on L1 to R1 on L3 to R5 *
R3 on L4 to GR9 on L1 to R1 on L4 to GR8 *
R3 on L4 to GR9 on L2 to R2 on L1 to R1 *
R3 on L4 to GR9 on L2 to R2 on L3 to R6 *
R3 on L4 to GR9 on L2 to R2 on L4 to GR7 *
R3 on L4 to GR9 on L4 to R5 on L1 to R1 *
R3 on L4 to GR9 on L4 to R5 on L3 to GR8 *
FIG. 10: Node 4 Paths
Direct Connections R4 on L1 to R1
R4 on L2 to R3
R4 on L3 to GR7
R4 on L4 to GR8
Single Hop Connections R4 on L1 to R1 on L1 to R2
R4 on L1 to R1 on L3 to R5
R4 on L1 to R1 on L4 to GR8 *
R4 on L1 to R1 on L5 to GR9
R4 on L2 to R3 on L1 to R2 *
R4 on L2 to R3 on L3 to GR7 *
R4 on L2 to R3 on L4 to GR9 *
R4 on L3 to GR7 on L1 to R2 *
R4 on L3 to GR7 on L2 to R3 *
R4 on L4 to GR8 on L1 to R1 *
R4 on L4 to GR8 on L3 to R5 *
2 Hop Connections R4 on L1 to R1 on L1 to R2 on L2 to R3 *
R4 on L1 to R1 on L1 to R2 on L3 to R6 *
R4 on L1 to R1 on L1 to R2 on L4 to GR7 *
R4 on L1 to R1 on L1 to R2 on L5 to GR 9 *
R4 on L1 to R1 on L3 to R5 on L2 to GR 9 *
R4 on L1 to R1 on L3 to R5 on L3 to GR 8 *
R4 on L1 to R1 on L4 to GR8 on L3 to R5 *
R4 on L1 to R1 on L5 to GR9 on L2 to R2 *
R4 on L1 to R1 on L5 to GR9 on L3 to R3 *
R4 on L1 to R1 on L5 to GR9 on L4 to R5 *
R4 on L2 to R3 on L1 to R2 on L1 to R1 *
R4 on L2 to R3 on L1 to R2 on L3 to R6 *
R4 on L2 to R3 on L1 to R2 on L4 to GR7 *
R4 on L2 to R3 on L1 to R2 on L5 to GR9 *
R4 on L2 to R3 on L3 to GR7 on L1 to R2 *
R4 on L2 to R3 on L4 to GR9 on L1 to R1 *
R4 on L2 to R3 on L4 to GR9 on L2 to R2 *
R4 on L2 to R3 on L4 to GR9 on L4 to R5 *
R4 on L3 to GR7 on L1 to R2 on L1 to R1 *
R4 on L3 to GR7 on L1 to R2 on L2 to R3 *
R4 on L3 to GR7 on L1 to R2 on L3 to R6 *
R4 on L3 to GR7 on L1 to R2 on L5 to GR9 *
R4 on L3 to GR7 on L2 to R3 on L1 to R2 *
R4 on L3 to GR7 on L2 to R3 on L4 to GR9 *
R4 on L4 to GR8 on L1 to R1 on L1 to R2 *
R4 on L4 to GR8 on L1 to R1 on L3 to R5 *
R4 on L4 to GR8 on L1 to R1 on L5 to GR9 *
R4 on L4 to GR8 on L3 to R5 on L1 to R1 *
R4 on L4 to GR8 on L3 to R5 on L2 to GR9 *
FIG. 10: Node 5 Paths
Direct Connections R5 on L1 to R1
R5 on L2 to GR9

R5 on L3 to GR8
Single Hop Connections

R5 on L1 to R1 on L1 to R2
R5 on L1 to R1 on L2 to R4
R5 on L1 to R1 on L4 to GR8 *
R5 on L1 to R1 on L5 to GR9 *
R5 on L2 to GR9 on L1 to R1 *
R5 on L2 to GR9 on L2 to R2
R5 on L2 to GR9 on L3 to R3
R5 on L3 to GR8 on L1 to R1 *
R5 on L3 to GR8 on L2 to R4 *
2 Hop Connections R5 on L1 to R1 on L1 to R2 on L2 to R3 *
R5 on L1 to R1 on L1 to R2 on L3 to R6
R5 on L1 to R1 on L1 to R2 on L4 to GR7
R5 on L1 to R1 on L1 to R2 on L5 to GR9 *
R5 on L1 to R1 on L2 to R4 on L2 to R3 *
R5 on L1 to R1 on L2 to R4 on L3 to GR7 *
R5 on L1 to R1 on L2 to R4 on L4 to GR8 *
R5 on L1 to R1 on L4 to GR8 on L2 to R4 *
R5 on L1 to R1 on L5 to GR9 on L2 to R2 *
R5 on L1 to R1 on L5 to GR9 on L3 to R3 *
R5 on L2 to GR9 on L1 to R1 on L1 to R2 *
R5 on L2 to GR9 on L1 to R1 on L2 to R4 *
R5 on L2 to GR9 on L1 to R1 on L4 to GR8 *
R5 on L2 to GR9 on L2 to R2 on L1 to R1 *
R5 on L2 to GR9 on L2 to R2 on L2 to R3 *
R5 on L2 to GR9 on L2 to R2 on L3 to R6 *
R5 on L2 to GR9 on L2 to R2 on L4 to GR7 *
R5 on L2 to GR9 on L3 to R3 on L1 to R2 *
R5 on L2 to GR9 on L3 to R3 on L2 to R4 *
R5 on L2 to GR9 on L3 to R3 on L3 to GR7 *
R5 on L3 to GR8 on L1 to R1 on L1 to R2 *
R5 on L3 to GR8 on L1 to R1 on L2 to R4 *
R5 on L3 to GR8 on L1 to R1 on L5 to GR9 *
R5 on L3 to GR8 on L2 to R4 on L1 to R1 *
R5 on L3 to GR8 on L2 to R4 on L2 to R3 *
R5 on L3 to GR8 on L2 to R4 on L3 to GR7 *
FIG. 10: Node 6 Paths
Direct Connections R6 on L1 to R2
Single Hop Connections R6 on L1 to R2 on L1 to R1
R6 on L1 to R2 on L2 to R3
R6 on L1 to R2 on L4 to GR7
R6 on L1 to R2 on L5 to GR9
2 Hop Connections R6 on L1 to R2 on L1 to R1 on L2 to R4
R6 on L1 to R2 on L1 to R1 on L3 to R5
R6 on L1 to R2 on L1 to R1 on L4 to GR8
R6 on L1 to R2 on L1 to R1 on L5 to GR9 *
R6 on L1 to R2 on L2 to R3 on L2 to R4 *
R6 on L1 to R2 on L2 to R3 on L3 to GR7 *
R6 on L1 to R2 on L2 to R3 on L4 to GR9 *
R6 on L1 to R2 on L4 to GR7 on L2 to R3 *
R6 on L1 to R2 on L4 to GR7 on L3 to R4 *
R6 on L1 to R2 on L5 to GR9 on L1 to R1 *
R6 on L1 to R2 on L5 to GR9 on L3 to R3 *
R6 on L1 to R2 on L5 to GR9 on L4 to R5 *

FIG. 10: Node 7 Paths
Direct Connections

GR7 on L1 to R2
GR7 on L2 to R3
GR7 on L3 to R4
Single Hop Connections

GR7 on L1 to R2 on L1 to R1
GR7 on L1 to R2 on L2 to R3 *
GR7 on L1 to R2 on L3 to R6
GR7 on L1 to R2 on L5 to GR9
GR7 on L2 to R3 on L1 to R2 *
GR7 on L2 to R3 on L2 to R4 *
GR7 on L2 to R3 on L4 to GR9 *
GR7 on L3 to R4 on L1 to R1 *
GR7 on L3 to R4 on L2 to R3 *
GR7 on L3 to R4 on L4 to GR8
2 Hop Connections GR7 on L1 to R2 on L1 to R1 on L2 to R4 *
GR7 on L1 to R2 on L1 to R1 on L3 to R5
GR7 on L1 to R2 on L1 to R1 on L4 to GR8 *
GR7 on L1 to R2 on L1 to R1 on L5 to GR9 *
GR7 on L1 to R2 on L2 to R3 on L2 to R4 *
GR7 on L1 to R2 on L2 to R3 on L4 to GR8 *
GR7 on L1 to R2 on L5 to GR9 on L1 to R1 *
GR7 on L1 to R2 on L5 to GR9 on L3 to R3 *
GR7 on L1 to R2 on L5 to GR9 on L4 to R5 *
GR7 on L2 to R3 on L1 to R2 on L1 to R1 *
GR7 on L2 to R3 on L1 to R2 on L3 to R6 *
GR7 on L2 to R3 on L1 to R2 on L5 to GR9 *
GR7 on L2 to R3 on L2 to R4 on L1 to R1 *
GR7 on L2 to R3 on L2 to R4 on L3 to R5 *
GR7 on L2 to R3 on L2 to R4 on L4 to GR8 *
GR7 on L2 to R3 on L2 to R4 on L5 to GR9 *
GR7 on L2 to R3 on L4 to GR9 on L1 to R1 *
GR7 on L2 to R3 on L4 to GR9 on L2 to R2 *
GR7 on L2 to R3 on L4 to GR9 on L4 to R5 *
GR7 on L3 to R4 on L1 to R1 on L1 to R2 *
GR7 on L3 to R4 on L1 to R1 on L3 to R5 *
GR7 on L3 to R4 on L1 to R1 on L4 to GR8 *
GR7 on L3 to R4 on L1 to R1 on L5 to GR9 *
GR7 on L3 to R4 on L2 to R3 on L1 to R2 *
GR7 on L3 to R4 on L2 to R3 on L4 to GR9 *
GR7 on L3 to R4 on L4 to GR8 on L1 to R1 *
GR7 on L3 to R4 on L4 to GR8 on L3 to R5 *
FIG. 10: Node 8 Paths
Direct Connections GR8 on L1 to R1
GR8 on L2 to R4
GR8 on L3 to R5
Single Hop Connections GR8 on L1 to R1 on L1 to R2
GR8 on L1 to R1 on L2 to R4 *
GR8 on L1 to R1 on L3 to R5
GR8 on L1 to R1 on L5 to GR9
GR8 on L2 to R4 on L1 to R1 *
GR8 on L2 to R4 on L2 to R3
GR8 on L2 to R4 on L3 to GR7
GR8 on L3 to R5 on L1 to R1 *
GR8 on L3 to R5 on L2 to GR9 *
2 Hop Connections GR8 on L1 to R1 on L1 to R2 on L2 to R3 *

GR8 on L1 to R1 on L1 to R2 on L3 to R6
GR8 on L1 to R1 on L1 to R2 on L4 to GR7 *
GR8 on L1 to R1 on L1 to R2 on L5 to GR9 *
GR8 on L1 to R1 on L2 to R4 on L2 to R3 *
GR8 on L1 to R1 on L2 to R4 on L3 to GR7 *
GR8 on L1 to R1 on L3 to R5 on L2 to GR9 *
GR8 on L1 to R1 on L5 to GR9 on L2 to R2 *
GR8 on L1 to R1 on L5 to GR9 on L3 to R3 *
GR8 on L1 to R1 on L5 to GR9 on L4 to R5 *
GR8 on L2 to R4 on L1 to R1 on L1 to R2 *
GR8 on L2 to R4 on L1 to R1 on L3 to R5 *
GR8 on L2 to R4 on L1 to R1 on L5 to GR9 *
GR8 on L2 to R4 on L2 to R3 on L1 to R2 *
GR8 on L2 to R4 on L2 to R3 on L3 to GR7 *
GR8 on L2 to R4 on L2 to R3 on L4 to GR9 *
GR8 on L2 to R4 on L3 to GR7 on L1 to R2 *
GR8 on L2 to R4 on L3 to GR7 on L2 to R3 *
GR8 on L3 to R5 on L1 to R1 on L1 to R2 *
GR8 on L3 to R5 on L1 to R1 on L2 to R4 *
GR8 on L3 to R5 on L1 to R1 on L5 to GR9 *
GR8 on L3 to R5 on L2 to GR9 on L1 to R1 *
GR8 on L3 to R5 on L2 to GR9 on L2 to R2 *
GR8 on L3 to R5 on L2 to GR9 on L3 to R3 *
FIG. 10: Node 9 Paths
Direct Connections GR9 on L1 to R1
GR9 on L2 to R2
GR9 on L3 to R3
GR9 on L4 to R5
Single Hop Connections GR9 on L1 to R1 on L1 to R2 *
GR9 on L1 to R1 on L2 to R4
GR9 on L1 to R1 on L3 to R5 *
GR9 on L1 to R1 on L4 to GR8
GR9 on L2 to R2 on L1 to R1 *
GR9 on L2 to R2 on L2 to R3 *
GR9 on L2 to R2 on L3 to R6
GR9 on L2 to R2 on L4 to GR7
GR9 on L3 to R3 on L1 to R2 *
GR9 on L3 to R3 on L2 to R4 *
GR9 on L3 to R3 on L3 to GR7
GR9 on L4 to R5 on L1 to R1 *
GR9 on L4 to R5 on L3 to GR8
2 Hop Connections GR9 on L1 to R1 on L1 to R2 on L2 to R3 *
GR9 on L1 to R1 on L1 to R2 on L3 to R6 *
GR9 on L1 to R1 on L1 to R2 on L4 to GR7
GR9 on L1 to R1 on L2 to R4 on L2 to R3 *
GR9 on L1 to R1 on L2 to R4 on L3 to GR7 *
GR9 on L1 to R1 on L2 to R4 on L4 to GR8 *
GR9 on L1 to R1 on L3 to R5 on L3 to GR8 *
GR9 on L1 to R1 on L4 to GR8 on L2 to R4 *
GR9 on L1 to R1 on L4 to GR8 on L3 to R5 *
GR9 on L2 to R2 on L1 to R1 on L2 to R4 *
GR9 on L2 to R2 on L1 to R1 on L3 to R5 *
GR9 on L2 to R2 on L1 to R1 on L4 to GR8 *
GR9 on L2 to R2 on L2 to R3 on L2 to R4 *
GR9 on L2 to R2 on L2 to R3 on L3 to GR7 *
GR9 on L2 to R2 on L4 to GR7 on L2 to R3 *
GR9 on L2 to R2 on L4 to GR7 on L3 to R4 *
GR9 on L3 to R3 on L1 to R2 on L1 to R1 *
GR9 on L3 to R3 on L1 to R2 on L3 to R6 *
GR9 on L3 to R3 on L1 to R2 on L4 to GR7 *
GR9 on L3 to R3 on L2 to R4 on L1 to R1 *

GR9 on L3 to R3 on L2 to R4 on L3 to GR7 *
GR9 on L3 to R3 on L2 to R4 on L4 to GR8 *
GR9 on L3 to R3 on L3 to GR7 on L1 to R2 *
GR9 on L3 to R3 on L3 to GR7 on L3 to R4 *
GR9 on L4 to R5 on L1 to R1 on L1 to R2 *
GR9 on L4 to R5 on L1 to R1 on L2 to R4 *
GR9 on L4 to R5 on L1 to R1 on L4 to GR8 *
GR9 on L4 to R5 on L3 to GR8 on L1 to R1 *
GR9 on L4 to R5 on L3 to GR8 on L2 to R4 *

Network Topological Analysis—Selecting Base Class Paths
Once the Map Server has correlated the link sets into paths enough to include failure re-routing, the base class routes are selected for each node pairs of source and destination. This is done by sorting the paths from a given source node to differing destinations. The sort criteria will vary with the specific network. Separation of traffic classes may outweigh hop distance for some networks. Nevertheless, the outcome of the sort will be paths based on directional traffic classes or quality of service issues. Alternates to route around failed links and nodes will additionally be determined. In the following examples the first failure alternate represents a link fault redirection while the second failure alternate attempts to go through different nodes as a node failure alternate. The choice in failure alternates as with basic sort will be controlled by the network administrator. The importance in the invention, that conditions normally handled by protocols are effectively handled with static topological data tables.
FIG. 10: Node 1 Paths Sorted to Destinations
Destination Node 2

R1 on L1 to R2
  Interior Path
R1 on L5 to GR9 on L2 to R2 *
  R1 L1nk 1, Failure Alternate 1
R1 on L2 to R4 on L2 to R3 on L1 to R2 *
  Failure alternate 2
R1 on L2 to R4 on L3 to GR7 on L1 to R2 *
R1 on L3 to R5 on L2 to GR9 on L2 to R2 *
R1 on L5 to GR9 on L3 to R3 on L1 to R2 *
Destination Node 3

R1 on L1 to R2 on L2 to R3
  Interior Path
R1 on L2 to R4 on L2 to R3 *
  R1 Link1, Failure alternate 1
R1 on L5 to GR9 on L3 to R3 *
R1 on L1 to R2 on L4 to GR7 on L2 to R3 *
R1 on L1 to R2 on L5 to GR9 on L3 to R3 *
  R2 Link2, Failure Alternate 1
R1 on L2 to R4 on L3 to GR7 on L2 to R3 *
R1 on L3 to R5 on L2 to GR9 on L3 to R3 *
  R2 Node Failure alternate 2
R1 on L4 to GR8 on L2 to R4 on L2 to R3 *
R1 on L5 to GR9 on L2 to R2 on L2 to R3 *
Destination Node 4

R1 on L2 to R4
  Interior Path
R1 on L4 to GR8 on L2 to R4 *
  Failure Alternate 1, IE
R1 on L1 to R2 on L2 to R3 on L2 to R4 *
  Failure Alternate 2, EI
R1 on L1 to R2 on L4 to GR7 on L3 to R4 *
R1 on L3 to R5 on L3 to GR8 on L2 to R4 *

R1 on L5 to GR9 on L3 to R3 on L2 to R4 *
Destination Node 5

R1 on L3 to R5
   Interior Path,
R1 on L5 to GR9 on L4 to R5 *
   Failure Alternate 2, EI
R1 on L4 to GR8 on L3 to R5 *
   Failure Alternate 1, IE
R1 on L1 to R2 on L5 to GR9 on L4 to R5 *
R1 on L2 to R4 on L4 to GR8 on L1 to R5 *
Destination Node 6

R1 on L1 to R2 on L3 to R6
   Interior Path
R1 on L5 to GR9 on L2 to R2 on L3 to R6 *
   Failure Alternate—No way without R2.
Destination Node 7

R1 on L1 to R2 on L4 to GR7
   Interior Path
R1 on L2 to R4 on L3 to GR7 *
   Interior to Exterior Path
R1 on L1 to R2 on L2 to R3 on L3 to GR7 *
   R2 L1 Failure Alternate 1, EI
R1 on L2 to R4 on L2 to R3 on L3 to GR7 *
   R4 L3 Failure Alternate 2, T
R1 on L4 to GR8 on L2 to R4 on L3 to GR7 *
   R1 L2 Failure Alternate 2, T
R1 on L5 to GR9 on L2 to R2 on L4 to GR7 *
   R1 L1 Failure Alternate 1, EI
R1 on L5 to GR9 on L3 to R3 on L3 to GR7 *
Destination Node 8

R1 on L4 to GR8
   Interior to Exterior Path, Interior Path
R1 on L2 to R4 on L4 to GR8 *
   Failure Alternate 1, EI
R1 on L3 to R5 on L3 to GR8 *
   Failure Alternate 2, T
R1 on L5 to GR9 on L4 to R5 on L3 to GR8 *
Destination Node 9

R1 on L5 to GR9
   Interior to Exterior Path, Interior Path
R1 on L1 to R2 on L5 to GR9 *
   Failure Alternate 1, EI
R1 on L3 to R5 on L2 to GR9 *
   Failure Alternate 2, T
R1 on L1 to R2 on L2 to R3 on L4 to GR9 *
R1 on L2 to R4 on L2 to R3 on L4 to GR9 *
R1 on L4 to GR8 on L3 to R5 on L2 to GR9 *
FIG. 10: Node 2 Paths Sorted to Destinations
Destination Node 1

R2 on L1 to R1
   Interior path
R2 on L5 to GR9 on L1 to R1 *
   Failure Alternate 1, IE
R2 on L2 to R3 on L2 to R4 on L1 to R1 *
   Failure Alternate 2, EI
R2 on L2 to R3 on L4 to GR9 on L1 to R1 *
R2 on L4 to GR7 on L3 to R4 on L1 to R1 *
R2 on L5 to GR9 on L4 to R5 on L1 to R1 *
Destination Node 3

R2 on L2 to R3
   Interior path
R2 on L4 to GR7 on L2 to R3 *
   Failure Alternate 1, IE
R2 on L5 to GR9 on L3 to R3 *
   Failure Alternate 2, EI
R2 on L1 to R1 on L2 to R4 on L2 to R3 *
R2 on L1 to R1 on L5 to GR9 on L3 to R3 *
R2 on L4 to GR7 on L3 to R4 on L2 to R3 *
Destination Node 4

R2 on L1 to R1 on L2 to R4
   Interior path
R2 on L2 to R3 on L2 to R4 *
   Node 1 Failure Alternate 2, EI
R2 on L4 to GR7 on L3 to R4 *
R2 on L1 to R1 on L4 to GR8 on L2 to R4 *
   R1 L2 Failure Alternative 1, IE
R2 on L2 to R3 on L3 to GR7 on L3 to R4 *
R2 on L4 to GR7 on L2 to R3 on L2 to R4 *
R2 on L5 to GR9 on L1 to R1 on L2 to R4 *
   R2 L1 Failure Alternate 1, IE
R2 on L5 to GR9 on L3 to R3 on L2 to R4 *
Destination Node 5

R2 on L1 to R1 on L3 to R5
   Interior path
R2 on L5 to GR9 on L4 to R5 *
   R2 L1 Failure Alternate 1, IE
R2 on L1 to R1 on L4 to GR8 on L3 to R5 *
R2 on L1 to R1 on L5 to GR9 on L4 to R5 *
   R1 L3 Failure Alternate 1, IE
R2 on L2 to R3 on L4 to GR9 on L4 to R5 *
R2 on L5 to GR9 on L1 to R1 on L3 to R5 *
Destination Node 6

R2 on L3 to R6
   Interior path, no alternates, isolated node.
Destination Node 7

R2 on L4 to GR7
   Interior, Interior to exterior path
R2 on L2 to R3 on L3 to GR7 *
   Failure Alternate 1, EI
R2 on L1 to R1 on L2 to R4 on L3 to GR7 *
R2 on L2 to R3 on L2 to R4 on L3 to GR7 *
R2 on L5 to GR9 on L3 to R3 on L3 to GR7 *
Destination Node 8

R2 on L1 to R1 on L4 to GR8
   Interior, Interior to exterior path
R2 on L1 to R1 on L2 to R4 on L4 to GR8 *
R2 on L1 to R1 on L3 to R5 on L3 to GR8 *
   R1 L3 Failure Alternate, EI
R2 on L2 to R3 on L2 to R4 on L4 to GR8 *
   Failure Alternate 2, T
R2 on L4 to GR7 on L3 to R4 on L4 to GR8 *
R2 on L5 to GR9 on L3 to R3 on L4 to GR8 *
R2 on L5 to GR9 on L1 to R1 on L4 to GR8 *
   R2 L1 Failure Alternate 1, EI
R2 on L5 to GR9 on L4 to R5 on L3 to GR8 *

Destination Node 9

R2 on L5 to GR9
  Interior, Interior to Exterior
R2 on L1 to R1 on L5 to GR9 *
  Failure Alternate 1, EI
R2 on L2 to R3 on L4 to GR9 *
  Failure Alternate 2, T
R2 on L1 to R1 on L3 to R5 on L2 to GR9 *
R2 on L4 to GR7 on L2 to R3 on L4 to GR9 *
FIG. 10: Node 3 Paths Sorted to Destinations
Destination Node 1

R3 on L1 to R2 on L1 to R1
  Interior path
R3 on L2 to R4 on L1 to R1
  Failure Alternate 1, IE
R3 on L4 to GR9 on L1 to R1 *
  Failure Alternate 2, EI
R3 on L1 to R2 on L5 to GR9 on L1 to R1 *
  R2 L1 Failure Alternate 1, IE
R3 on L2 to R4 on L4 to GR8 on L1 to R1 *
R3 on L3 to GR7 on L1 to R2 on L1 to R1 *
R3 on L3 to GR7 on L3 to R4 on L1 to R1 *
R3 on L4 to GR9 on L2 to R2 on L1 to R1 *
R3 on L4 to GR9 on L4 to R5 on L1 to R1 *
Destination Node 2

R3 on L1 to R2
  Interior path
R3 on L3 to GR7 on L1 to R2 *
  Failure Alternate 1, IE
R3 on L4 to GR9 on L2 to R2 *
  Failure Alternate 2, EI
R3 on L2 to R4 on L1 to R1 on L1 to R2 *
R3 on L2 to R4 on L3 to GR7 on L1 to R2 *
R3 on L4 to GR9 on L1 to R1 on L1 to R2 *
Destination Node 4

R3 on L2 to R4
  Interior path
R3 on L3 to GR7 on L3 to R4 *
  Failure Alternate 1, IE
R3 on L1 to R2 on L1 to R1 on L2 to R4 *
  Failure Alternate 2, EI
R3 on L1 to R2 on L4 to GR7 on L3 to R4 *
R3 on L4 to GR9 on L1 to R1 on L2 to R4 *
Destination Node 5

R3 on L4 to GR9 on L4 to R5
  Interior path
R3 on L1 to R2 on L1 to R1 on L3 to R5 *
R3 on L1 to R2 on L5 to GR9 on L4 to R5 *
  R3 L4 Alternate 1, IE
R3 on L2 to R4 on L1 to R1 on L3 to R5 *
  Failure Alternate 2, EI
R3 on L2 to R4 on L4 to GR8 on L3 to R5 *
R3 on L4 to GR9 on L1 to R1 on L3 to R5 *
  GR9 L4 Failure Alternate, IE
Destination Node 6

R3 on L1 to R2 on L3 to R6
  Interior path
R3 on L3 to GR7 on L1 to R2 on L3 to R6 *

Failure Alternate 1 IE, Isolation failure R2
R3 on L4 to GR9 on L2 to R2 on L3 to R6 *
  Failure Alternate 2 EI, Isolation failure R2
Destination Node 7

R3 on L3 to GR7
  Interior, Interior to Exterior
R3 on L1 to R2 on L4 to GR7 *
  Failure Alternate 1, EI
R3 on L2 to R4 on L3 to GR7 *
  Failure Alternate 2, T
R3 on L4 to GR9 on L2 to R2 on L4 to GR7 *
Destination Node 8

R3 on L2 to R4 on L4 to GR8
  Interior, Interior to Exterior
R3 on L1 to R2 on L1 to R1 on L4 to GR8 *
  Failure Alternate 2, T
R3 on L2 to R4 on L1 to R1 on L4 to GR8 *
  R4 L4 Failure Alternate 1, EI
R3 on L3 to GR7 on L3 to R4 on L4 to GR8 *
  R3 L2 Failure Alternate 1, EI
R3 on L4 to GR9 on L1 to R1 on L4 to GR8 *
R3 on L4 to GR9 on L4 to R5 on L3 to GR8 *
Destination Node 9

R3 on L4 to GR9
  Interior, Interior to Exterior
R3 on L1 to R2 on L5 to GR9 *
  Failure Alternate 1, EI
R3 on L1 to R2 on L1 to R1 on L5 to GR9 *
R3 on L2 to R4 on L1 to R1 on L5 to GR9 *
R3 on L3 to GR7 on L1 to R2 on L5 to GR9 *
  Failure Alternate 2, T
FIG. 10: Node 4 Paths Sorted to Destinations
Destination Node 1

R4 on L1 to R1
  Interior path
R4 on L4 to GR8 on L1 to R1 *
  Failure Alternative 1, IE
R4 on L2 to R3 on L1 to R2 on L1 to R1 *
R4 on L2 to R3 on L4 to GR9 on L1 to R1 *
R4 on L3 to GR7 on L1 to R2 on L1 to R1 *
  Failure Alternative 2, EI
R4 on L4 to GR8 on L3 to R5 on L1 to R1 *
Destination Node 2

R4 on L1 to R1 on L1 to R2
  Interior path
R4 on L2 to R3 on L1 to R2 *
  Failure Alternative 1, IE
R4 on L3 to GR7 on L1 to R2 *
  Failure Alternative 2, EI
R4 on L1 to R1 on L5 to GR9 on L2 to R2 *
  R1 L1 Failure Alternative, IE
R4 on L2 to R3 on L3 to GR7 on L1 to R2 *
R4 on L2 to R3 on L4 to GR9 on L2 to R2 *
R4 on L3 to GR7 on L2 to R3 on L1 to R2 *
R4 on L4 to GR8 on L1 to R1 on L1 to R2 *

Destination Node 3

R4 on L2 to R3
  Interior path
R4 on L3 to GR7 on L2 to R3 *
  Failure Alternative 1, IE
R4 on L1 to R1 on L1 to R2 on L2 to R3 *
  Failure Alternative 2, EI
R4 on L1 to R1 on L5 to GR9 on L3 to R3 *
R4 on L3 to GR7 on L1 to R2 on L2 to R3 *
Destination Node 5

R4 on L1 to R1 on L3 to R5
  Interior path
R4 on L4 to GR8 on L3 to R5 *
  Failure Alternative 1, IE
R4 on L1 to R1 on L4 to GR8 on L3 to R5 *
  R1 L3 Failure Alternative 2, EI
R4 on L1 to R1 on L5 to GR9 on L4 to R5 *
R4 on L2 to R3 on L4 to GR9 on L4 to R5 *
R4 on L4 to GR8 on L1 to R1 on L3 to R5 *
Destination Node 6

R4 on L1 to R1 on L1 to R2 on L3 to R6 *
  Interior path
R4 on L2 to R3 on L1 to R2 on L3 to R6 *
  Failure Alternative 1, IE
R4 on L3 to GR7 on L1 to R2 on L3 to R6 *
  Failure Alternative 2, EI
R4 on L1 to R1 on L5 to GR9 on L2 to R2 on L3 to R6 *
  R1 L1 Failure Alternate 1, IE
Destination Node 7

R4 on L3 to GR7
  Interior, Interior to Exterior
R4 on L2 to R3 on L3 to GR7 *
  Failure Alternative 1, EI
R4 on L1 to R1 on L1 to R2 on L4 to GR7 *
  Failure Alternative 2, T
R4 on L2 to R3 on L1 to R2 on L4 to GR7 *
Destination Node 8

R4 on L4 to GR8
  Interior, Interior to Exterior
R4 on L1 to R1 on L4 to GR8 *
  Failure Alternative 1, EI
R4 on L1 to R1 on L3 to R5 on L3 to GR 8 *
  Failure Alternative 2, T
Destination Node 9

R4 on L1 to R1 on L5 to GR9
  Interior path
R4 on L2 to R3 on L4 to GR9 *
  Interior to Exterior path
R4 on L1 to R1 on L1 to R2 on L5 to GR 9 *
R4 on L1 to R1 on L3 to R5 on L2 to GR 9 *
  R1 L5 Failure Alternate, EI
R4 on L2 to R3 on L1 to R2 on L5 to GR9 *
  R3 L4 Failure Alternate, T
R4 on L3 to GR7 on L1 to R2 on L5 to GR9 *
R4 on L3 to GR7 on L2 to R3 on L4 to GR9 *
  R4 L2 Failure Alternate 2, T
R4 on L4 to GR8 on L1 to R1 on L5 to GR9 *

R4 L1 Failure Alternate 1, EI
R4 on L4 to GR8 on L3 to R5 on L2 to GR9 *
FIG. 10: Node 5 Paths Sorted to Destinations
Destination Node 1

R5 on L1 to R1
  Interior path
R5 on L2 to GR9 on L1 to R1 *
  Failure Alternate 1, IE
R5 on L3 to GR8 on L1 to R1 *
  Failure Alternate 2, EI
R5 on L2 to GR9 on L2 to R2 on L1 to R1 *
R5 on L3 to GR8 on L2 to R4 on L1 to R1 *
Destination Node 2

R5 on L1 to R1 on L1 to R2
  Interior path
R5 on L2 to GR9 on L2 to R2
  R5 L1 Failure Alternate 1, IE
R5 on L1 to R1 on L5 to GR9 on L2 to R2 *
  R1 L1 Failure Alternate 1, IE
R5 on L2 to GR9 on L1 to R1 on L1 to R2 *
R5 on L2 to GR9 on L3 to R3 on L1 to R2 *
  Failure Alternative 2, EI
R5 on L3 to GR8 on L1 to R1 on L1 to R2 *
Destination Node 3

R5 on L2 to GR9 on L3 to R3
  Interior path
R5 on L1 to R1 on L1 to R2 on L2 to R3 *
R5 on L1 to R1 on L2 to R4 on L2 to R3 *
R5 on L1 to R1 on L5 to GR9 on L3 to R3 *
  R5 L2 Failure Alternative 1, IE
R5 on L2 to GR9 on L2 to R2 on L2 to R3 *
  GR9 L3 Failure Alternative 1, IE
R5 on L3 to GR8 on L2 to R4 on L2 to R3 *
  Failure Alternative 2, EI
Destination Node 4

R5 on L1 to R1 on L2 to R4
  Interior path
R5 on L3 to GR8 on L2 to R4 *
  Failure Alternative 2, EI
R5 on L1 to R1 on L4 to GR8 on L2 to R4 *
  R1 L2 Failure Alternate 1, IE
R5 on L2 to GR9 on L1 to R1 on L2 to R4 *
  R5 L1 Failure Alternate 1, IE
R5 on L2 to GR9 on L3 to R3 on L2 to R4 *
R5 on L3 to GR8 on L1 to R1 on L2 to R4 *
Destination Node 6

R5 on L1 to R1 on L1 to R2 on L3 to R6
  Interior path
R5 on L2 to GR9 on L2 to R2 on L3 to R6 *
  Failure Alternative
Destination Node 7

R5 on L1 to R1 on L1 to R2 on L4 to GR7
  Interior path
R5 on L1 to R1 on L2 to R4 on L3 to GR7 *
  Interior to Exterior path
R5 on L2 to GR9 on L2 to R2 on L4 to GR7 *

Failure Alternative 1, EI
R5 on L2 to GR9 on L3 to R3 on L3 to GR7 *
R5 on L3 to GR8 on L2 to R4 on L3 to GR7 *
Failure Alternative 2, T
Destination Node 8

R5 on L3 to GR8
Interior, Interior to Exterior
R5 on L1 to R1 on L4 to GR8 *
Failure Alternative 1, EI
R5 on L1 to R1 on L2 to R4 on L4 to GR8 *
Failure Alternative 2, T
R5 on L1 to R1 on L4 to GR8 on L2 to R4 *
R5 on L2 to GR9 on L1 to R1 on L4 to GR8 *
Destination Node 9

R5 on L2 to GR9
Interior, Interior to Exterior
R5 on L1 to R1 on L5 to GR9 *
Failure Alternative 1, EI
R5 on L1 to R1 on L1 to R2 on L5 to GR9 *
R5 on L3 to GR8 on L1 to R1 on L5 to GR9 *
FIG. 10: Node 6 Paths Sorted to Destinations
Destination Node 1

R6 on L1 to R2 on L1 to R1
Interior path
R6 on L1 to R2 on L5 to GR9 on L1 to R1 *
Failure Alternate, IE
Destination Node 2

R6 on L1 to R2
Interior path, no failure alternates, isolation link.
Destination Node 3

R6 on L1 to R2 on L2 to R3
Interior path
R6 on L1 to R2 on L4 to GR7 on L2 to R3 *
Failure Alternate 1, IE
R6 on L1 to R2 on L5 to GR9 on L3 to R3 *
Failure Alternate 2, EI
Destination Node 4

R6 on L1 to R2 on L1 to R1 on L2 to R4
Interior path
R6 on L1 to R2 on L2 to R3 on L2 to R4 *
Failure Alternate 1, IE
R6 on L1 to R2 on L4 to GR7 on L3 to R4 *
Failure Alternate 2, EI
Destination Node 5

R6 on L1 to R2 on L1 to R1 on L3 to R5
Interior path
R6 on L1 to R2 on L5 to GR9 on L4 to R5 *
Failure Alternate, IE
Destination Node 7

R6 on L1 to R2 on L4 to GR7
Interior, Interior to Exterior
R6 on L1 to R2 on L2 to R3 on L3 to GR7 *
Failure Alternate, EI
Destination Node 8

R6 on L1 to R2 on L1 to R1 on L4 to GR8
Interior, Interior to Exterior
Destination Node 9

R6 on L1 to R2 on L5 to GR9
Interior, Interior to Exterior
R6 on L1 to R2 on L1 to R1 on L5 to GR9 *
Failure Alternate 1, EI
R6 on L1 to R2 on L2 to R3 on L4 to GR9 *
Failure Alternate 2, T
FIG. 10: Node 7 Paths Sorted to Destinations
Destination Node 1

GR7 on L1 to R2 on L1 to R1
Interior path
GR7 on L3 to R4 on L1 to R1 *
Exterior to Interior path
GR7 on L1 to R2 on L5 to GR9 on L1 to R1 *
GR7 on L2 to R3 on L1 to R2 on L1 to R1 *
Failure Alternate 1, IE
GR7 on L2 to R3 on L2 to R4 on L1 to R1 *
Failure Alternate 2, T
GR7 on L2 to R3 on L4 to GR9 on L1 to R1 *
GR7 on L3 to R4 on L4 to GR8 on L1 to R1 *
Destination Node 2

GR7 on L1 to R2
Interior, Exterior to Interior
GR7 on L2 to R3 on L1 to R2 *
Failure Alternate 1, IE
GR7 on L2 to R3 on L4 to GR9 on L2 to R2 *
Failure Alternate 2, T
GR7 on L3 to R4 on L1 to R1 on L1 to R2 *
GR7 on L3 to R4 on L2 to R3 on L1 to R2 *
Destination Node 3

GR7 on L2 to R3
Interior, Exterior to Interior
GR7 on L1 to R2 on L2 to R3 *
Failure Alternate 1, IE
GR7 on L3 to R4 on L2 to R3 *
Failure Alternate 2, T
GR7 on L1 to R2 on L5 to GR9 on L3 to R3 *
Destination Node 4

GR7 on L3 to R4
Interior, Exterior to Interior
GR7 on L2 to R3 on L2 to R4 *
Failure Alternate 1, IE
GR7 on L1 to R2 on L1 to R1 on L2 to R4 *
GR7 on L1 to R2 on L2 to R3 on L2 to R4 *
Destination Node 5

GR7 on L1 to R2 on L1 to R1 on L3 to R5
Interior path
GR7 on L1 to R2 on L5 to GR9 on L4 to R5 *
GR7 on L2 to R3 on L2 to R4 on L3 to R5 *
GR7 on L2 to R3 on L4 to GR9 on L4 to R5 *
GR7 on L3 to R4 on L1 to R1 on L3 to R5 *
GR7 on L3 to R4 on L4 to GR8 on L3 to R5 *
Exterior to Interior
Destination Node 6

GR7 on L1 to R2 on L3 to R6

Interior, Exterior to Interior
GR7 on L2 to R3 on L1 to R2 on L3 to R6 *
Failure Alternate
Destination Node 8

GR7 on L3 to R4 on L4 to GR8
Transitory, Interior
GR7 on L1 to R2 on L1 to R1 on L4 to GR8 *
Failure Alternate 1, IE
GR7 on L1 to R2 on L2 to R3 on L4 to GR8 *
GR7 on L2 to R3 on L2 to R4 on L4 to GR8 *
GR7 on L3 to R4 on L1 to R1 on L4 to GR8 *
Destination Node 9

GR7 on L1 to R2 on L5 to GR9
Interior
GR7 on L2 to R3 on L4 to GR9 *
Transitory
GR7 on L1 to R2 on L1 to R1 on L5 to GR9 *
Interior to Exterior, Exterior to Interior
GR7 on L2 to R3 on L1 to R2 on L5 to GR9 *
GR7 on L2 to on L2 to R4 on L5 to GR9 *
GR7 on L3 to R4 on L1 to R1 on L5 to GR9 *
GR7 on L3 to R4 on L2 to R3 on L4 to GR9 *
FIG. 10: Node 8 Paths Sorted to Destinations
Destination Node 1

GR8 on L1 to R1
Interior, Exterior to Interior,
GR8 on L2 to R4 on L1 to R1 *
Failure Alternate 1, IE
GR8 on L3 to R5 on L1 to R1 *
Failure Alternate 2, T
GR8 on L3 to R5 on L2 to GR9 on L1 to R1 *
Destination Node 2

GR8 on L1 to R1 on L1 to R2
Interior, Exterior to Interior
GR8 on L1 to R1 on L5 to GR9 on L2 to R2 *
GR8 on L2 to R4 on L1 to R1 on L1 to R2 *
Failure Alternate 1, IE
GR8 on L2 to R4 on L2 to R3 on L1 to R2 *
GR8 on L2 to R4 on L3 to GR7 on L1 to R2 *
GR8 on L3 to R5 on L1 to R1 on L1 to R2 *
GR8 on L3 to R5 on L2 to GR9 on L2 to R2 *
Destination Node 3

GR8 on L2 to R4 on L2 to R3
Interior, Exterior to Interior
GR8 on L1 to R1 on L1 to R2 on L2 to R3 *
Failure Alternate 1, IE
GR8 on L1 to R1 on L2 to R4 on L2 to R3 *
GR8 on L1 to R1 on L5 to GR9 on L3 to R3 *
GR8 on L2 to R4 on L3 to GR7 on L2 to R3 *
GR8 on L3 to R5 on L2 to GR9 on L3 to R3 *
Failure Alternate 2, EI
Destination Node 4

GR8 on L2 to R4
Interior, Exterior to Interior
GR8 on L1 to R1 on L2 to R4 *
Failure Alternate 1, IE
GR8 on L3 to R5 on L1 to R1 on L2 to R4 *

Destination Node 5

GR8 on L3 to R5
Interior, Exterior to Interior
GR8 on L1 to R1 on L3 to R5
Failure Alternate 1, IE
GR8 on L1 to R1 on L5 to GR9 on L4 to R5 *
GR8 on L2 to R4 on L1 to R1 on L3 to R5 *
Destination Node 6

GR8 on L1 to R1 on L1 to R2 on L3 to R6
Interior, Exterior to Interior
Destination Node 7

GR8 on L2 to R4 on L3 to GR7
Interior, Exterior to Interior
GR8 on L1 to R1 on L1 to R2 on L4 to GR7 *
Failure Alternate 1, IE
GR8 on L1 to R1 on L2 to R4 on L3 to GR7 *
GR8 on L2 to R4 on L2 to R3 on L3 to GR7 *
Destination Node 9

GR8 on L1 to R1 on L5 to GR9
Interior
GR8 on L3 to R5 on L2 to GR9 *
Transitory
GR8 on L1 to R1 on L1 to R2 on L5 to GR9 *
GR8 on L1 to R1 on L3 to R5 on L2 to GR9 *
GR8 on L2 to R4 on L1 to R1 on L5 to GR9 *
GR8 on L2 to R4 on L2 to R3 on L4 to GR9 *
GR8 on L3 to R5 on L1 to R1 on L5 to GR9 *
FIG. 10: Node 9 Paths Sorted to Destinations
Destination Node 1

GR9 on L1 to R1
Interior, Exterior to Interior
GR9 on L2 to R2 on L1 to R1 *
Failure Alternate 1, IE
GR9 on L4 to R5 on L1 to R1 *
Failure Alternate 2, T
GR9 on L3 to R3 on L1 to R2 on L1 to R1 *
GR9 on L3 to R3 on L2 to R4 on L1 to R1 *
GR9 on L4 to R5 on L3 to GR8 on L1 to R1 *
Destination Node 2

GR9 on L2 to R2
Interior, Exterior to Interior
GR9 on L1 to R1 on L1 to R2 *
Failure Alternate 1, IE
GR9 on L3 to R3 on L1 to R2 *
Failure Alternate 2, T
GR9 on L3 to R3 on L3 to GR7 on L1 to R2 *
GR9 on L4 to R5 on L1 to R1 on L1 to R2 *
Destination Node 3

GR9 on L3 to R3
Interior, Exterior to Interior
GR9 on L2 to R2 on L2 to R3 *
Failure Alternate 1, IE
GR9 on L1 to R1 on L1 to R2 on L2 to R3 *
GR9 on L1 to R1 on L2 to R4 on L2 to R3 *
GR9 on L2 to R2 on L4 to GR7 on L2 to R3 *

Destination Node 4

GR9 on L1 to R1 on L2 to R4
  Interior
GR9 on L3 to R3 on L2 to R4 *
  Exterior to Interior
GR9 on L1 to R1 on L4 to GR8 on L2 to R4 *
GR9 on L2 to R2 on L1 to R1 on L2 to R4 *
GR9 on L2 to R2 on L2 to R3 on L2 to R4 *
GR9 on L2 to R2 on L4 to GR7 on L3 to R4 *
GR9 on L3 to R3 on L3 to GR7 on L3 to R4 *
GR9 on LA to R5 on L1 to R1 on L2 to R4 *
GR9 on L4 to R5 on L3 to 0R8 on L2 to R4 *
Destination Node 5

GR9 on L4 to R5
  Interior, Exterior to Interior
GR9 on L1 to R1 on L3 to R5 *
  Failure Alternate 1, IE
GR9 on L1 to R1 on L4 to GR8 on L3 to R5 *
GR9 on L2 to R2 on L1 to R1 on L3 to R5 *
Destination Node 6

GR9 on L2 to R2 on L3 to R6
  Interior, Exterior to Interior
GR9 on L1 to R1 on L1 to R2 on L3 to R6 *
  Failure Alternate 1

GR9 on L3 to R3 on L1 to R2 on L3 to R6 *
  Failure Alternate 2
Destination Node 7

GR9 on L2 to R2 on L4 to GR7
  Interior path
GR9 on L3 to R3 on L3 to GR7 *
  Transitory path
GR9 on L1 to R1 on L1 to R2 on L4 to GR7 *
GR9 on L1 to R1 on L2 to R4 on L3 to GR7 *
GR9 on L2 to R2 on L2 to R3 on L3 to GR7 *
GR9 on L3 to R3 on L1 to R2 on L4 to GR7 *
GR9 on L3 to R3 on L2 to R4 on L3 to GR7 *
Destination Node 8

GR9 on L1 to R1 on L4 to GR8
  Interior path
GR9 on L4 to R5 on L3 to GR8 *
  Transitory path
GR9 on L1 to R1 on L2 to R4 on L4 to GR8 *
GR9 on L1 to R1 on L3 to R5 on L3 to GR8 *
GR9 on L2 to R2 on L1 to R1 on L4 to GR8 *
GR9 on L3 to R3 on L2 to R4 on L4 to GR8 *
GR9 on L4 to R5 on L1 to R1 on L4 to GR8 *

TABLE 1

Path Switch Matrix for Source Node 1

| Nodes | R1 | R2 | R3 | R4 | R5 | R6 | GR7 | GR8 | GR9 |
|---|---|---|---|---|---|---|---|---|---|
| R1 | 0,0,0,0 | 1,2,2,0 | 1,2,3,0 | 2,4,1,0 | 3,5,0,0 | 1,5,0,0 | 1,2,5,4 | 4,4,2,3 | 5,5,1,3 |
| R2 | 0,0,0,0 | 0,0,0,0 | 0,0,0,0 | 2,4,0,0 | 3,0,0,0 | 0,0,0,0 | 0,0,0,0 | 4,4,3,0 | 0,0,5,0 |
| R3 | 0,0,0,0 | 0,0,0,0 | 0,0,0,0 | 0,0,2,0 | 0,3,3,0 | 0,0,0,0 | 0,0,0,0 | 0,0,4,4 | 0,0,0,0 |
| R4 | 0,0,0,0 | 1,5,0,0 | 0,0,1,0 | 0,0,0,0 | 3,4,4,0 | 1,5,0,0 | 0,0,0,1 | 0,0,4,3 | 5,0,3,0 |
| R5 | 0,0,0,0 | 1,5,0,0 | 0,5,0,0 | 2,4,0,0 | 0,0,0,0 | 1,0,0,0 | 1,2,5,4 | 0,0,4,2 | 0,0,5,5 |
| R6 | 0,0,0,0 | 0,0,0,0 | 0,0,0,0 | 2,4,0,0 | 3,1,0,0 | 0,0,0,0 | 0,0,0,0 | 4,4,2,3 | 0,0,5,0 |
| GR7 | 0,0,0,0 | 0,0,0,0 | 0,0,0,0 | 0,0,2,0 | 3,5,0,3 | 0,0,0,0 | 0,0,0,0 | 0,4,0,0 | 0,5,0,0 |
| GR8 | 0,0,0,0 | 1,2,1,0 | 0,1,0,0 | 0,2,0,0 | 0,3,0,0 | 1,5,5,0 | 0,2,0,0 | 0,0,0,0 | 5,3,5,0 |
| GR9 | 0,0,0,0 | 0,1,0,0 | 0,0,0,2 | 2,1,2,0 | 0,3,0,0 | 0,1,0,0 | 1,0,0,0 | 4,3,4,0 | 0,0,0,0 |

TABLE 2

Path Switch Matrix for Source Node 2

| Nodes | R1 | R2 | R3 | R4 | R5 | R6 | GR7 | GR8 | GR9 |
|---|---|---|---|---|---|---|---|---|---|
| R1 | 0,0,0,0 | 0,0,0,0 | 2,5,0,0 | 0,0,2,0 | 0,0,0,0 | 3,3,0,0 | 4,0,2,0 | 0,0,0,0 | 0,0,5,0 |
| R2 | 1,5,2,0 | 0,0,0,0 | 2,4,5,0 | 1,5,2,0 | 1,5,0,0 | 3,0,0,0 | 4,4,2,0 | 1,1,5,2 | 5,5,1,2 |
| R3 | 1,5,0,0 | 0,0,0,0 | 0,0,0,0 | 0,0,1,0 | 0,5,0,0 | 3,3,3,0 | 0,0,4,0 | 0,0,1,0 | 0,0,5,5 |
| R4 | 0,0,1,0 | 0,0,0,0 | 0,0,2,0 | 0,0,0,0 | 0,0,0,0 | 3,3,3,0 | 0,0,0,4 | 0,0,0,0 | 0,0,0,5 |
| R5 | 0,0,0,0 | 0,0,0,0 | 0,2,0,0 | 0,0,0,0 | 0,0,0,0 | 3,3,0,0 | 4,0,2,0 | 0,0,0,0 | 0,0,0,0 |
| R6 | 1,5,0,0 | 0,0,0,0 | 2,4,5,0 | 1,2,4,0 | 1,5,0,0 | 0,0,0,0 | 4,4,2,0 | 1,1,5,0 | 5,5,1,2 |
| GR7 | 1,5,0,0 | 0,0,0,0 | 0,2,0,0 | 0,0,1,0 | 1,5,0,0 | 3,3,3,0 | 0,0,0,0 | 0,1,0,0 | 5,1,5,0 |
| GR8 | 0,0,0,0 | 0,0,0,0 | 0,2,0,0 | 0,0,0,0 | 0,3,0,0 | 3,0,3,0 | 0,4,0,0 | 0,0,0,0 | 0,5,0,0 |
| GR9 | 0,1,0,0 | 0,0,0,0 | 0,2,0,0 | 0,2,0,0 | 0,0,0,0 | 3,3,3,3 | 4,2,2,4 | 0,0,0,0 | 0,0,0,0 |

TABLE 3

Path Switch Matrix for Source Node 3

| Nodes | R1 | R2 | R3 | R4 | R5 | R6 | GR7 | GR8 | GR9 |
|---|---|---|---|---|---|---|---|---|---|
| R1 | 0,0,0,0 | 0,0,1,0 | 0,0,0,0 | 0,0,2,0 | 0,0,0,0 | 0,0,0,0 | 0,0,3,3 | 0,0,0,0 | 0,0,0,0 |
| R2 | 0,0,2,0 | 0,0,0,0 | 0,0,0,0 | 0,0,2,0 | 0,0,4,0 | 0,0,0,0 | 0,0,3,0 | 0,0,0,2 | 0,0,0,4 |

TABLE 3-continued

Path Switch Matrix for Source Node 3

| Nodes | R1 | R2 | R3 | R4 | R5 | R6 | GR7 | GR8 | GR9 |
|---|---|---|---|---|---|---|---|---|---|
| R3 | 1,2,4,0 | 1,3,4,0 | 0,0,0,0 | 2,3,1,0 | 4,1,2,0 | 1,3,4,0 | 3,3,1,2 | 2,2,3,1 | 4,4,1,3 |
| R4 | 0,0,0,0 | 0,1,0,0 | 0,0,0,0 | 0,0,0,0 | 0,0,0,0 | 0,1,0,0 | 0,0,3,0 | 0,0,0,0 | 0,4,0,1 |
| R5 | 0,0,0,0 | 0,0,1,0 | 0,0,0,0 | 0,0,3,0 | 0,0,0,0 | 0,0,0,0 | 0,0,3,3 | 0,0,0,0 | 0,0,0,0 |
| R6 | 0,0,0,0 | 0,0,0,0 | 0,0,0,0 | 0,2,3,0 | 0,0,0,0 | 0,0,0,0 | 0,0,3,0 | 0,0,0,0 | 0,0,0,4 |
| GR7 | 0,1,0,2 | 0,1,4,0 | 0,0,0,0 | 0,2,0,0 | 0,1,0,2 | 0,1,0,0 | 0,0,0,0 | 0,0,2,0 | 0,0,2,4 |
| GR8 | 0,0,0,0 | 0,0,0,0 | 0,0,0,0 | 0,0,0,0 | 0,0,0,0 | 0,0,0,1 | 0,3,0,0 | 0,0,0,0 | 0,0,4,0 |
| GR9 | 0,0,0,0 | 0,0,0,1 | 0,0,0,0 | 0,0,2,3 | 0,0,0,0 | 0,0,0,1 | 3,1,1,3 | 0,0,2,0 | 0,0,0,0 |

Each number represents a forwarding link base class from interior, interior to exterior, exterior to interior, and Exterior. Zero values mean that the link and/or node is not used on a path between source and destination. Note that for the sake of simplicity, only two alternate paths are stored for failure re-routing. Source nodes are vertical and destination nodes are horizontal.

TABLE 4

Path Switch Matrix for Source Node 4

| Nodes | R1 | R2 | R3 | R4 | R5 | R6 | GR7 | GR8 | GR9 |
|---|---|---|---|---|---|---|---|---|---|
| R1 | 0,0,0,0 | 0,0,2,0 | 0,2,0,0 | 0,0,0,0 | 0,0,0,0 | 0,0,0,0 | 0,3,0,2 | 0,0,4,0 | 0,0,0,0 |
| R2 | 0,0,1,0 | 0,0,0,0 | 0,0,0,0 | 0,0,0,0 | 0,0,0,0 | 0,0,0,0 | 0,0,0,0 | 0,0,0,4 | 0,0,0,0 |
| R3 | 0,1,0,0 | 0,0,0,0 | 0,0,0,0 | 0,0,0,0 | 0,0,1,0 | 0,0,0,0 | 0,0,0,3 | 4,4,1,0 | 0,0,0,0 |
| R4 | 1,4,3,0 | 1,2,3,0 | 2,3,1,0 | 0,0,0,0 | 1,4,1,0 | 1,2,3,0 | 3,3,2,1 | 4,4,1,1 | 1,2,4,3 |
| R5 | 0,0,0,0 | 0,0,0,0 | 0,0,2,0 | 0,0,0,0 | 0,0,0,0 | 0,0,0,0 | 0,3,0,2 | 0,0,4,0 | 0,0,0,0 |
| R6 | 0,0,0,0 | 0,0,0,0 | 0,0,0,0 | 0,0,0,0 | 0,0,0,0 | 0,0,0,0 | 0,0,0,0 | 0,0,4,0 | 0,0,0,0 |
| GR7 | 0,0,1,4 | 0,0,0,0 | 0,0,0,2 | 0,0,0,0 | 0,0,4,1 | 0,0,0,0 | 0,0,0,0 | 4,1,0,4 | 0,0,2,0 |
| GR8 | 0,1,0,0 | 0,1,0,0 | 2,0,2,0 | 0,0,0,0 | 0,0,0,1 | 0,0,0,0 | 3,2,3,0 | 0,0,0,0 | 0,0,2,0 |
| GR9 | 0,0,0,0 | 0,0,0,0 | 0,0,0,2 | 0,0,0,0 | 0,0,0,0 | 0,0,0,0 | 0,3,3,0 | 0,0,4,0 | 0,0,0,0 |

TABLE 5

Path Switch Matrix for Source Node 5

| Nodes | R1 | R2 | R3 | R4 | R5 | R6 | GR7 | GR8 | GR9 |
|---|---|---|---|---|---|---|---|---|---|
| R1 | 0,0,0,0 | 0,0,0,0 | 0,0,2,0 | 0,0,0,0 | 0,0,0,0 | 0,0,0,0 | 0,0,0,0 | 0,0,0,3 | 0,0,0,2 |
| R2 | 0,0,0,0 | 0,0,0,0 | 0,0,0,0 | 0,0,0,0 | 0,0,0,0 | 0,0,0,0 | 0,0,0,0 | 0,0,3,0 | 0,0,0,0 |
| R3 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
| R4 | 0,0,0,0 | 0,0,0,0 | 0,0,0,0 | 0,0,0,0 | 0,0,0,0 | 0,0,0,0 | 0,0,0,0 | 0,0,0,3 | 0,0,2,0 |
| R5 | 1,2,3,0 | 1,2,2,0 | 2,1,3,0 | 1,2,3,0 | 0,0,0,0 | 1,2,0,0 | 1,1,2,3 | 3,3,1,1 | 2,2,1,0 |
| R6 | 0,0,0,0 | 0,0,0,0 | 0,0,0,0 | 0,0,0,0 | 0,0,0,0 | 0,0,0,0 | 0,0,0,0 | 0,0,0,3 | 0,0,0,0 |
| GR7 | 0,0,0,0 | 0,0,0,0 | 0,0,0,0 | 0,0,0,0 | 0,3,0,0 | 0,0,0,0 | 0,0,0,0 | 0,0,0,0 | 0,0,0,0 |
| GR8 | 0,0,0,1 | 0,0,1,0 | 0,0,0,2 | 0,1,0,0 | 0,0,0,0 | 0,1,2,1 | 0,0,0,0 | 0,0,0,0 | 0,2,1,2 |
| GR9 | 0,0,0,1 | 0,0,0,0 | 0,0,0,0 | 0,0,0,3 | 0,0,0,0 | 0,0,0,0 | 0,0,0,0 | 0,3,1,3 | 0,0,0,0 |

TABLE 6

Path Switch Matrix for Source Node 6

| Nodes | R1 | R2 | R3 | R4 | R5 | R6 | GR7 | GR8 | GR9 |
|---|---|---|---|---|---|---|---|---|---|
| R1 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
| R2 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
| R3 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
| R4 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
| R5 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
| R6 | 1,1,0,0 | 1,0,0,0 | 1,1,0,0 | 1,1,1,0 | 1,1,1,0 | 0,0,0,0 | 1,1,1,0 | 1,1,0,0 | 1,1,1,1 |
| GR7 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
| GR8 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
| GR9 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |

TABLE 7

Path Switch Matrix for Source Node GR7

| Nodes | R1 | R2 | R3 | R4 | R5 | R6 | GR7 | GR8 | GR9 |
|---|---|---|---|---|---|---|---|---|---|
| R1  | 0,0,0,0 | 0,0,0,0 | 0,3,0,0 | 0,0,0,0 | 0,0,0,0 | 0,0,0,0 | 0,0,0,0 | 0,0,0,0 | 0,0,0,0 |
| R2  | 0,0,0,0 | 0,0,0,0 | 0,2,0,0 | 0,0,3,0 | 0,0,0,0 | 0,0,0,0 | 0,0,0,0 | 0,0,0,0 | 0,0,0,0 |
| R3  | 0,0,0,0 | 0,1,0,0 | 0,0,0,0 | 0,3,0,0 | 0,0,0,0 | 0,1,0,0 | 0,0,0,0 | 0,0,0,3 | 0,0,0,1 |
| R4  | 0,0,1,0 | 0,0,1,0 | 0,2,0,0 | 0,0,0,0 | 0,0,0,0 | 0,0,1,0 | 0,0,0,0 | 0,0,0,0 | 0,0,0,0 |
| R5  | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
| R6  | 0,0,0,0 | 0,0,0,0 | 0,2,0,0 | 0,0,3,0 | 0,0,0,0 | 0,0,0,0 | 0,0,0,0 | 0,0,0,0 | 0,0,0,0 |
| GR7 | 1,2,3,2 | 1,2,1,2 | 2,1,2,3 | 3,2,3,0 | 1,2,3,2 | 1,2,1,0 | 0,0,0,0 | 3,2,2,3 | 1,2,1,2 |
| GR8 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
| GR9 | 0,0,0,0 | 0,0,0,0 | 0,0,0,0 | 0,0,0,3 | 0,0,0,0 | 0,0,0,0 | 0,0,0,0 | 0,0,0,0 | 0,0,0,0 |

TABLE 8

Path Switch Matrix for Source Node GR8

| Nodes | R1 | R2 | R3 | R4 | R5 | R6 | GR7 | GR8 | GR9 |
|---|---|---|---|---|---|---|---|---|---|
| R1  | 0,0,0,0 | 0,0,0,0 | 0,0,0,0 | 0,3,0,0 | 0,3,0,0 | 0,0,0,0 | 0,0,0,0 | 0,0,0,0 | 0,0,0,0 |
| R2  | 0,0,0,0 | 0,0,0,0 | 0,0,0,0 | 0,2,0,0 | 0,0,0,0 | 0,0,0,0 | 0,0,0,0 | 0,0,0,0 | 0,0,0,0 |
| R3  | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
| R4  | 0,1,0,0 | 0,0,0,0 | 0,0,0,0 | 0,0,0,0 | 0,3,3,0 | 0,0,0,0 | 0,0,0,0 | 0,0,0,0 | 0,0,0,0 |
| R5  | 0,0,1,0 | 0,0,0,0 | 0,0,2,0 | 0,2,2,0 | 0,0,0,0 | 0,0,0,0 | 0,0,0,2 | 0,0,0,0 | 0,0,0,1 |
| R6  | 0,0,0,0 | 0,0,0,0 | 0,2,0,0 | 0,4,0,0 | 0,0,0,0 | 0,0,0,0 | 0,0,0,0 | 0,0,0,0 | 0,0,0,0 |
| GR7 | 0,0,0,1 | 0,0,0,0 | 0,0,0,0 | 0,0,0,0 | 0,0,3,0 | 0,0,0,0 | 0,0,0,0 | 0,0,0,0 | 0,0,0,0 |
| GR8 | 1,2,1,3 | 1,2,1,3 | 2,1,2,3 | 2,1,2,0 | 3,1,3,0 | 1,3,3,1 | 2,1,2,0 | 0,0,0,0 | 1,3,1,3 |
| GR9 | 0,0,0,0 | 0,0,0,0 | 0,0,0,0 | 0,0,0,2 | 0,0,0,3 | 0,0,0,0 | 0,0,0,0 | 0,0,0,0 | 0,0,0,0 |

TABLE 9

Path Switch Matrix for Source Node GR9

| Nodes | R1 | R2 | R3 | R4 | R5 | R6 | GR7 | GR8 | GR9 |
|---|---|---|---|---|---|---|---|---|---|
| R1  | 0,0,0,0 | 0,5,0,0 | 0,3,3,0 | 0,0,3,0 | 0,0,4,0 | 0,2,0,0 | 0,0,0,3 | 0,0,0,0 | 0,0,0,0 |
| R2  | 0,1,0,0 | 0,0,0,0 | 0,0,3,0 | 0,1,0,0 | 0,4,0,0 | 0,0,0,0 | 0,0,3,0 | 0,0,0,3 | 0,0,0,0 |
| R3  | 0,1,1,0 | 0,0,0,2 | 0,0,0,0 | 0,0,0,0 | 4,1,0,0 | 0,0,2,0 | 0,0,0,0 | 0,0,0,0 | 0,0,0,0 |
| R4  | 0,0,0,0 | 0,2,0,0 | 0,0,0,0 | 0,0,0,0 | 0,0,0,0 | 0,2,0,0 | 0,0,0,0 | 0,0,0,0 | 0,0,0,0 |
| R5  | 0,1,0,0 | 0,2,3,0 | 3,2,0,0 | 0,1,3,0 | 0,0,0,0 | 0,2,0,0 | 0,0,2,0 | 0,0,0,0 | 0,0,0,0 |
| R6  | 0,1,0,0 | 0,0,0,0 | 0,0,3,0 | 0,0,0,0 | 0,4,0,0 | 0,0,0,0 | 0,0,0,0 | 0,0,1,0 | 0,0,0,0 |
| GR7 | 0,1,0,0 | 0,0,2,0 | 0,0,0,0 | 0,0,0,0 | 0,4,0,0 | 0,0,0,0 | 0,0,0,0 | 0,0,0,0 | 0,0,0,0 |
| GR8 | 0,0,0,0 | 0,2,0,0 | 0,0,0,3 | 0,0,0,0 | 0,0,0,0 | 0,2,2,3 | 0,0,0,0 | 0,0,0,0 | 0,0,0,0 |
| GR9 | 1,2,1,4 | 2,1,2,3 | 3,2,3,0 | 1,3,3,1 | 4,1,4,0 | 2,1,2,3 | 2,3,2,3 | 1,4,1,4 | 0,0,0,0 |

What is claimed is:

1. In a network including a plurality of switches, hosts and links connecting said switches and hosts into a topology, a method of ordering said network comprising:

dividing said switches into two classes, interior and exterior, wherein said interior class switches only have links to other switches and hosts within said network, and exterior class switches have at least one link to other networks or entities outside of said network;

within said interior class, determining a central switch within said interior class, said central switch determined by having the most links to other interior switches;

determining an ordering of all switches in said interior class, based on number of links to other interior switches, starting from said determined central switch;

determining an ordering of all switches in said exterior class, based on number of links to interior switches; starting from 1 greater than the number of interior class switches;

for each switch, ordering all links connected to that switch by said ordering of said interior and exterior class switches, wherein a link to a switch with a lower ordering number will precede a link to a switch with a higher ordering number; and numbering said ordered links from 1 up to total number of links connected to that switch.

2. The method of claim 1 wherein traffic on said ordered network is routed on a link of a switch based on said numbering of links out of said switch, and a classification of said traffic.

3. The method of claim 2 wherein traffic on said ordered network is divided into one of a plurality of classes, including interior traffic, interior-to-exterior, exterior-to-interior, and transitory.

4. The method of claim 3 wherein traffic in said ordered network that is classified as interior traffic will be routed out of said switch links with a low link number.

5. The method of claim wherein traffic in said ordered network that is classified as transitory traffic will be routed out of said switch on links with a highest link number.

6. The method of claim wherein said method is performed by one switch in said network, and said resulting link numbering for each switch in said network.

7. A method of routing traffic through a network having a plurality of nodes, comprising:

classifying network traffic into a plurality of classes, including interior, interior-to-exterior, exterior-to-interior, and transitory;

at each node in said network, upon receiving a packet designated as belonging to a traffic class and including a source node address and a destination node address, indexing into said node's packet switch matrix using said traffic class designation, source node address, and destination node address to obtain a node link number for forwarding said packet; and forwarding said packet upon a link indicated by said node link number.

8. The method of claim 7 wherein:

packets designated as interior traffic are routed through topologically interior nodes of said network;

packets designated as transitory traffic are routed through topologically exterior nodes of said network;

packets designated as interior-to-exterior traffic are routed through topologically interior nodes towards topologically exterior nodes of said network; and packets designated as exterior-to-interior traffic are routed through topologically exterior nodes towards topologically interior nodes of said network.

9. The method of claim 7 wherein each packet includes a header which includes said particular traffic class of said packet, said source node address, and said destination node address.

10. The method of claim 9 wherein said header is a four-byte header in identical format to standard IP address headers.

11. The method of claim 10 wherein:

said second byte of said four-byte packet header indicates said traffic class designation;

said third byte of said four-byte packet header indicates said source node; and said fourth byte of said four-byte packet header indicates said destination node.

\* \* \* \* \*